US012534357B2

(12) United States Patent
Kahler et al.

(10) Patent No.: US 12,534,357 B2
(45) Date of Patent: *Jan. 27, 2026

(54) FLUID MANAGEMENT SYSTEM AND FLUID DISPENSER

(71) Applicant: Graco Minnesota Inc., Minneapolis, MN (US)

(72) Inventors: Bradley G. Kahler, Otsego, MN (US); Mark L. Bauck, Coon Rapids, MN (US); Joshua R. Holmstadt, St. Michael, MN (US); Glenn E. Highland, East Bethel, MN (US); Benjamin J. Paar, Minneapolis, MN (US); Chad G. Igo, Minneapolis, MN (US); Gregory D. Sieckert, Plymouth, MN (US); James R. Ebben, Shoreview, MN (US); David J. Lorden, Zimmerman, MN (US); Michael E. Bloom, Anoka, MN (US); Shane A. Norman, St. Francis, MN (US); Anthony J. Kuschel, Coon Rapids, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,062

(22) Filed: Jun. 3, 2024

(65) Prior Publication Data

US 2024/0317570 A1    Sep. 26, 2024

Related U.S. Application Data

(63) Continuation of application No. 17/100,331, filed on Nov. 20, 2020, now Pat. No. 12,030,770, which is a (Continued)

(51) Int. Cl.
 *B67D 7/04* (2010.01)
 *B67D 7/14* (2010.01)
 (Continued)

(52) U.S. Cl.
 CPC ............. *B67D 7/348* (2013.01); *B67D 7/145* (2013.01); *B67D 7/163* (2013.01); *B67D 7/04* (2013.01)

(58) Field of Classification Search
 CPC .. G06Q 20/145; G06Q 20/322; G07F 13/025; G07F 9/001; G05D 7/0617;
 (Continued)

(56) References Cited

U.S. PATENT DOCUMENTS

| 883,607 A | 3/1908 | Andrews |
|---|---|---|
| 2,626,187 A | 1/1953 | Heinrich |

(Continued)

FOREIGN PATENT DOCUMENTS

| CN | 101049901 A | 10/2007 |
|---|---|---|
| CN | 103573349 A | 2/2014 |

(Continued)

OTHER PUBLICATIONS

Second Australian Examination Report for AU Application No. 2018240376, Dated Aug. 6, 2024, pp. 4.

(Continued)

*Primary Examiner* — Dionne Pendleton
(74) *Attorney, Agent, or Firm* — Kinney & Lange, P.A.

(57) ABSTRACT

A fluid management system includes a fluid management controller and a fluid dispenser. The controller authorizes control of the one or more fluid management components over a wireless interface. A dispensing meter can be activated by an authentication device. The fluid meter includes a cartridge valve with a valve cartridge and a valve stem. The cartridge valve guides the valve stem and provides the (Continued)

only sealing surface for the dynamic seals and control seal disposed on the valve stem. The handheld meter dispenses through a nozzle, which includes an overmolded stem tip that generates a laminar fluid flow as the fluid exits the nozzle. The handheld fluid meter includes circuitry configured to invert the orientation of a visual output provided by a display of the handheld fluid meter to facilitate installation of the handheld fluid meter for use in an oil bar application.

14 Claims, 39 Drawing Sheets

Related U.S. Application Data continuation-in-part of application No. 16/156,765, filed on Oct. 10, 2018, now Pat. No. 10,843,213, said application No. 17/100,331 is a continuation-in-part of application No. 16/600,048, filed on Oct. 11, 2019, now Pat. No. 11,292,710, which is a continuation-in-part of application No. 15/928,782, filed on Mar. 22, 2018, now Pat. No. 10,589,979, said application No. 16/600,048 is a continuation-in-part of application No. 15/928,767, filed on Mar. 22, 2018, now Pat. No. 10,647,566, said application No. 16/600,048 is a continuation-in-part of application No. 15/928,828, filed on Mar. 22, 2018, now Pat. No. 10,457,539.

(60) Provisional application No. 62/689,606, filed on Jun. 25, 2018, provisional application No. 62/570,141, filed on Oct. 10, 2017, provisional application No. 62/567,035, filed on Oct. 2, 2017, provisional application No. 62/558,992, filed on Sep. 15, 2017.

(51) Int. Cl.
*B67D 7/16* (2010.01)
*B67D 7/34* (2010.01)

(58) Field of Classification Search
CPC .............. G05B 19/042; B05B 11/0005; G07C 9/00896; B67D 7/04; B67D 7/145; B67D 7/346; B67D 7/348; B67D 7/425; B67D 7/163; B67D 7/34; B67D 7/344
See application file for complete search history.

(56) References Cited

U.S. PATENT DOCUMENTS

| | | | |
|---|---|---|---|
| 3,160,331 A | 12/1964 | Trumbull et al. |
| 3,711,020 A | 1/1973 | Zelna |
| 4,469,149 A | 9/1984 | Walkey et al. |
| 4,500,016 A | 2/1985 | Funfstuck |
| 4,793,426 A | 12/1988 | Millsapps |
| 4,821,927 A | 4/1989 | Paulsen et al. |
| 4,880,144 A | 11/1989 | Shea |
| 4,941,507 A | 7/1990 | Shenn |
| 5,423,348 A | 6/1995 | Jezek et al. |
| 5,441,070 A | 8/1995 | Thompson |
| 5,513,674 A | 5/1996 | Frisch |
| 5,524,821 A | 6/1996 | Yie et al. |
| 5,603,364 A | 2/1997 | Kerssies |
| 5,659,306 A | 8/1997 | Bahar |
| 5,713,519 A | 2/1998 | Sandison et al. |
| 5,848,752 A | 12/1998 | Kolacz et al. |
| 5,862,948 A | 1/1999 | Duchon |
| 5,897,030 A | 4/1999 | Stangle |
| 5,923,572 A | 7/1999 | Pollock |
| 6,036,055 A | 3/2000 | Mogadam et al. |
| 6,412,516 B1 | 7/2002 | Goldsmith |
| 6,470,233 B1 | 10/2002 | Johnson, Jr. |
| 6,571,151 B1 | 5/2003 | Leatherman |
| 6,585,009 B2 | 7/2003 | Matthews et al. |
| 6,659,306 B2 | 12/2003 | Boyle et al. |
| 6,739,483 B2 | 5/2004 | White et al. |
| 7,082,969 B1 | 8/2006 | Hollerback |
| 7,096,894 B1 | 8/2006 | Hollub et al. |
| 7,278,557 B2 | 10/2007 | Rackwitz |
| 7,513,445 B2 | 4/2009 | Ricco et al. |
| 7,551,087 B2 | 6/2009 | Mcallister |
| 7,647,954 B2 | 1/2010 | Garber et al. |
| 7,778,600 B2 | 8/2010 | Godwin et al. |
| 7,784,715 B2 | 8/2010 | Kress |
| 7,837,235 B2 | 11/2010 | Geser et al. |
| 8,037,844 B2 | 10/2011 | Mather et al. |
| 8,079,600 B2 | 12/2011 | Shojima et al. |
| 8,181,972 B2 | 5/2012 | Tsuji |
| 8,429,095 B1 | 4/2013 | Ryan |
| 8,466,933 B2 | 6/2013 | Nishikawa |
| 8,490,895 B2 | 7/2013 | Jaworski et al. |
| 8,537,847 B2 | 9/2013 | Yeo et al. |
| 8,816,860 B2 | 8/2014 | Ophardt et al. |
| 8,833,607 B2 | 9/2014 | Wegelin et al. |
| 8,869,071 B2 | 10/2014 | Cho et al. |
| 8,994,529 B2 | 3/2015 | White |
| 9,053,503 B2 | 6/2015 | Carapelli |
| 9,098,069 B2 | 8/2015 | Dickinson et al. |
| 9,227,209 B2 | 1/2016 | Mather et al. |
| 9,516,141 B2 | 12/2016 | Dubois et al. |
| 9,558,486 B2 | 1/2017 | Betancourt |
| 9,649,651 B2 | 5/2017 | Mather et al. |
| 9,670,052 B2 | 6/2017 | Worley et al. |
| 9,715,682 B2 | 7/2017 | Webb et al. |
| 10,457,539 B2 | 10/2019 | Bauck et al. |
| 10,669,149 B2 | 6/2020 | Gray et al. |
| 10,788,344 B2 | 9/2020 | Mattar et al. |
| 10,843,213 B2 | 11/2020 | Kahler et al. |
| 2002/0188382 A1 | 12/2002 | Sherwood |
| 2003/0062380 A1 | 4/2003 | Boyle et al. |
| 2005/0056628 A1 | 3/2005 | Hu |
| 2005/0096795 A1 | 5/2005 | Krieter et al. |
| 2006/0121844 A1 | 6/2006 | Sparks |
| 2006/0139169 A1 | 6/2006 | Reid et al. |
| 2006/0157149 A1 | 7/2006 | Hillam et al. |
| 2007/0056983 A1 | 3/2007 | Wells |
| 2007/0090132 A1 | 4/2007 | Thibodeau et al. |
| 2007/0188450 A1 | 8/2007 | Hernandez et al. |
| 2008/0029972 A1 | 2/2008 | Smathers et al. |
| 2008/0203346 A1 | 8/2008 | Shu |
| 2009/0092507 A1 | 4/2009 | Bley et al. |
| 2009/0314797 A1 | 12/2009 | Breeser |
| 2009/0314980 A1 | 12/2009 | Breeser |
| 2009/0315277 A1 | 12/2009 | Iwamoto et al. |
| 2010/0125362 A1* | 5/2010 | Canora ................ G06Q 20/327 |
| | | | 235/487 |
| 2010/0200609 A1 | 8/2010 | Cadigan |
| 2011/0166689 A1 | 7/2011 | Alden et al. |
| 2011/0172816 A1 | 7/2011 | Ezra |
| 2011/0245983 A1 | 10/2011 | Beebe |
| 2012/0068926 A1 | 3/2012 | Huang |
| 2012/0242701 A1 | 9/2012 | Ingrassia |
| 2013/0030578 A1 | 1/2013 | Crisp |
| 2013/0037739 A1 | 2/2013 | Millard |
| 2013/0103585 A1 | 4/2013 | Carapelli |
| 2013/0206279 A1 | 8/2013 | Ryan |
| 2013/0265250 A1 | 10/2013 | Ishikawa et al. |
| 2013/0314445 A1 | 11/2013 | Fujii et al. |
| 2014/0129038 A1 | 5/2014 | Finnell et al. |
| 2014/0276557 A1 | 9/2014 | Vaishya |
| 2015/0025498 A1 | 1/2015 | Estes |
| 2015/0106196 A1 | 4/2015 | Williams et al. |
| 2015/0120476 A1 | 4/2015 | Harrell |
| 2015/0161590 A1 | 6/2015 | Genovez |
| 2015/0242855 A1 | 8/2015 | Vilnai |
| 2015/0375984 A1 | 12/2015 | Arcand |
| 2016/0010857 A1 | 1/2016 | Cadeau et al. |
| 2016/0023640 A1 | 1/2016 | Casale |
| 2016/0023886 A1 | 1/2016 | Braden |
| 2016/0051116 A1 | 2/2016 | Charlton et al. |
| 2016/0121352 A1 | 5/2016 | Mather et al. |
| 2017/0073211 A1* | 3/2017 | Wilson .................. B67D 7/348 |

(56) References Cited

U.S. PATENT DOCUMENTS

| | | |
|---|---|---|
| 2017/0109722 A1 | 4/2017 | Morris et al. |
| 2017/0178257 A1 | 6/2017 | Tingler et al. |
| 2017/0221116 A1 | 8/2017 | Makke et al. |
| 2017/0247241 A1 | 8/2017 | Blyth |
| 2017/0287237 A1 | 10/2017 | Koenig et al. |
| 2017/0335988 A1 | 11/2017 | Peret et al. |
| 2017/0355587 A1 | 12/2017 | Hinsey |
| 2019/0084823 A1 | 3/2019 | Norman et al. |
| 2019/0106319 A1 | 4/2019 | Kahler et al. |
| 2019/0112178 A1 | 4/2019 | Khowaiter et al. |
| 2019/0274598 A1 | 9/2019 | Scott et al. |
| 2019/0367353 A1 | 12/2019 | Mcnamara et al. |
| 2020/0048068 A1 | 2/2020 | Bloom et al. |
| 2020/0207606 A1 | 7/2020 | Bulgurcu Bilgen et al. |
| 2021/0101794 A1 | 4/2021 | Williams et al. |

FOREIGN PATENT DOCUMENTS

| | | |
|---|---|---|
| CN | 103620654 A | 3/2014 |
| CN | 104231034 A | 12/2014 |
| CN | 105384136 A | 3/2016 |
| EP | 1167278 A1 | 1/2002 |
| EP | 1656997 B1 | 9/2008 |
| EP | 3692430 A1 | 8/2020 |
| FR | 2183355 A5 | 12/1973 |
| JP | H0664695 A | 3/1994 |
| JP | H08301396 A | 11/1996 |
| JP | 2004238063 A | 8/2004 |
| JP | 2005537189 A | 12/2005 |
| JP | 2008505810 A | 2/2008 |
| JP | 2010254346 A | 11/2010 |
| JP | 2011524842 A | 9/2011 |
| JP | 7321150 B2 | 7/2023 |
| KR | 200374929 Y1 | 2/2005 |
| KR | 100751530 B1 | 8/2007 |
| KR | 20100068137 A | 6/2010 |
| RU | 102795 U1 | 3/2011 |
| RU | 2461046 C2 | 9/2012 |
| RU | 2494957 C2 | 10/2013 |
| WO | 2005045536 A2 | 5/2005 |
| WO | 2014089163 A2 | 6/2014 |
| WO | 2014159624 A1 | 10/2014 |
| WO | 2015009928 A1 | 1/2015 |
| WO | 2015066193 A1 | 5/2015 |
| WO | 2017048577 A1 | 3/2017 |
| WO | 2018170467 A1 | 9/2018 |

OTHER PUBLICATIONS

Third Party Observation for PCT Application No. PCT/US2018/023861, Dated Feb. 4, 2019, pp. 2.
Second Chinese Office Action for CN Application No. 201880065905.3, Dated Oct. 9, 2021, pp. 21.
Second Chinese Office Action for CN Application No. 201880048747.0, Dated Jan. 14, 2022, pp. 12.
Third Chinese Office Action for CN Application No. 201880065905.3, Dated Apr. 27, 2022, pp. 10.
Second Chinese Office Action for CN Application No. 201880030761.8, Dated Aug. 24, 2022, pp. 16.
Second Japanese Office Action for JP Application No. 2019-552170, Dated Nov. 16, 2022, pp. 5.
Second Japanese Office Action for JP Application No. 2019-552195, Dated Nov. 16, 2022, pp. 7.
Second Japanese Office Action for JP Application No. 2019-552092, Dated Nov. 22, 2022, pp. 4.
Third Chinese Office Action for CN Application No. 201880030761.8, Dated Feb. 3, 2023, pp. 23.
Second Japanese Office Action for JP Application No. 2020-520289, Dated Apr. 4, 2023, pp. 5.
Second Korean Office Action for KR Application No. 10-2019-7030567, Dated May 24, 2023, pp. 5.
Second Korean Office Action for KR Application No. 10-2019-7030570, Dated May 24, 2023, pp. 4.
Second Malaysian Substantive Examination Adverse Report for MY Application No. PI2019005477, Nov. 27, 2023, pp. 2.
Second Malaysian Substantive Examination Adverse Report for MY Application No. PI2019005479, Oct. 2, 2023, pp. 2.
Third Chinese Office Action for CN Application No. 201880026203.4, Dated Dec. 20, 2021, pp. 3 (No English Translation).
Communication Pursuant to Article 94(3) EPC for EP Application No. 18796233.7, Dated Jun. 30, 2021, pp. 5.
Decision to Grant Patent for JP Application No. 2019-552170, Dated Mar. 1, 2023, pp. 3.
European Search Report for EP Application No. 18771886.1, Dated Nov. 10, 2020, pp. 8.
Extended European Search Report for EP Application No. 18771642.8, Dated Jul. 6, 2021, pp. 7.
Extended European Search Report for EP Application No. 18771643.6, Dated Apr. 15, 2021, pp. 9.
Extended European Search Report for EP Application No. 23202018.0, Dated Feb. 13, 2024, pp. 7.
First Australian Exam Report for AU Application No. 2018240380, Dated Aug. 4, 2023, pp. 4.
First Australian Exam Report for AU Application No. 2018347358, Dated Nov. 8, 2023, pp. 6.
First Australian Examination Report for AU Application No. 2018240376, Dated Sep. 15, 2023, pp. 4.
First Australian Examination Report for AU Application No. 2018240378, Dated Oct. 21, 2022, pp. 4.
First Chinese Office Action for CN Application No. 201880026203.4, Dated Nov. 16, 2020, pp. 20.
First Chinese Office Action for CN Application No. 201880030761.8, Dated Mar. 24, 2022, pp. 20.
First Chinese Office Action for CN Application No. 201880048747.0, Dated May 26, 2021, pp. 20.
First Chinese Office Action for CN Application No. 201880065905.3, Dated Feb. 19, 2021, pp. 23.
First Communication Pursuant to Article 94(3) EPC for EP Application No. 18771642.8, Dated Mar. 1, 2024, pp. 5.
First Communication Pursuant to Article 94(3) EPC for EP Application No. 18771886.1, Dated Jan. 16, 2024, pp. 5.
First Indonesia Office Action for ID Application No. P00201909401, Dated Jun. 24, 2021, pp. 8.
First Indonesia Office Action for ID Application No. P00201909402, Dated Aug. 29, 2021, Pages.
First Indonesia Office Action for ID Application No. P00201909416, Dated Oct. 2, 2022, pp. 5.
First Indonesian Office Action for ID Application No. P00202002736, Dated Dec. 26, 2021, pp. 7.
First Japanese Office Action for JP Application No. 2019-552092, Dated Apr. 27, 2022, pp. 6.
First Japanese Office Action for JP Application No. 2019-552170, Dated Dec. 8, 2021, pp. 10.
First Japanese Office Action for JP Application No. 2019-552195, Dated Dec. 8, 2021, pp. 9.
First Japanese Office Action for JP Application No. 2020-520289, Dated Jul. 27, 2022, pp. 8.
First Korean Office Action for KR Application No. 10-2019-7030567, Dated Oct. 27, 2022, pp. 7.
First Korean Office Action for KR Application No. 10-2019-7030570, Dated Nov. 5, 2022, pp. 5.
First Korean Office Action for KR Application No. 10-2020-7012960, Dated Apr. 19, 2023, pp. 7.
First Malaysia Examination Report for MY Application No. PI2020001552, Dated Nov. 1, 2023, pp. 2.
First Russian Office Action for RU Application No. 2019131851/03, Dated Jul. 21, 2021, pp. 19.
First Russian Office Action for RU Application No. 2019132092, Dated Apr. 26, 2021, pp. 14.
First Russian Office Action for RU Application No. 2019133010/03, Dated Jul. 21, 2021, pp. 18.
First Russian Office Action for RU Application No. 2020114881, Dated Mar. 22, 2022, pp. 16.

(56) References Cited

OTHER PUBLICATIONS

International Preliminary Report on Patentablity for PCT Application No. PCT/US2018/023858, Oct. 3, 2019, pp. 15.
International Preliminary Report on Patentablity for PCT Application No. PCT/US2018/023861, Dated Oct. 3, 2019, pp. 10.
International Preliminary Report on Patentablity for PCT Application No. PCT/US2018/023863, Dated Mar. 26, 2020, pp. 15.
International Preliminary Report on Patentablity for PCT Application No. PCT/US2018/055237, Dated Apr. 23, 2020, pp. 8.
International Search Report and Written Opinion for PCT Application No. PCT/US2018/023858, Dated Jul. 9, 2018, pp. 16.
International Search Report and Written Opinion for PCT Application No. PCT/US2018/023861, Dated Jul. 10, 2018, pp. 13.
International Search Report and Written Opinion for PCT Application No. PCT/US2018/023863, Dated Aug. 31, 2018, pp. 17.
International Search Report and Written Opinion for PCT Application No. PCT/US2018/055237, Dated Jan. 28, 2019, pp. 12.
Japanese Decision to Grant a Patent for JP Application No. 2019-552092, Dated Mar. 22, 2023, pp. 3.
Korean Notice of Allowance for KR Application No. 10-2019-7030567, Dated Sep. 18, 2023, pp. 5.
Korean Notice of Allowance for KR Application No. 10-2019-7030570, Dated Nov. 28, 2023, pp. 5.
Korean Preliminary Rejection for KR Application No. 10-2019-7030569, Dated Apr. 15, 2022, pp. 16.
Malaysian Examination Adverse Report for MY Application No. PI2019005478, Dated Mar. 29, 2023, pp. 3.
Malaysian Substantive Examination Adverse Report for MY Application No. PI2019005477, Feb. 24, 2023, pp. 4.
Malaysian Substantive Examination Adverse Report for MY Application No. PI2019005479, Jan. 20, 2023, pp. 4.
Russian Notice of Allowance for RU Application No. 2019131851, Dated Mar. 15, 2022, pp. 21.
Second Chinese Office Action for CN Application No. 2018800262034, Dated May 18, 2021, pp. 18.
Extended European Search Report for European Patent Application No. 25151275.2, dated Apr. 1, 2025, nine pages.
Extended European Search Report for European Patent Application No. 25160273.6, dated Jun. 5, 2025, 10 pages.

\* cited by examiner

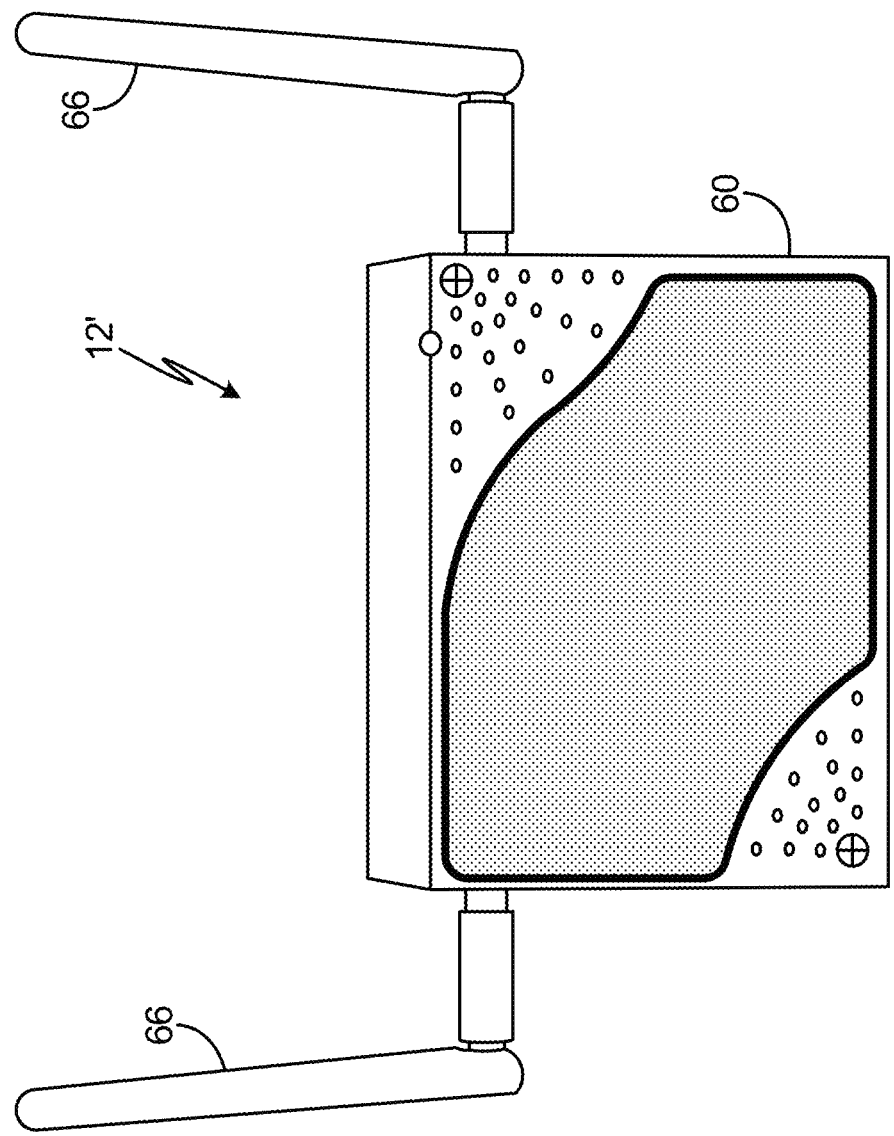

FLUID MANAGEMENT SYSTEM AND FLUID DISPENSER

CROSS-REFERENCE TO RELATED APPLICATION(S)

This application is a continuation of U.S. application Ser. No. 17/100,331 filed Nov. 20, 2020 for "FLUID MANAGEMENT SYSTEM AND FLUID DISPENSER," which in turn is a continuation-in-part of U.S. application Ser. No. 16/156,765, filed Oct. 10, 2018 and entitled "FLUID DISPENSING METER AUTHORIZATION," now U.S. Pat. No. 10,843,213, which in turn claims the benefit of U.S. Provisional Application No. 62/689,606 filed Jun. 25, 2018 and entitled "FLUID DISPENSING METER WORK ORDER," and claims the benefit of U.S. Provisional Application No. 62/570,141, filed Oct. 10, 2017 and entitled "DISPENSING METER AUTHORIZATION"; and which U.S. application Ser. No. 17/100,331 is a continuation-in-part of U.S. application Ser. No. 16/600,048, filed Oct. 11, 2019, and entitled "FLUID MANAGEMENT SYSTEM AND FLUID DISPENSER," now U.S. Pat. No. 11,292,710, which in turn is a continuation-in-part of U.S. application Ser. No. 15/928,782, filed Mar. 22, 2018, and entitled "FLUID MANAGEMENT CONTROLLER," now U.S. Pat. No. 10,589,979, Issued Mar. 17, 2020, which claims the benefit of U.S. Provisional Application No. 62/567,035, filed Oct. 2, 2017, and entitled "FLUID MANAGEMENT CONTROLLER," and said application Ser. No. 16/600,048 is a continuation-in-part of U.S. application Ser. No. 15/928,767, filed Mar. 22, 2018, and entitled "DISPENSING METER AUTHORIZATION," now U.S. Pat. No. 10,647,566, Issued Mar. 22, 2018, which claims the benefit of U.S. Provisional Application No. 62/570,141, filed Oct. 10, 2017, and entitled "DISPENSING METER AUTHORIZATION," and said application Ser. No. 16/600,048 is a continuation-in-part of U.S. application Ser. No. 15/928,828, filed Mar. 22, 2018, and entitled "DISPENSING METER FOR FLUID DISPENSING," now U.S. Pat. No. 10,457,539, issued Mar. 22, 2018 which claims the benefit of U.S. Provisional Application No. 62/558,992, filed Sep. 15, 2017, and entitled "DISPENSING METER AND CARTRIDGE VALVE FOR FLUID DISPENSING," the disclosures of which are hereby incorporated by reference in their entireties.

BACKGROUND

The present disclosure relates to fluid dispensing. More particularly, this disclosure relates to independent control of a fluid management system by a fluid management controller and further relates to fluid dispensing meters.

Fluid management has become increasingly important to control the costs of fluid overhead. For example, many vehicle fleet managers and auto dealerships have installed fluid management systems to efficiently dispense fluids, such as motor oil and transmission fluid. Such fluid management systems frequently include a fluid tank and a pump located away from a dispensing point. Fluid management systems can include wireless transmission and reception of meter and tank level information to make it simple to track the fluid dispensing of an entire facility. Fluid management systems can also include an authorization control that prevents fluid dispensing without prior authorization.

Fluid management systems typically include a pump control and a dispensing point, such as a dispense meter. The software controlling the fluid management system may be operated from a personal computer ("PC") or other computing platform. The PC can be located near the fluid dispensing point, such as at a vehicle technician work station, for example, or in various other locations. The PC may be configured to communicate, and in many cases, control at least one other component in the fluid management system, such as the dispense meter, the pump control, and/or a tank monitor. The PC may also be configured to collect, aggregate, analyze, and report fluid usage and statistics. The PC may also include a transceiver configured to communicate with the fluid management system hardware through a wireless network.

PC-based software for a fluid management system relies upon both the operating system of the PC and the communication hardware and software of the PC. If either the operating system or hardware of the PC is not operating properly, the fluid management software will not function. Updates to firewall security on the PC can prevent the fluid management software operating on the PC from connecting with the fluid management hardware, such as the fluid management pump or dispensing meter. Patches or updates to the PC operating system, fleet management system, or dealership management system, or an entirely new version of an operating system, can also affect the operation of the fluid management software and communication between the fluid management software and the fluid management hardware, and can prevent integration of the fluid management software and the fleet management software.

A fluid dispensing meter, also referred to as a metered valve or metering valve, can have different trigger designs. For example, a fluid dispensing meter can have a manual trigger or a pre-set fluid dispensing meter, which has a manual trigger but has the added functionality of automatically stopping a fluid dispense when a pre-set fluid dispense volume has been reached. Fluid dispensing meters can have the additional ability of preventing fluid dispenses until the meter has received dispense authorization via an RF signal that activates the trigger mechanism. The fluid dispensing meter can include a trigger actuation solenoid that controls activation of the trigger mechanism.

The fluid dispensing meter receives fluid from the bulk storage drum and dispenses a desired volume of the fluid at a desired location. The user can use the user interface of the handheld meter to communicate with a central fluid monitoring computer to track and record the volume of fluid dispensed from the bulk containers. In current handheld meters, the user interface includes a button elevated above the handle, such that users typically set the handheld meter on the ground prior to inputting information. In addition, the display screen is susceptible to damage if the handheld meter is dropped or otherwise collides with an object.

The fluid dispensing meter can require a user to enter a PIN code to authorize activation of the trigger mechanism by the solenoid. Current fluid management systems require the user to enter a PIN code on the meter interface to activate the meter, identify the technician, and perform a fluid dispense. Similarly, the user is required to enter a work order number or scroll through a list of work orders on the meter interface screen to select the work order that the dispense is associated with. Both entering a PIN to activate the trigger mechanism and associating a work order with the dispense event are cumbersome and time consuming.

The fluid dispensing meter can also require that the work order and the fluid dispense parameters associated with the work order (e.g., amount of fluid to be dispensed, type of fluid, etc.) be sent to the fluid dispensing meter over a Wi-Fi network. Current fluid management systems create a work order in a database, which is then transmitted to the metered valve over the Wi-Fi network. Typically, the user is required to enter a work order number using the keypad of the fluid dispensing meter or to scroll through a list of work orders on the meter interface screen to select the appropriate work order for that dispense event. Both entering a PIN to activate the trigger mechanism and associating a work order with the dispense event are cumbersome and time consuming. Further, a Wi-Fi or similar network may not be available, practical to install, and/or economical.

A valve is disposed within the fluid dispensing meter and controls the flow of fluid through the device. The valve can be controlled by a trigger. The valve can be a manual valve, controlled on and off by a manual trigger; a pre-set metered valve, which includes a manual trigger but the valve automatically closes after a pre-set volume of fluid has been dispensed; or a metered valve, where the trigger cannot activate the valve until the handheld meter receives a dispense authorization. When the valve is initially activated, a control seal can shift into the fluid inlet, where high-velocity fluid impingement can cause the control seal to become displaced and unseated. When the valve closes, the control seal can experience scarfing when the control seal encounters a sharp edge geometry. Scarfing most commonly occurs when the valve is quickly modulated between slightly-open and slightly-closed positions, such as when the user is topping off the fluid at the end of a fluid dispense event. The valve also includes a top dynamic seal that can have minor leaking during valve reciprocation. The minor leakage can occur due to seal cross-sectional rotation due to valve reciprocation and because the top dynamic seal is always experiencing fluid pressure. In addition, the top dynamic seal contacts the cast housing of the handheld meter and can experience leakage due to the porosity of the cast housing.

Dynamic pressure forces can also exert a higher force on an upper portion of the valve than the lower portion of the valve, which can overcome the spring force that shifts the valve to the closed position. The valve can thus become stuck in the open position due to pressure imbalances within the valve chamber.

To replace the valve, the trigger is removed from the trigger control mechanism. The electronics bezel housing must be removed to provide access to the trigger mechanism pivot point. As such, the bezel housing and various other components of the handheld meter must be removed prior to replacing the valve. In addition, residual oil can remain in the valve cavity during valve replacement. The residual oil can migrate through the valve when the valve is reinstalled and can appear to the user as a new leak, even where there is no leak in the valve.

The fluid is dispensed out of the handheld meter through a nozzle. The nozzle includes an acetal seat on which a rounded, steel nozzle stem seats. The nozzle can experience leakage when contaminants are present in the fluid. In addition, the nozzle can experience fluid sputtering and/or stream fanning at high flow rates, and the nozzle can experience latent dripping of the fluid that remains in the nozzle tip when the nozzle stem shifts to the closed position.

SUMMARY

According to one aspect of the disclosure, a fluid management system includes at least one fluid management component; a user interface device; and a fluid management controller configured to communicate wirelessly with the at least one fluid management component, authorize the at least one fluid management component to initiate a dispense event, and collect data received from the at least one fluid management component.

According to another aspect of the disclosure, a method includes authorizing, by a fluid management controller, a first dispense event; collecting, by the fluid management controller, first fluid data regarding the first dispense event from at least one fluid management component, wherein the fluid management controller is configured to communicate wirelessly with the at least one fluid management component; and providing access, by the fluid management controller, to the first fluid data by a user interface device.

According to yet another aspect of the disclosure, a fluid management controller includes a processor; a wireless transceiver configured to enable wireless communication between the fluid management controller and one or more fluid management components; and a computer readable memory encoded with instructions that, when executed by the processor, cause the fluid management controller to authorize the at least one fluid management component to initiate a dispense event, and collect data received from the at least one fluid management component.

According yet another aspect of the disclosure, a fluid dispensing meter includes a trigger control mechanism, a data receiver, and a control board. The trigger control mechanism is mounted in a body of the fluid dispensing meter and is controllable between an activated state, where the fluid dispensing meter can dispense fluid, and a deactivated state, where the fluid dispensing meter is prevented from dispensing fluid. The data receiver is mounted on the fluid dispensing meter and is configured to receive data from an external data source. The control board includes a processor, and a memory encoded with instructions that, when executed by the processor, cause the processor to recall approved user identities from the memory, to compare the approved user identities to user-identification data received from an external data source, and to control the trigger control mechanism between the activated state and the deactivated state based on the comparison of the user-identification data and the approved user identities.

According to yet another aspect of the disclosure, a fluid management system includes an external data source configured to generate a user-identification signal that includes user-identification data, and a fluid dispensing meter. The fluid dispensing meter includes a trigger control mechanism, a data receiver, and a control board. The trigger control mechanism is mounted in a body of the fluid dispensing meter and is controllable between an activated state, where the fluid dispensing meter can dispense fluid, and a deactivated state, where the fluid dispensing meter is prevented from dispensing fluid. The data receiver is mounted on the fluid dispensing meter and is configured to receive data from the external data source. The control board includes a processor, and a memory encoded with instructions that, when executed by the processor, cause the processor to recall approved user identities from the memory, to compare the approved user identities to user-identification data received from an external data source, and to control the trigger control mechanism between the activated state and the deactivated state based on the comparison of the user-identification data and the approved user identities.

According to yet another aspect of the disclosure, a method of authorizing a fluid dispense includes receiving user-identification data at a processor of a fluid dispensing meter, the user-identification data configured to identify a user; recalling, from a memory of the fluid dispensing meter, a list of authorized users and comparing, with the processor, the user-identification data and the list of authorized users; determining, with the processor, an authorization status of the user based on the comparison of the user-identification data and the list of authorized users; and controlling, with the processor, a trigger control mechanism of the fluid dispensing meter between an activated state and a deactivated state based on the authorization status of the user.

According to yet another aspect of the disclosure, a control valve for a handheld fluid meter includes a valve cartridge and a valve stem disposed in the valve cartridge. The valve cartridge includes a cartridge body extending between a first end and a second end and having a first circumferential flow passage in the first end and a second circumferential flow passage in the second end, a radial inlet extending through the first end into the first circumferential flow passage, a radial outlet extending through the second end into the second circumferential flow passage, and a control seat disposed about an interior of the cartridge body between the first circumferential flow passage and the second circumferential flow passage. The valve stem includes an upper portion disposed within the first end, a lower portion disposed within the second end, an elongate portion extending between and connecting the upper portion and the lower portion, and a control seal. The upper portion includes an annular control seal groove. The lower portion includes an actuating tip extending out of the second end of the valve cartridge. The control seal is disposed in the control seal groove and is configured to be engaged with the control seat with the valve stem in a closed position and to be disengaged from the control seat with the valve stem in an open position.

According to yet another aspect of the disclosure, a handheld fluid meter includes a meter body, a fluid inlet extending into the meter body, a valve chamber extending into the meter body and having a first circumferential flow passage and a second circumferential flow passage, a valve inlet extending fluidly connecting the fluid inlet and the first circumferential flow passage, a valve outlet extending downstream out of the valve chamber from the second circumferential flow passage, and a valve disposed in the valve chamber. The valve includes a valve cartridge and a valve stem disposed in the valve cartridge. The valve cartridge includes a cartridge body extending between a first end and a second end and having a third circumferential flow passage in the first end and a fourth circumferential flow passage in the second end, a radial inlet extending through the first end, a radial outlet extending through the second end, and a control seat disposed about an interior of the cartridge body between the third circumferential flow passage and the fourth circumferential flow passage. The radial inlet extends between the first circumferential flow passage and the third circumferential flow passage. The radial outlet extends between the second circumferential flow passage and the fourth circumferential flow passage. The valve stem includes an upper portion disposed within the first end a lower portion disposed within the second end, an elongate portion extending between and connecting the upper portion and the lower portion, and a control seal. The upper portion includes an annular control seal groove. The lower portion includes an actuating tip extending out of the second end of the valve cartridge. The control seal is disposed in the control seal groove and is configured to be engaged with the control seat with the valve stem in a closed position and to be disengaged from the control seat with the valve stem in an open position.

According to yet another aspect of the disclosure, a nozzle includes a connector having a seating end and a connector bore extending through the connector, a nozzle body attached to the connector, and a nozzle stem. The nozzle body includes a receiving end, a dispensing end disposed opposite the receiving end and defining a fluid outlet, and a nozzle bore extending through the nozzle body between the receiving end and the dispensing end, wherein the seating end extends into the nozzle bore and is connected to the receiving end. The fluid outlet includes an upstream portion having a first diameter, a downstream portion having a second diameter smaller than the first diameter, and a connecting portion extending between and connecting the upstream portion and the downstream portion. The connecting portion is a cone-shaped passage. The nozzle stem is disposed in the nozzle bore between the seating end and the fluid outlet. The nozzle stem includes an overmolded tip. The overmolded tip includes a tip cone configured to mate with and seal against the cone-shaped passage with the nozzle stem in a closed position.

According to yet another aspect, a nozzle stem includes an inlet tube, a stem flange extending radially from the inlet tube, a flange groove extending into an outer edge of the stem flange, at least one flow passage extending through a wall of the inlet tube on a downstream side of the stem flange, and a stem tip extending downstream from the inlet tube. The flange groove is configured to receive a seal. The stem includes a main tip body extending from the inlet tube, a reduced diameter portion extending from the main tip body, and an overmolded tip seal disposed on the reduced diameter portion. The overmolded tip seal includes a sealing portion and a tip cone extending from the sealing portion.

According to yet another aspect of the disclosure, a handheld fluid meter for use in an oil bar includes a meter body having a handle, a fluid inlet extending into the handle, and a fluid outlet extending out of an end of the meter body opposite the handle; a trigger configured to be manually displaced to control a flow of fluid between the fluid inlet and the fluid outlet; a bezel housing mounted on the meter body, the bezel housing including a display opening; a display screen fixedly mounted within the display opening; a user input fixedly mounted on the bezel housing, the user input including a plurality of buttons; display circuitry configured to provide a visual output at the display screen in a plurality of orientations; user input circuitry configured to receive inputs from a user via the plurality of buttons to modify the visual output of the display screen; and control circuitry connected to communicate with the display circuitry and the user input circuitry, the control circuitry configured to receive an input regarding a desired orientation of the visual output from the user input circuitry and to provide instructions to the display circuitry to modify the orientation of the visual output.

According to yet another aspect of the disclosure, a dispense assembly for use in an oil bar includes a handheld fluid meter and a manifold configured to be mounted in an oil bar, the manifold including a manifold inlet opening and a manifold outlet opening. The handheld fluid meter includes a meter body having a handle, a fluid inlet extending into the handle, and a fluid outlet extending out of an end of the meter body opposite the handle; a trigger configured to be manually displaced to control a flow of fluid between the fluid inlet and the fluid outlet; a bezel housing mounted on the meter body, the bezel housing including a display opening; a display screen fixedly mounted within the display opening; a user input fixedly mounted on the bezel housing, the user input including a plurality of buttons; display circuitry configured to provide a visual output at the display screen in a plurality of orientations; user input circuitry configured to receive inputs from a user via the plurality of buttons to modify the visual output of the display screen; and control circuitry connected to communicate with the display circuitry and the user input circuitry, the control circuitry configured to receive an input regarding a desired orientation of the visual output from the user input circuitry and to provide instructions to the display circuitry to modify the orientation of the visual output. The handheld fluid meter is mounted on the manifold such that the handle extends vertically above the display.

According to yet another aspect of the disclosure, an oil bar assembly includes a frame having a first side support member, a second side support member, and a back panel, the back panel extending between and connecting the first side support member and the second side support member; a front panel extending between and attached to the first side support member and the second side support member, wherein the front panel and the back panel define a plenum, and wherein a dispenser opening extends through the front panel, and dispense assembly mounted to the front panel. The dispense assembly includes a handheld fluid meter, a manifold having a manifold inlet opening and a manifold outlet opening, the manifold disposed within the plenum and attached to the front panel. The dispense assembly further includes an outlet fitting, a manifold inlet adapter extending between and connecting the outlet fitting and the manifold inlet opening, a manifold outlet adapter extending through the dispenser opening and connected to the manifold outlet opening, a swivel elbow connecting the manifold outlet adapter; and a nozzle connected to the swivel elbow. The handheld fluid meter includes a meter body having a handle, a fluid inlet extending into the handle, and a fluid outlet extending out of an end of the meter body opposite the handle; a trigger configured to be manually displaced to control a flow of fluid between the fluid inlet and the fluid outlet; a bezel housing mounted on the meter body, the bezel housing including a display opening; a display screen fixedly mounted within the display opening; a user input fixedly mounted on the bezel housing, the user input including a plurality of buttons; display circuitry configured to provide a visual output at the display screen in a plurality of orientations; user input circuitry configured to receive inputs from a user via the plurality of buttons to modify the visual output of the display screen; and control circuitry connected to communicate with the display circuitry and the user input circuitry, the control circuitry configured to receive an input regarding a desired orientation of the visual output from the user input circuitry and to provide instructions to the display circuitry to modify the orientation of the visual output.

According to yet another aspect of the present disclosure, a fluid dispensing meter includes a trigger control mechanism mounted in a body of the fluid dispensing meter, a near field communications (NFC) data receiver mounted on the fluid dispensing meter, and a control board disposed within a bezel housing mounted on the fluid dispensing meter. The trigger control mechanism is controllable between an activated state, where the fluid dispensing meter can dispense fluid, and a deactivated state, where the fluid dispensing meter is prevented from dispensing fluid. The NFC data receiver configured to receive data from an external data source. The control board includes a processor; and a memory encoded with instructions that, when executed by the processor, cause the processor to control the trigger control mechanism between the activated state and the deactivated state based on the data received from the external data source.

According to another aspect of the present disclosure, a fluid management system includes a near field communication (NFC) programming unit; an NFC data source, the NFC data source configured to receive dispense data from the NFC programming unit; and a fluid dispensing meter. The fluid dispensing meter includes a trigger control mechanism mounted in a body of the fluid dispensing meter, an NFC data receiver mounted on the fluid dispensing meter; and a control board disposed within a bezel housing mounted on the fluid dispensing meter. The trigger control mechanism is controllable between an activated state, where the fluid dispensing meter can dispense fluid, and a deactivated state, where the fluid dispensing meter is prevented from dispensing fluid. The NFC data receiver configured to receive the dispense data from the NFC data source. The control board includes a processor; and a memory encoded with instructions that, when executed by the processor, cause the processor to control the trigger control mechanism between the activated state and the deactivated state based on the dispense data received from the NFC data source.

According to yet another aspect of the present disclosure, a method of authorizing a fluid dispense includes generating, at a near field communication (NFC) programming unit, dispense-identification data for a fluid dispense event; writing, by the NFC programming unit, the dispense-identification data to an NFC data source; placing the NFC data source within an operable range of an NFC receiver disposed on a fluid dispensing meter; providing, by the NFC receiver, the dispense-identification data to a processor of the fluid dispensing meter; and controlling, with the processor, a trigger control mechanism of the fluid dispensing meter between an activated state and a deactivated state based on the dispense-identification data.

According to yet another aspect of the present disclosure, a controller is intended for use with a fluid dispensing meter including a trigger control mechanism mounted in a body of the fluid dispensing meter, the trigger control mechanism controllable between an activated state, where the fluid dispensing meter can dispense fluid, and a deactivated state. The controller includes a control board having a processor, and a memory encoded with instructions that, when executed by the processor, cause the processor to control the trigger control mechanism between the activated state and the deactivated state based on dispense data received from an external data source. A near field communication (NFC) data receiver is in communication with the control board, the NFC data receiver is configured to receive the dispense data from the external data source.

BRIEF DESCRIPTION OF THE DRAWINGS

FIG. 4B is an isometric view of a fluid management controller.

DETAILED DESCRIPTION

Figure 1:
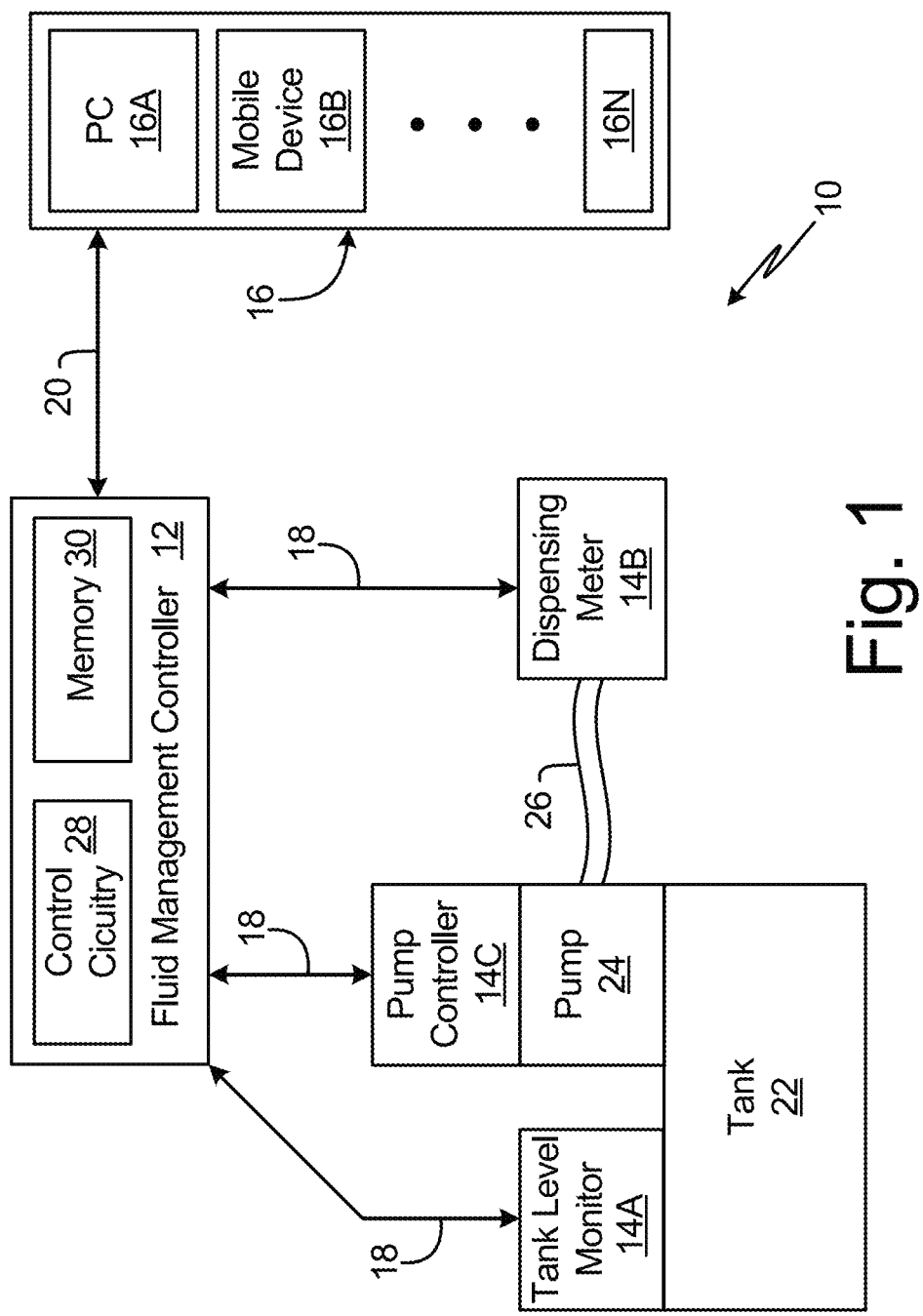
FIG. 1 is a block diagram of a fluid management system.

FIG. 1 is a schematic block diagram of fluid management system 10. Fluid management system 10 includes fluid management controller 12, fluid management components 14A-C (collectively herein "fluid management components 14"), user interface devices 16A-N (collectively herein "user interface devices 16"), communication links 18 and 20, tank 22, pump 24, and supply hose 26. Fluid management controller 12 includes control circuitry 28 and memory 30. Fluid management components 14 include tank level monitor 14A, dispensing meter 14B, and pump controller 14C. User interface devices 16 include any suitable processor-based devices for communicating with fluid management controller 12, such as personal computer (PC) 16A, mobile device 16B, and other mobile communication devices and organizer devices 16N. PC 16A can be a desktop, laptop, personal digital assistant, table computer, or other such device. Mobile device 16B can be a smartphone, tablet, or other such device.

Fluid management system 10 is a system for dispensing fluid and tracking fluid dispenses. For example, fluid management system 10 can be implemented in an automotive shop to dispense and track oil, coolant, and other automotive fluid dispenses. Tank level monitor 14A is attached to tank 22 and, in some examples, can extend into tank 22. Tank level monitor 14A senses fluid level in tank 22 and is configured to communicate the tank level information to fluid management controller 12 over communication link 18. Pump 24 is configured to drive fluid downstream from tank 22 to dispensing meter 14B through supply hose 26. Pump controller 14C is connected to pump 24 and controls the activation of pump 24. In some examples, pump controller 14C is located remotely from tank 22 and pump 24. For example, where pump 24 is a pneumatic pump, pump controller 14C can be an air control unit configured to control the air supply to pump 24 and/or pressurization to tank 22 to prevent unauthorized dispenses and spills.

Fluid management controller 12 communicates with fluid management components 14 via communication links 18. Communication links 18 can be individual connections, grouped connections, or a combination thereof. At least one of communication links 18 is a wireless connection. While illustrated in FIG. 1 as multiple communication links 18, in some examples, fluid management components 14 can communicate with fluid management controller 12 over a common communication network. In some examples, communication links 18 can be wireless communication links. For example, fluid management controller 12 can host a wireless personal area network (PAN) that includes fluid management components 14. It is understood, however, that while fluid management controller 12 can host a wireless PAN and communicate over the wireless PAN the communications can also be sent over an existing network, such as a local intranet and/or the Internet.

Fluid management controller 12 communicates with user interface devices 16 via communication link 20, which can be a wired or wireless connection. In some examples, communication link 20 can be part of the same network as communication links 18, or can be a direct connection such as an Ethernet connection. In one example, both communication links 18 and communication links 20 can be part of the wireless PAN hosted by fluid management controller 12.

Fluid management controller includes control circuitry 28 and memory 30. In some examples, control circuitry 28 and memory 30 are disposed on the same circuit board, such that fluid management controller 12 is a single-board computer ("SBC"). In other examples, memory 30 may be an external memory device such as external hard drive, flash drive, memory card, or other such device. Control circuitry 28 is configured to implement functionality and/or process instructions. For instance, control circuitry 28 can be capable of processing instructions stored in memory 30. Examples of control circuitry 28 can include any one or more of a microprocessor, a controller, a digital signal processor (DSP), an application specific integrated circuit (ASIC), a field-programmable gate array (FPGA), or other equivalent discrete or integrated logic circuitry.

Memory 30, in some examples, can be configured to store information during operation. Memory 30, in some examples, is described as a computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in random access memory (RAM) or cache). In some examples, memory 30 is a temporary memory, meaning that a primary purpose of memory 30 is not long-term storage. Memory 30, in some examples, is described as volatile memory, meaning that memory 30 does not maintain stored contents when power to fluid management controller 12 is turned off. Examples of volatile memories can include random access memories (RAM), dynamic random access memories (DRAM), static random access memories (SRAM), and other forms of volatile memories. In some examples, memory 30 is used to store program instructions for execution by control circuitry 28. Memory 30, in one example, is used by software or applications running on fluid management controller 12 to temporarily store information during program execution.

Memory 30, in some examples, also includes one or more computer-readable storage media. Memory 30 can be configured to store larger amounts of information than volatile memory. Memory 30 can further be configured for long-term storage of information. In some examples, memory 30 includes non-volatile storage elements such as read only memory (ROM). Examples of such non-volatile storage elements can include magnetic hard discs, optical discs, floppy discs, flash memories, or forms of electrically programmable memories (EPROM) or electrically erasable and programmable (EEPROM) memories.

Fluid management controller 12 provides a central hub for data collection and processing for fluid management, tracking, and control in fluid dispense applications involving fluid management components 14. Fluid management controller 12 provides a closed system capable of independently tracking and controlling fluid dispenses within fluid management system 10. Fluid management components 14 sense the level of fluid in fluid management system 10, drive the fluid to dispense locations, dispense the fluid, sense the volume of fluid dispensed, and communicate the sensed information to fluid management controller 12.

Fluid management controller 12 communicates with fluid management components 14 to collect, aggregate, analyze, and report fluid usage and statistics. Tank level monitor 14A senses the volume of fluid in tank 22 and communicates the tank level information to fluid management controller 12 via communication link 18. Pump controller 14C communicates with fluid management controller 12 via communication link 18, and activates and deactivates pump controller 14C to activate and deactivate pump 24.

While activated, pump 24 draws fluid from tank 22 and drives the fluid downstream to dispensing meter 14B through supply hose 26. Dispensing meter 14B dispenses the fluid from tank 22 at a desired dispense location and senses the amount of the fluid dispensed. Fluid management controller 12 communicates with dispensing meter 14B via communication link 18. In one example, fluid management controller 12 receives work order information from dispensing meter 14B and is configured to authorize a dispense volume based on that work order information. With the dispense event authorized by fluid management controller 12, components within dispensing meter 14B activate dispensing meter 14B such that the user can dispense the fluid with dispensing meter 14B. Dispensing meter 14B dispenses the fluid up to the authorized dispense volume and communicates the volume of fluid dispensed to fluid management controller 12. The components in dispensing meter 14B deactivate dispensing meter 14B when the actual volume dispensed reaches the authorized dispense volume. Fluid management controller 12 tracks and records the volumes dispensed and associates that information with the work order. Fluid management controller 12 also records the dispense information and can aggregate data from multiple fluid dispense events for system-wide fluid tracking and management.

Memory 30 stores software that, when executed by control circuitry 28, collects and sorts the information provided to fluid management controller 12 via communication links 18. Fluid management controller 12 stores the information from fluid management components 14 in memory 30. The information can include fluid management information such as customer job order information, fluid storage configurations, login information, fluid level information, the dispense volume for each fluid dispense event, and user information. The information can be sorted by user, work order, fluid type, volume, or any other parameter that is desired.

The information stored in memory 30 is accessible by user interface devices 16 via communication link 20. For example, user interface devices 16 can access fluid data from memory 30 via HTML webpages viewable in common browsers for user interface devices 16 via communication link 20. Fluid management controller 12 can provide the HTML code for user interface devices 16 to interface with fluid management controller 12. Additionally, the user can access and modify the operating parameters of fluid management system 10 by accessing fluid management controller 12 through the webpage generated and presented by fluid management controller 12.

By way of example, a fluid dispense event is discussed. A customer-specific work order is generated by a user using user interface device 16. The work order information is provided to fluid management controller 12 over communication link 20. The work order information can include, among others, the specific fluid to be dispensed, users authorized to make the dispense, the volume of fluid to be dispensed, and customer identifying information. Fluid management controller 12 stores the work order information in memory 30.

The user selects a dispensing meter 14B associated with the specific fluid specified in the work order. The user enters log-in information at dispensing meter 14B, such as a pin code or ID card. Fluid management controller 12 receives the log-in information from dispensing meter 14B over communication link 18 and associates the log-in information with the work order. The log-in information provides a security measure to prevent unauthorized users from dispensing fluid and to prevent the user from inadvertently dispensing an undesired fluid. Fluid management controller 12 authorizes the dispense event based on the work order information and the log-in information. In some examples, fluid management controller 12 saves the user information, time of login, and authorization status of the user in memory 30 for system-wide tracking and dispense event tracking.

Fluid management controller 12 controls activation of fluid management components 14 based on the work order information. For example, fluid management controller 12 can send a dispense authorization signal to dispensing meter 14B via communication link 18 to unlock a trigger of dispensing meter 14B. Fluid management controller 12 also sends a pump authorization signal to pump controller 14C to activate pump controller 14C via communication link 18. Pump controller 14C activates pump 24, and pump 24 draws fluid from tank 22 and drives the fluid downstream to dispensing meter 14B through supply hose 26. In one example, pump controller 14C provides pressurization only to tank 22 which is associated with the dispense event. Pump controller 14C can be further configured to provide pressurization for only as long as required to dispense the approved volume of fluid. The user dispenses the fluid with dispensing meter 14B, and dispensing meter 14B communicates relevant dispense information, such as the actual volume dispensed, to fluid management controller 12 via communication link 18.

Throughout the dispense event, tank level monitor 14A senses the fluid levels in tank 22 and communicates the tank level information to fluid management controller 12 via communication link 18. Fluid management controller 12 saves the fluid level information provided by tank level monitor 14A in memory 30. Fluid management controller 12 also saves the actual dispense volume sensed by dispensing meter 14B in memory 30. Fluid management controller 12 also saves pump information provided by pump controller 14C. When the user has completed the dispense event, such as when the actual volume dispensed reaches the authorized dispense volume, dispensing meter 14B deactivates based on that actual volume dispensed reaching the authorized dispense volume. Fluid management controller 12 sends a signal to pump controller 14C via communication link 18 to deactivate pump 24. The fluid dispense event is thus complete.

Fluid management controller 12 presents HTML code that the user can access through a web browser on user interface device 16 via communication link 20. The user can access the dispense information associated with a specific dispense event and/or can access system-wide fluid information via user interface device 16. For example, the user can open the web browser on mobile device 16B to access the website. Through the website, the user can access the information stored in memory 30 regarding the tank fluid levels, the login information, the temporal length of dispenses, the amount of fluid dispensed, the date and time of the dispense, or any other relevant fluid information gathered by fluid management controller 12 from fluid management components 14.

In some examples, fluid management controller 12 aggregates data from multiple fluid dispense events and can generate and send reports to the user based on the aggregated fluid information. In one example, fluid management controller 12 can include reporting parameters and can generate the reports based on the reporting parameters. The reporting parameters can be based on any desired parameter, such as the tank level information, temporal boundaries, the number of dispenses completed, and the total volume dispensed, among others. For example, where the reporting parameter is temporal in nature, fluid management controller 12 can provide system-wide reports daily, weekly, monthly, or based on any other temporal boundary set by the user. In examples where the reporting parameter is based on tank level information, fluid management controller 12 can provide the system-wide reports based on the fluid level in tank 22 reaching a resupply volume such that additional fluid is required in tank 22. In some examples, fluid management controller 12 is configured to take independent action based on the reporting parameter, such as by ordering additional fluid from a fluid supplier based on the tank level information reaching the resupply volume.

The user can further modify and change the settings of fluid management system 10 through the website via user interface devices 16. For example, the user can set or remove maximum dispensing limits, add or remove authorized users, set reporting parameters and/or make other such changes to fluid management system 10. Fluid management controller 12 provides independent operation and control of fluid management system 10.

Fluid management controller 12 provides significant advantages. Fluid management controller 12 communicates with fluid management components 14 and user interface devices 16 independently of other devices and management systems. As such, fluid management system 10 operates independent of a dedicated PC application, fleet management system, and/or dealership management system. No installation of an executable file or a PC application is required; only initial configuration and registration of fluid management controller 12 is required. Fluid management controller 12 can be configured to send reports to user interface devices 16 via communication link 20. Fluid management controller 12 is a closed system requiring no wired connections to dispense, monitor, or control fluid management components 14. Instead, fluid management controller 12 communicates wirelessly with fluid management components 14. In some examples, communication links 18 and 20 are part of a wireless network, such as a wireless PAN. Fluid management controller 12 can host a web application to communicate with user interface devices 16 using standard browser technology. The closed nature of fluid management controller 12 bypasses issues related to operating system updates, firewalls, and user error related to erroneous PC usage on traditional dedicated PC applications, fleet management systems, and/or dealership management systems.

Figure 2:
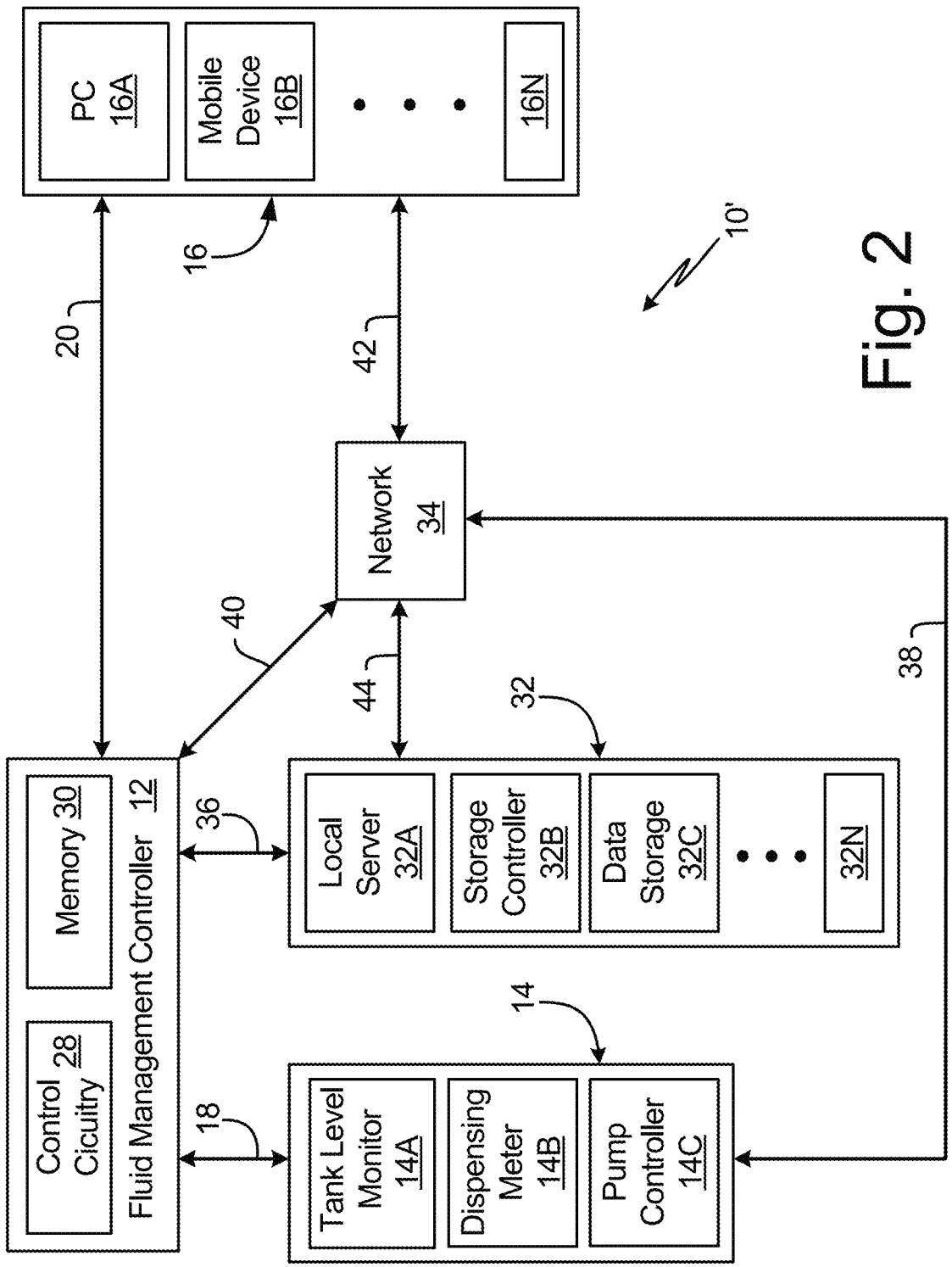
FIG. 2 is a block diagram of a fluid management system and a local management system.

FIG. 2 is a schematic block diagram of fluid management system 10' including local management system 32. Fluid management system 10' includes fluid management controller 12, fluid management components 14, user interface devices 16, local management system 32, network 34, and communication links 18, 20, 36, 38, 40, 42, and 44.

Fluid management controller 12 provides a central hub for data collection and processing for fluid management, tracking, and control in fluid dispense applications involving fluid management components 14. Fluid management components 14 monitor, sense, and distribute fluid throughout fluid management system 10'. Fluid management controller 12 wirelessly communicates with fluid management components 14. Fluid management components 14 can communicate directly with fluid management controller 12 via communication link 18 and/or can communicate with fluid management controller 12 over network 34, via communication links 38 and 40.

Fluid management system 10' includes local management system 32, which is a local customer network, such as an intranet for an automotive shop. For example, local management system 32 can be a PC, fleet management system, dealership management system, commercial management system, or other such system. Local management system 32 includes local server 32A, storage controller 32B, and data storage device 32C. Storage controller 32B is configured to manage data communications between data storage 32C and other components of local management system 32. Local management system 32 can also include other components 32N that work to support local management functions, such as other aspects of a business. Communication link 36 is a direct connection between fluid management controller 12 and local management system 32. Communication links 18, 20, and 36 can be part of a network, such as a wireless personal area network (PAN), which, in some examples, can be hosted by fluid management controller 12.

Network 34 facilitates communications of data between fluid management controller 12 and local management system 32, user interface devices 16, and fluid management components 14. Network 34 includes communication links 38, 40, 42, and 44, and can be a local area network (LAN), a wide area network (WAN), a modem-to-modem connection, a cellular network, a combination of the above, or any other communications network now known or later developed within the networking arts which permits two or more computers to communicate, one with another.

The data communicated over network 34 can include, among others, fluid management information such as customer job order information, fluid storage configurations, fluid level information, the dispense volume for each fluid dispense event, and user information. User interface devices 16 connect to network 34 via communication link 42. Local management system 32 accesses network 34 via communication link 44. In one example, fluid management controller 12 can access local server 32A through an intermediate server (not shown). In a cloud application, for example, fluid management controller 12 can access an application server that fulfills requests from fluid management controller 12 by accessing a data management system. In one example, fluid management controller 12 executes a Java® application making requests to a JBoss® server executing on a Linux® server, which Linux® server fulfills the requests by accessing a relational database management system on a mainframe server. For example, the JBoss® server can receive customer information from a Java® application executing on mobile device 16B. The JBoss® server can retrieve customer vehicle service order information from local server 32A and determine if dispensing of at least one fluid has been authorized based on the work order information entered. Fluid management controller 12 can then authorize the fluid dispense event based on the information from the JBoss® server.

Memory 30 may store software that, when executed by control circuitry 28, collects and sorts the information provided to fluid management controller 12 by fluid management components 14, user interface devices 16, and local management system 32. Fluid management controller 12 stores the information from fluid management components 14 in memory 30.

As discussed above, fluid management controller 12 authorizes, tracks, and records information from fluid management components 14 regarding discrete fluid dispense events. The information is stored in memory 30, and fluid management controller 12 can also present the information to local management system 32 for local storage, such as in data storage 32C. Fluid management controller 12 may also host web applications that allow users to access data via user interface devices 16. In some examples, the user can directly access the information on fluid management controller 12 via communication link 20. In other examples, the user can access the information over network 34. Additionally, the user can modify and change the operating parameters of fluid management controller 12 via user interface devices 16.

Network 34 can also allow user interface devices 16 to retrieve locally-stored information in local management system 32, such as via communication links 42 and 44, and in fluid management controller 12, such as via communication links 42 and 40. In one example, fluid management controller 12 can pull information from local management system 32 directly via communication link 36 and/or over network 34 via communication links 44 and 40. Fluid management controller 12 can communicate that information to user interface devices 16 over network 34 via communication links 40 and 42 and/or directly via communication link 20.

In another example, fluid management controller 12 provides data to local management system 32 via communication link 36, and local management system 32 can host webpage on local server 32A. User interface devices 16 can access the webpage by connecting to local management system 32 over network 34 through communication links 42 and 44.

During a dispense event, a customer-specific work order can be generated by the user at user interface device 16. The work order can also be generated directly in local management system 32. The work order can be communicated directly to fluid management controller 12 via communication link 20 or over network 34. The work order information can also be stored on data storage 32C and recalled by fluid management controller 12 directly, via communication link 36, or over network 34. In some examples, the work order information is also stored directly in memory 30. Fluid management controller 12 authorizes the dispense event based on the work order information input by the user. Fluid management controller 12 communicates the authorization to fluid management components 14 either directly via communication link 18, or over network 34 via communication links 40 and 38. With the dispense event authorized, the user is able to dispense the fluid with the fluid management components 14.

Fluid management controller 12 receives information regarding the dispense event, such as the type of fluid dispensed; the volume of fluid dispensed; the volume of fluid remaining in the tank, such as fluid tank 22; the length of the dispense event; and the identity of the user; among others, from fluid management components 14. Fluid management controller 12 can store the dispense information in memory 30 and/or communicate the information for storage in local management system 32, such as directly via communication link 36 or over communication links 40, 44 and network 34.

Fluid management controller 12 gathers the information regarding the discrete dispense event and generates reports that are accessible to the user via a website hosted by fluid management controller 12. The user opens the web browser on user interface device 16 and connects to fluid management controller 12 directly via communication link 20 or over network 34 via communication links 40 and 42. Network 34 can provide user access to fluid management controller 12 where communication link 20 is not available.

Fluid management controller 12 is configured to generate individual reports regarding the discrete dispense event as well as system-wide reports. The system-wide reports provide the user with information regarding fluid management system 10'. In some examples, fluid management controller 12 is configured to automatically take action based on the system-wide report. For example, fluid management controller 12 can order additional fluid from a supplier where the tank level information provided by tank level monitor 14A indicates that the level of fluid has reached a resupply volume. Fluid management controller 12 can place orders over network 34.

The user can access the information stored in memory 30 via the website hosted by fluid management controller 12. Additionally, the user can modify and change the settings of fluid management system 10' via fluid management controller 12. For example, the user can set or remove maximum dispensing limits, modify authorized users, and/or implement other such changes to fluid management system 10'. In this way, fluid management controller 12 controls and authorizes fluid dispenses and monitors fluid management system 10' independently of local management system 32. As such, fluid management system 12 allows the user to continue generating work orders and dispensing fluid even where local management system 32 is offline.

Fluid management system 10' provides significant advantages. Fluid management controller 12 communicates with fluid management components 14 and user interface device 16 independently of local management system 32. Fluid management controller 12 is a closed system requiring no wired communication connections to dispense, monitor, or control fluid management components 14. Instead, fluid management controller 12 can communicate with user interface devices 16 through an HTML interface viewable using standard browser technology through communication link 20 and/or over network 34 via communication links 40 and 42. No installation of an executable file or a PC application is required; only initial configuration and registration of fluid management controller 12 is required. The closed nature of the fluid management controller 12 bypasses issues related to operating system updates, firewalls, and user error related to erroneous PC usage on traditional local management systems 32.

Figure 3:
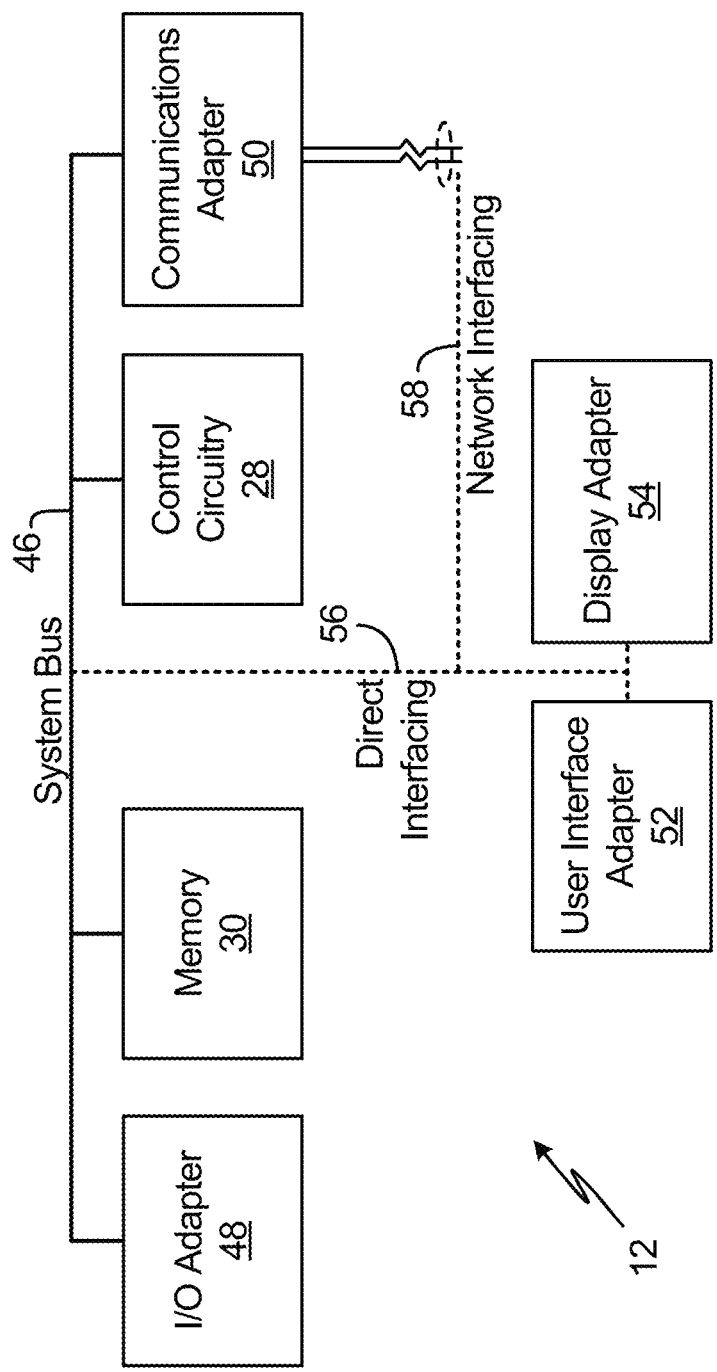
FIG. 3 is a block diagram of a fluid management controller.

FIG. 3 is a block diagram of fluid management controller 12. Fluid management controller 12 includes control circuitry 28, memory 30, system bus 46, input/output (I/O) adapter 48, communications adaptor 50, user interface adapter 52, display adapter 54, direct interfacing 56, and network interfacing 58.

Control circuitry 28, memory 30, I/O adapter 48, and communications adapter 50 can communicate with each other via system bus 46. User interface adapter 316 and display adapter 318 can connect to fluid management controller 12 via direct interfacing 56 and/or network interfacing 58. For example, direct interfacing 56 can include Ethernet, HDMI, or USB connections, for example. Network interfacing 58 can include wireless communications, such as via an HTML interface.

Memory 30 can include includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories. ROM can store configuration information for booting fluid management controller 12. Memory 30 can also include volatile memory, meaning that memory 30 does not maintain stored contents when power to fluid management controller 12 is turned off. Examples of volatile memories can include random access memories (RAM), dynamic random access memories (DRAM), static random access memories (SRAM), and other forms of volatile memories. Fluid management controller 12 can utilize RAM to store the various data structures used by a software application. RAM and ROM can store user and system data. Memory 30 can also include external storage devices. External storage devices can connect with fluid management controller 12 via I/O adapter 48.

Communications adapter 50 is configured to connect fluid management controller 12 to a network, such as network 34 (shown in FIG. 2). The network can be one or more of a LAN, WAN, and/or the Internet. Communications adapter 50 can further connect fluid management controller 12 to a storage device, such as data storage 32C (shown in FIG. 2).

User interface adapter 52 is configured to connect user input devices, such as a keyboard, mouse, touchscreen, or other similar input device to fluid management controller 12. Display adapter 54 is configured to connect to a display device, such as a monitor, to display information stored by fluid management controller 12. For example, a display connected through display adapter 54 may be configured to display a graphical user interface associated with a software or web-based application. In one example, menus allowing an administrator to input data on local server 32A through user interface adapter 52 may be displayed through display adapter 54.

While illustrated as a dedicated device, in other embodiments, fluid management controller 12 may be implemented on any suitable processor-based device including, without limitation, personal data assistants (PDAs), tablet computers, smartphones, computer game consoles, computer-on-module (COM), touch panel computers (TPC), and multi-processor servers. Moreover, fluid management controller can be implemented using application specific integrated circuits (ASIC), very large scale integrated (VLSI) circuits, or other circuitry.

Figure 4A:
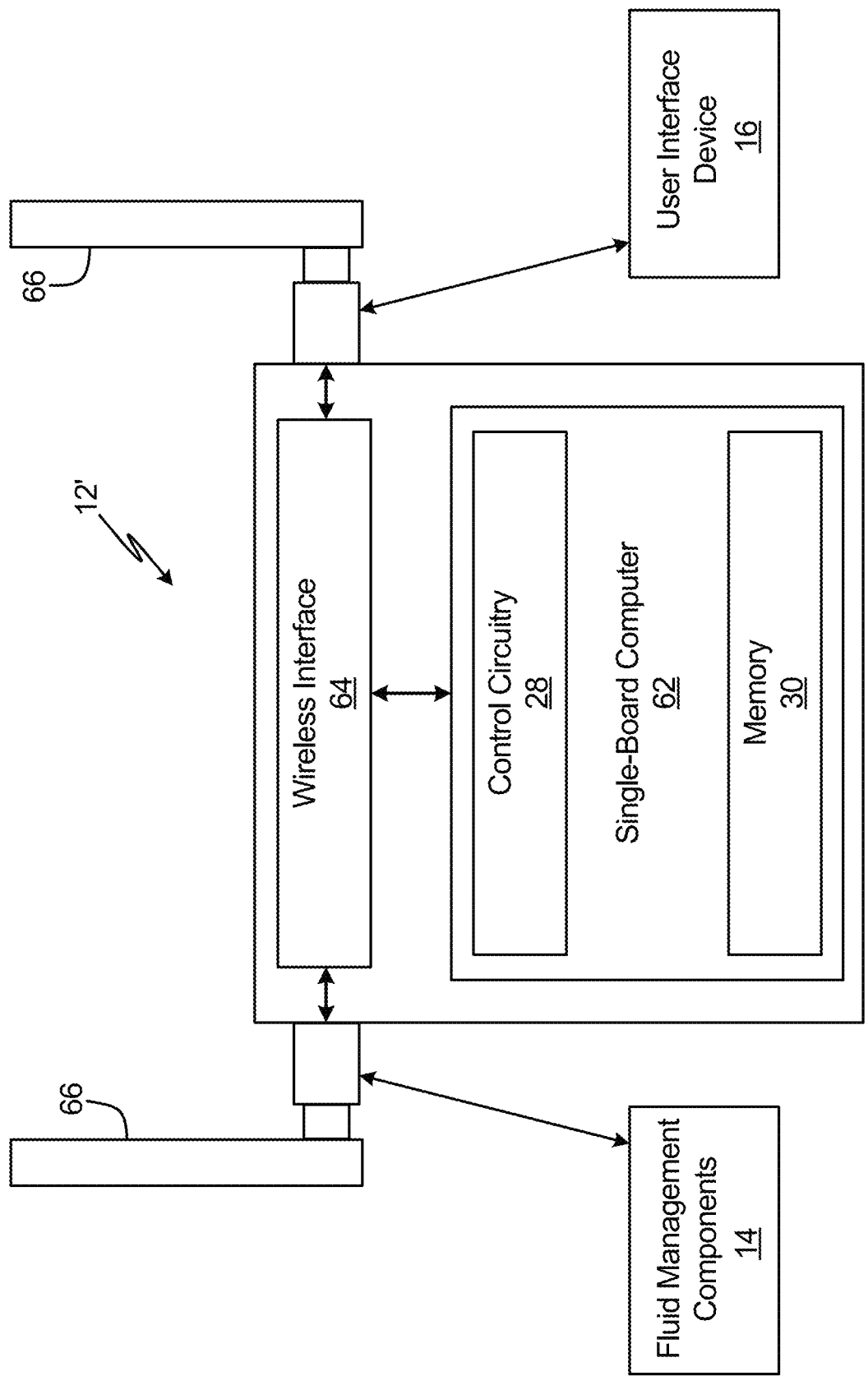
FIG. 4A is a schematic block diagram of a fluid management controller.

FIG. 4A is a schematic block diagram of fluid management controller 12'. FIG. 4B is an isometric view of fluid management controller 12'. Fluid management controller 12' includes casing 60, single-board computer (SBC) 62, wireless interface 64, and antennas 66. Fluid management controller 12' is configured to wirelessly communicate with fluid management components 14 and user interface devices 16 over communication links 18 and 20. SBC 62 includes control circuitry 28 and memory 30.

Fluid management controller 12' is protected by casing 60, which serves as an enclosure for SBC 62 and wireless interface 64. Casing 60 can include one or more pieces of bent sheet metal. In one example, casing 60 includes two pieces of bent sheet metal. SBC 62 and wireless interface 64 are connected and disposed within casing 60.

Wireless interface 64 and antennas 66 may form a transceiver, for example, that allows fluid management controller 12' to communicate wirelessly on communication links 18 and/or 20. Antennas 66 extend out from casing 60 and are configured to send and receive wireless signals to and from fluid management components 14 and/or user interface devices 16. Fluid management controller 12' can communicate on various bandwidths, such as 2.4 GHZ and 5 GHZ, for example. Additionally, fluid management controller 12' can communicate using cellular (e.g., LTE) bandwidths. Fluid management controller 12' can be configured to operate using any IEEE 802.11 standard, for example.

SBC 62, using control circuitry 28 and wireless interface 64, can host a network, which includes communication links 18 and 20. In one example, the network hosted by fluid management controller 12' is a wireless personal area network (PAN) interconnecting components 14 and devices 16. It is understood, however, that fluid management controller 12' can communicate wirelessly over a local network, such as network 34 (shown in FIG. 2). The network allows fluid management controller 12' to wirelessly communicate with, and control, fluid management components 14. Fluid management controller 12' can authorize control of fluid management components 14 over the network. Fluid management controller 12' can generate and communicate HTML code such that a webpage is accessible by user interface devices 16 for accessing data stored in memory 30.

While memory 30 is described as located on dedicated SBC 62, it is understood that memory 30 can be disposed separate from SBC 62, such as where memory 30 is a removable memory card, for example. Memory 30 is encoded with instructions that, when executed by control circuitry 28, cause fluid management controller 12' to communicate with and control fluid management components 14 and record information in memory 30. User interface devices 16 are configured to access the recorded information from memory 30 via communication link 20.

Figure 5A:
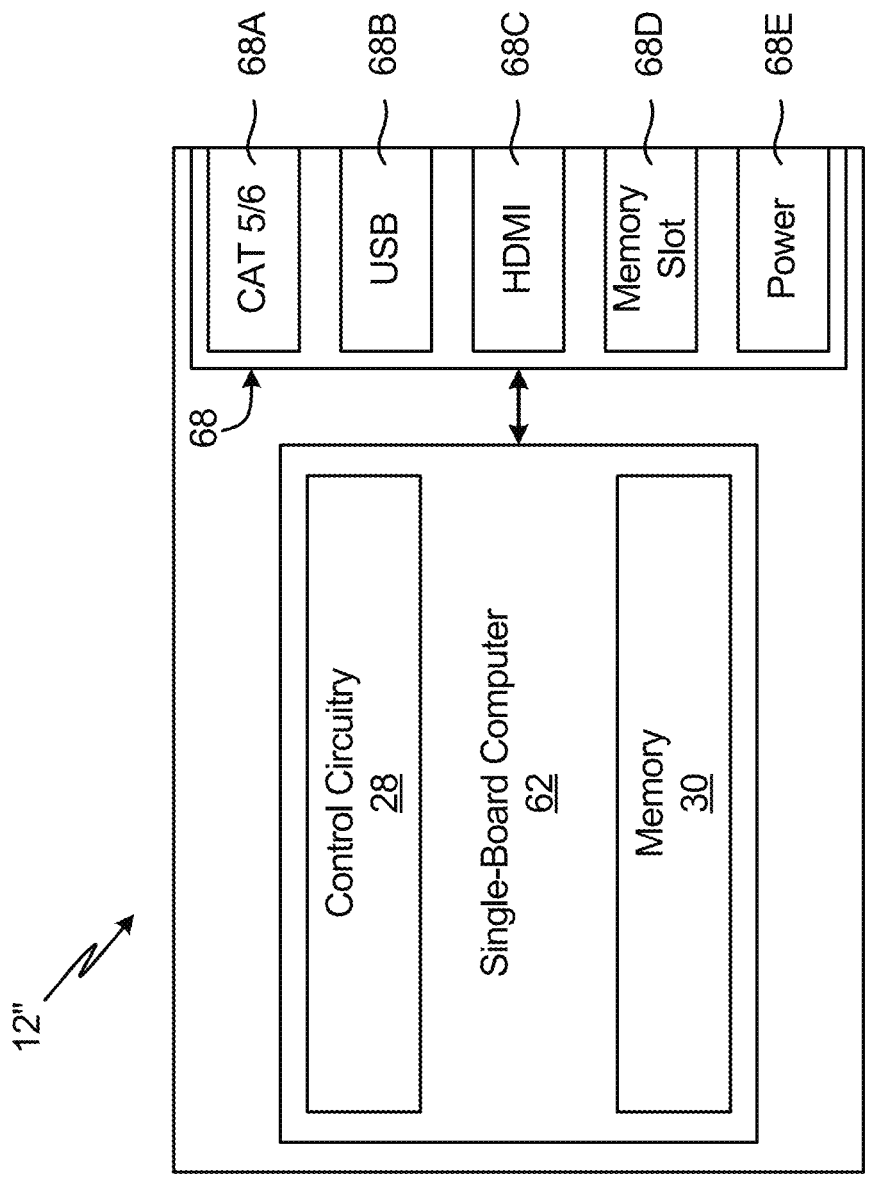
FIG. 5A is a schematic block diagram of a fluid management controller.
Figure 5B:
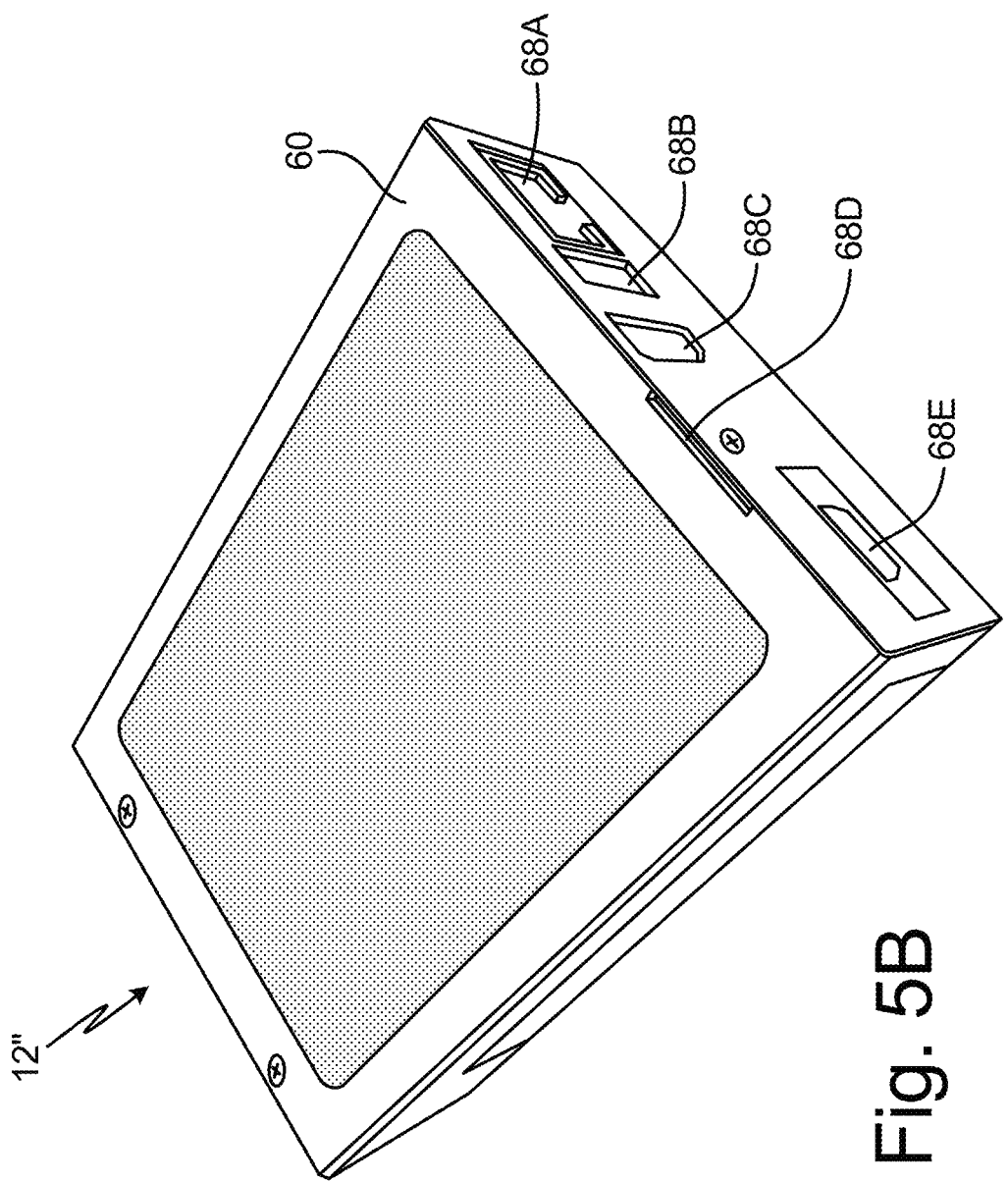
FIG. 5B is an isometric view of a fluid management controller.

FIG. 5A is a schematic block diagram of fluid management controller 12". FIG. 5B is an isometric view of fluid management controller 12". Fluid management controller 12" includes casing 60, SBC 62, and connectors 68. SBC 60 includes control circuitry 28 and memory 30. Connectors 68 can include CAT 5/6 port 68A, universal system bus (USB) port 68B, high-definition multimedia interface (HDMI) port 68C, memory slot 68D, and power connection 68E.

Connectors 68 extend into casing 60 and are configured to receive various communications components. Connectors 68 provide fluid management controller 12" with wired communications capabilities. Memory slot 68D can connect to an external memory device, such as an external hard drive, flash drive, memory card, secure digital (SD) card, micro SD card, or other such device. CAT 5/6 port 68A is configured to receive an Ethernet cable to provide wired communications capabilities to fluid management controller 12". USB port 68B is configured to receive any desired USB interface device and can be used to load instructions to or download instructions from SBC 62. HDMI port 68C is configured to receive an HDMI cable.

Most aspects of fluid management controller 12" require an externally wired A/C power source connected to power connection 68E. It is understood, however, that various power sources can be connected to power connection 68E, such as a USB-connected device configured to provide power, a solar power panel, or a battery, among other options.

Connectors 68 provide power and wired communications capabilities to fluid management controller 12". The wired communications capabilities are supplemental to the wireless communications abilities described above. As such, fluid management controller 12" can communicate with, control, and record information wirelessly or via wired connections through connectors 68. Connectors 68 can connect fluid management controller 12" to fluid management components 14 (best seen in FIG. 1); user interface devices 16 (best seen in FIG. 1); and/or network 34 (shown in FIG. 2).

Figure 6A:
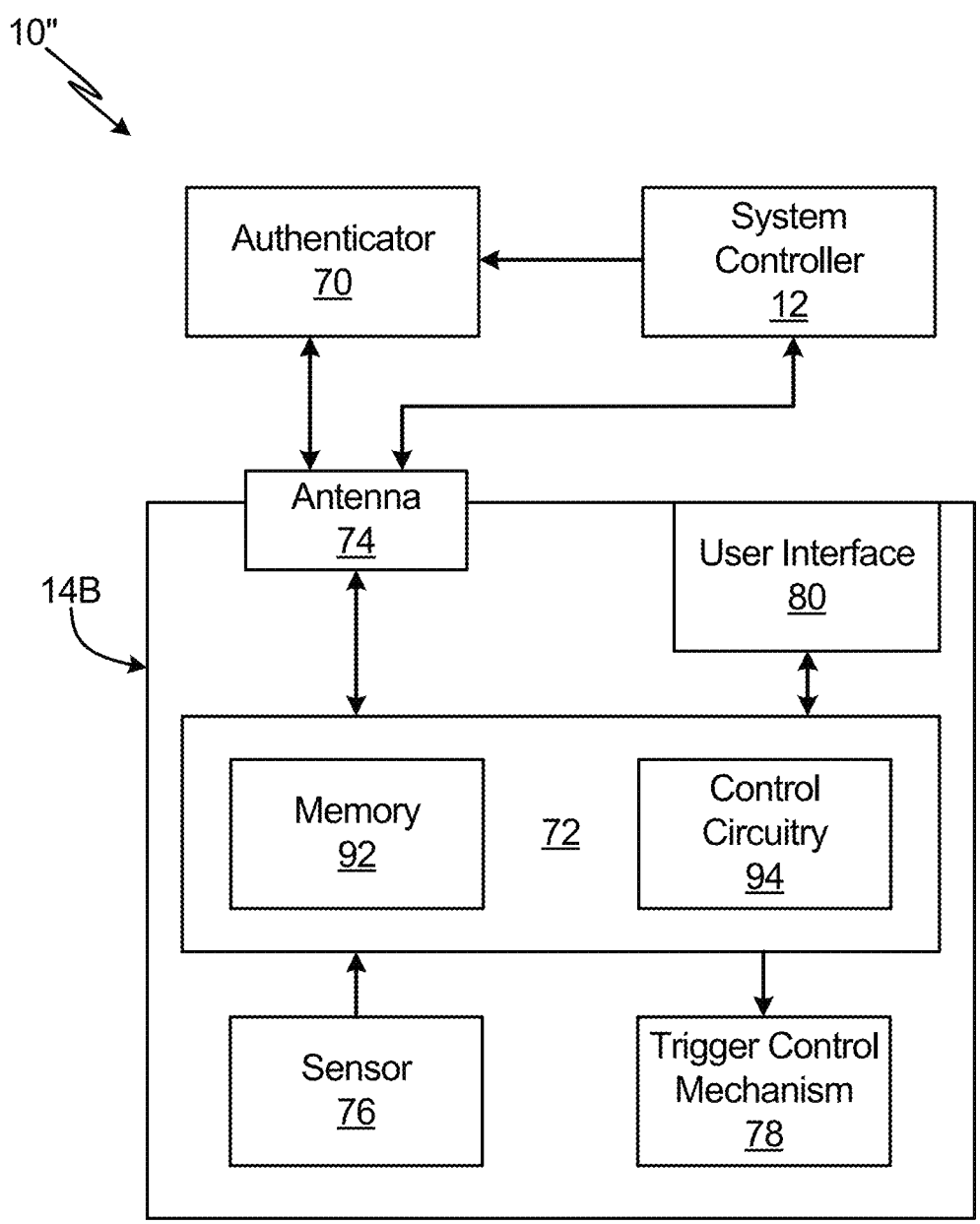
FIG. 6A is a schematic block diagram of a fluid management system.
Figure 6B:
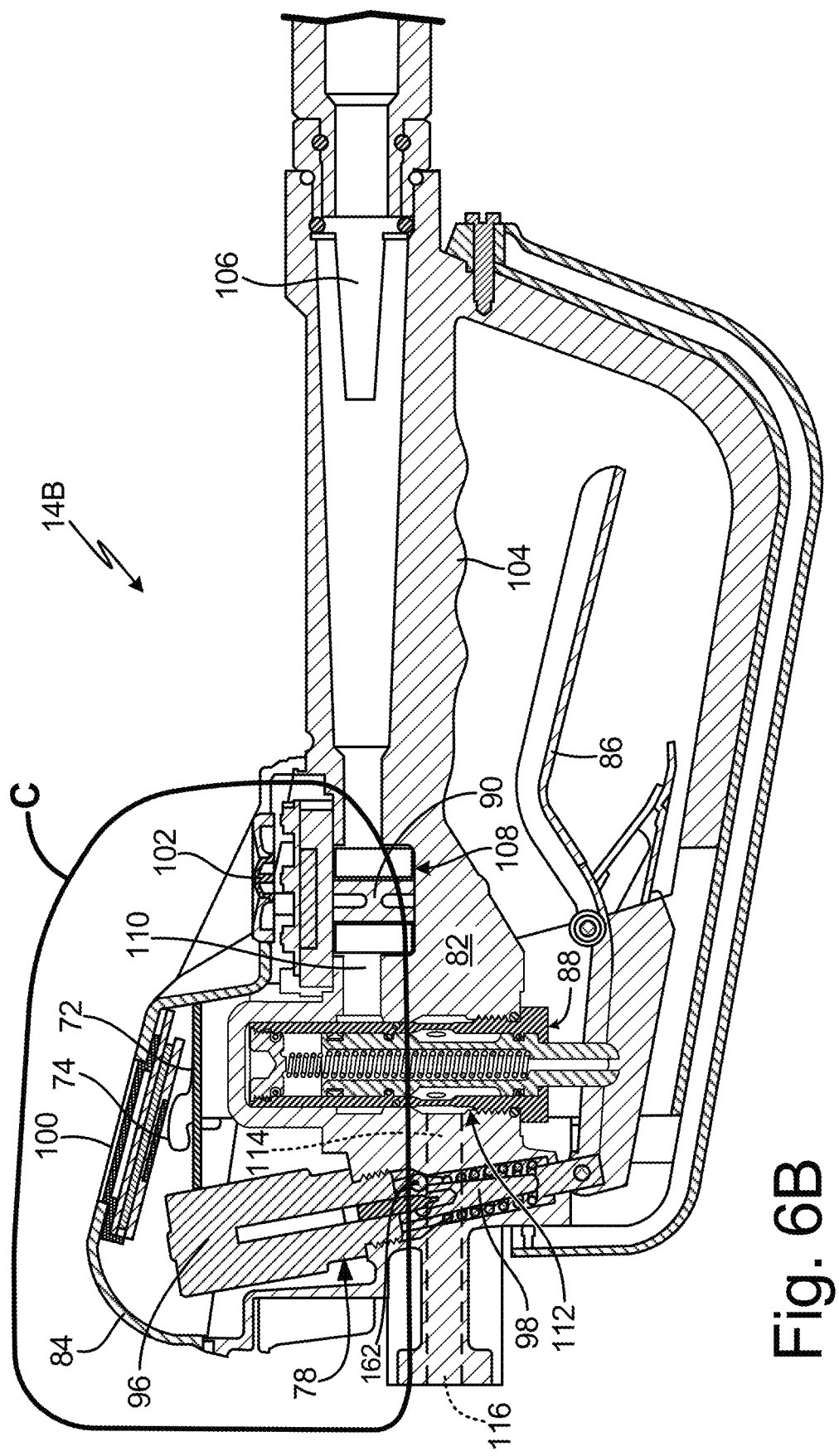
FIG. 6B is a cross-sectional view of a fluid dispensing meter.
Figure 6C:
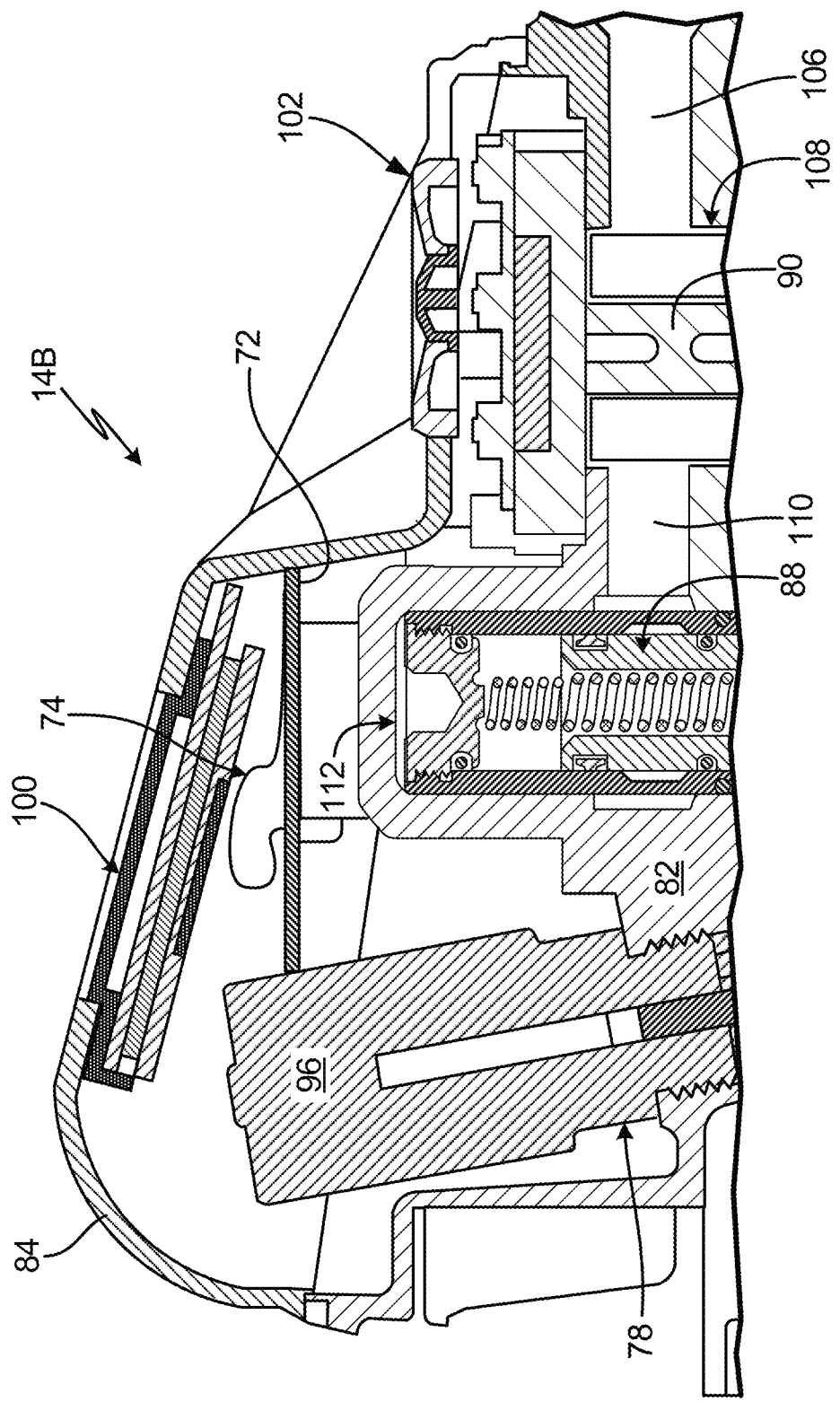
FIG. 6C is an enlarged view of detail Z in FIG. 6B.

FIG. 6A is a schematic block diagram of fluid management system 10". FIG. 6B is a cross-sectional view of handheld meter 14B. FIG. 6C is an enlarged view of detail C in FIG. 6B. FIGS. 6A-6C will be discussed together. Fluid management system 10" includes system controller 12, handheld meter 14B, and authenticator 70. Handheld meter 14B includes meter controller 72, antenna 74, sensor 76, trigger control mechanism 78, user interface 80, meter body 82, bezel housing 84, trigger 86, valve 88, and meter 90. Meter controller 72 includes memory 92 and control circuitry 94. Trigger control mechanism 78 includes solenoid 96, trip rod 98, and balls 162. User interface 80 includes display 100 and user input 102. Meter body 82 includes handle 104, fluid inlet 106, metering chamber 108, valve inlet port 110, valve cavity 112, valve outlet port 114, and fluid outlet 116.

Fluid management system 10" is a system for dispensing fluid and tracking fluid dispenses. For example, fluid management system 10" can be implemented in an automotive shop to track dispenses of oil, coolant, and other automotive fluids. Fluid management system 10" is similar to fluid management system 10 (FIG. 1) and fluid management system 10' (FIG. 2). Handheld meter 14B is configured to dispense and meter fluid at various locations within fluid management system 10". Fluid management software is implemented on system controller 12, and system controller 12 is configured to generate work orders, track and record discrete fluid dispense events, and implement system-wide fluid tracking. It is understood that system controller 12 can be any suitable processor-based device for generating work orders and managing fluid data within fluid management system. For example, system controller 12 can be a PC or a mobile device, such as a smart phone, personal data assistant, handheld bill payment machine, and/or a mobile point of sale system.

Bezel housing 84 is mounted on meter body 82 and is configured to enclose the various electronics of handheld meter 14B. Meter controller 72 is disposed in bezel housing 84 and is in communication with antenna 74, user interface 80, sensor 76, and trigger control mechanism 78. Meter controller 72 is mounted in bezel housing 84 below antenna 74. Antenna 74 is mounted in bezel housing 84 between meter controller 72 and display 100, and antenna 74 communicates with control circuitry 94. While antenna 74 is described as disposed within bezel housing 84, it is understood that antenna 74 can be mounted at any desired location where antenna 74 can communicate with authenticator 70 and control circuitry 94. For example, antenna 74 can extend through handle 104 or project out of bezel housing 84. Antenna 74 can also be referred to as a data receiver. It is understood, however, that antenna 74 can be configured to both transmit and receive data. Moreover, it is understood that fluid dispensing meter 14B can include one or more antennas 74 configured to utilize different communications standards to facilitate communications between fluid dispensing meter 14B and various devices external to fluid dispensing meter 14B.

Memory 92 and control circuitry 94 are mounted on meter controller 72. While memory 92 and control circuitry 94 are shown on a common meter controller 72, it is understood that memory 92 and control circuitry 94 can be mounted on separate circuit boards and electrically connected, such as by wiring. Memory 92 stores software that, when executed by control circuitry 94, authorizes fluid dispenses, tracks and records the volume of each fluid dispense, and communicates fluid dispense information to and from the user. User interface 80 is disposed on and in bezel housing 84 and is configured to receive inputs from and provide outputs to the user.

Control circuitry 94, in one example, is configured to implement functionality and/or process instructions. For instance, control circuitry 94 can be capable of processing instructions stored in memory 92. Examples of control circuitry 94 can include any one or more of a microprocessor, a controller, a digital signal processor (DSP), an application specific integrated circuit (ASIC), a field-programmable gate array (FPGA), or other equivalent discrete or integrated logic circuitry. It is understood that, in some examples, control circuitry 94 can be implemented as a plurality of discrete circuitry subassemblies.

Memory 92, in some examples, can be configured to store information during operation. Memory 92, in some examples, is described as computer-readable storage media.

In some examples, a computer-readable storage medium can include a non-transitory medium. The term "non-transitory" can indicate that the storage medium is not embodied in a carrier wave or a propagated signal. In some examples, memory 92 is a temporary memory, meaning that a primary purpose of memory 92 is not long-term storage. Memory 92, in some examples, is described as volatile memory, meaning that memory 92 does not maintain stored contents when power to handheld meter 14B is turned off. Memory 92, in some examples, also includes one or more computer-readable storage media. Memory 92 can be configured to store larger amounts of information than volatile memory. Memory 92 can further be configured for long-term storage of information. In some examples, memory 92 includes non-volatile storage elements.

Handle 104 is configured to be grasped by a single hand of a user, such that the user can manipulate handheld meter 14B and dispense fluid at a desired location with one hand. Fluid inlet 106 extends into handle 104 and is configured to receive a supply hose extending from a fluid storage tank. Metering chamber 108 is disposed in meter body 82, and meter 90 is disposed in metering chamber 108. Meter 90, in some examples, can be a positive displacement meter configured to generate a volumetric measurement of the fluid flowing through handheld meter 14B. Sensor 76 interfaces with meter 90 and is configured to generate a volumetric flow count based on the volumetric measurement generated by meter 90. Valve inlet port 110 extends between metering chamber 108 and valve cavity 112. Valve 88 is disposed in valve cavity 112 and is configured to control fluid flow through handheld meter 14B. Valve outlet port 114 extends downstream from valve cavity 112. Fluid outlet 116 is configured to receive the fluid flow from valve outlet port 114 and extends out of meter body 82.

Trigger 86 extends from meter body 82 and interfaces with valve 88. Trigger control mechanism 78 is mounted on meter body 82 and is configured to control trigger 86 between an activated state, where trigger 86 can displace valve 88 between a closed position and an open position, and a deactivated state, where trigger 86 is prevented from displacing valve 88 between the closed position and the open position. Solenoid 96 is mounted on meter body 82 and extends into bezel housing 84. Trip rod 98 extends from solenoid 96 and is connected to trigger 86. When trigger control mechanism 78 is activated, solenoid 96 locks trip rod 98 in position, such as with balls 162. With trip rod 98 locked in position, trigger 86 pivots on trip rod 98 such that trigger 86 can displace valve 88 to the open position. When trigger control mechanism 78 is deactivated, solenoid 96 unlocks trip rod 98 such that trip rod 98 is capable of sliding within meter body 82. With trip rod 98 unlocked, trigger 86 cannot pivot on trip rod 98 and instead pivots on valve 88, pulling trip rod 98 downward within meter body 82. As such, trigger 86 is prevented from shifting valve 88 to the open position with trigger control mechanism 78 deactivated. Trigger control mechanism 78 operates substantially similar to the trigger release mechanism disclosed in U.S. Pat. No. 8,215,1062, to Graco Minnesota, Inc., the disclosure of which is hereby incorporated by reference in its entirety.

Authenticator 70, which can also be referred to as an external data source, passively provides dispense-identification data, such as user-identification data that identifies a particular user and/or a group of users, to handheld meter 14B. The dispense-identification data can include the user identity and work orders associated with the user, among other data. The user-identification data is provided to handheld meter 14B via the communication link between authenticator 70 and antenna 74. As such, authenticator 70 authorizes dispenses and can set fluid limits on dispenses without requiring direct communication between system controller 12 and handheld meter 14B.

In some examples, authenticator 70 is a Near Field Communication ("NFC") device configured to provide the user-identification data to handheld meter 14B. Examples of authenticator 70 can include an NFC-configured wrist band, an NFC-configured ring, an NFC-configured access card, or any other suitable NFC-configured device. Where authenticator 70 is an NFC-enabled device, an NFC tag can be embedded on meter controller 72. In such an example, antenna 74 can be an NFC tag configured to interact with authenticator 70. While authenticator 70 is described as utilizing NFC to communicate with handheld meter 14B, it is understood that authenticator 70 can additionally or alternatively utilize any desired communication standard to communicate with handheld meter 14B. For example, authenticator 70 can utilize Bluetooth SIG (e.g., Bluetooth 5, Bluetooth low energy protocol stack, Bluetooth Ultra Low Power, etc.), Wibree, BlueZ, Affix, ISO 13157, IEEE 802/Wi Fi, ISO/IEC 111093, ISO/IEC 19843, ISM band, WLAN, active RFID (e.g., Active Reader Active Tag), passive RFID (e.g., Active Reader Passive Tag), NFCIP-1, ISO/IEC 72092, among other options. Antenna 74 can be configured to utilize any communication standard compatible with authenticator 70.

During operation, a work order associated with a discrete fluid dispense event is entered at system controller 12. The work order contains relevant work order information, such as the type of fluid to be dispensed, the volume of fluid to be dispensed, the customer associated with the work order, the desired location of the dispense event, and/or the identities of users authorized to perform the dispense event, among other desired information. In some examples, the work order includes a list of authorized users, which are the users authorized to complete the dispense event identified by the work order. It is understood, however, that the work order can include as much or as little information as desired to facilitate the dispense event. For example, the work order may include only the type and volume of fluid to be dispensed. The work order can be provided to handheld meter 14B via the communication link between system controller 12 and handheld meter 14B. The work order information can be stored in memory 92.

The user, such as an automotive technician, proceeds to handheld meter 14B with authenticator 70, which includes the dispense-identification data. When the user grasps handheld meter 14B, or otherwise brings authenticator 70 within an operable range of antenna 74, authenticator 70 provides the user-identification data to control circuitry 94 via the communication link between authenticator 70 and antenna 74. In some examples, authenticator 70 is required to be within a short distance of antenna 74 to transmit the user-identification data, such as about 2.108-5.08 cm (about 1.00-2.00 in.). It is understood that the data transmission between authenticator 70 and fluid dispensing meter 14B can be active or passive. Control circuitry 94 recalls the work order information from memory 92 and compares the work order information to the user-identification data to determine if the dispense event is authorized and if the user is authorized to complete a dispense event. For example, memory 92 can contain a list of authorized users that control circuitry 94 compares with the user-identification data. The list of authorized users can include all users authorized to make dispenses or can include particular users associated with particular work orders. In examples where the dispense-identification data includes work order-identification data, control circuitry 94 also receives the work order-identification data from authenticator 70. Control circuitry 94 can then automatically associate the user with the work order.

In some examples, multiple work orders are associated with one user. Control circuitry 94 recalls the work order data from memory 92 and causes user interface 80 to display a list of work orders to the user. In examples where the work order data includes a list of authorized users, the list displayed to the user contains only those work orders for which the user is authorized to complete the dispense via user interface 80. The user can then select the work order associated with the current dispense event via user interface 80.

When control circuitry 94 determines that the dispense event is not authorized based on the comparison, such as where the user-identification data does not match any user on the list of authorized users, then trigger control mechanism 78 remains deactivated such that the user cannot dispense fluid with fluid dispensing meter 14B. Control circuitry 94 cause user interface 80 to display a notification to the user that the dispense event is not authorized, and can cause fluid dispensing meter 14B to communicate that an unauthorized dispense was attempted to system controller 12.

When control circuitry 94 determines that the dispense event is authorized based on the comparison, then control circuitry 94 enables handheld meter 14B to proceed with the dispense event. Control circuitry 94 activates trigger control mechanism 78, such as by activating a power source for solenoid 96 to thereby power solenoid 96. With trigger control mechanism 78 activated, trigger 86 is able to shift valve 88 to the open position. The user is then able to dispense the fluid using handheld meter 14B. Handheld meter 14B can transmit information regarding the dispense event to system controller 12 for work order management and system-wide fluid tracking.

Fluid management system 10" provides significant advantages. Authenticator 70 uniquely identifies a user, and control circuitry 94 is configured to authorize fluid dispenses only when authenticator 70 is within range of antenna 74 and when control circuitry 94 determines that the user-identification data matches the list of authorized users. As such, control circuitry 94 and authenticator 70 prevent unauthorized fluid dispenses, as handheld meter 14B remains deactivated until control circuitry 94 activates trigger control mechanism 78. Unlocking handheld meter 14B with authenticator 70 also eliminates the need for the user to remember and enter a PIN code to unlock handheld meter 14B. Instead, the user can simply pick up handheld meter 14B and control circuitry 94 unlocks handheld meter 14B based on the proximity of authenticator 70.

Figure 7A:
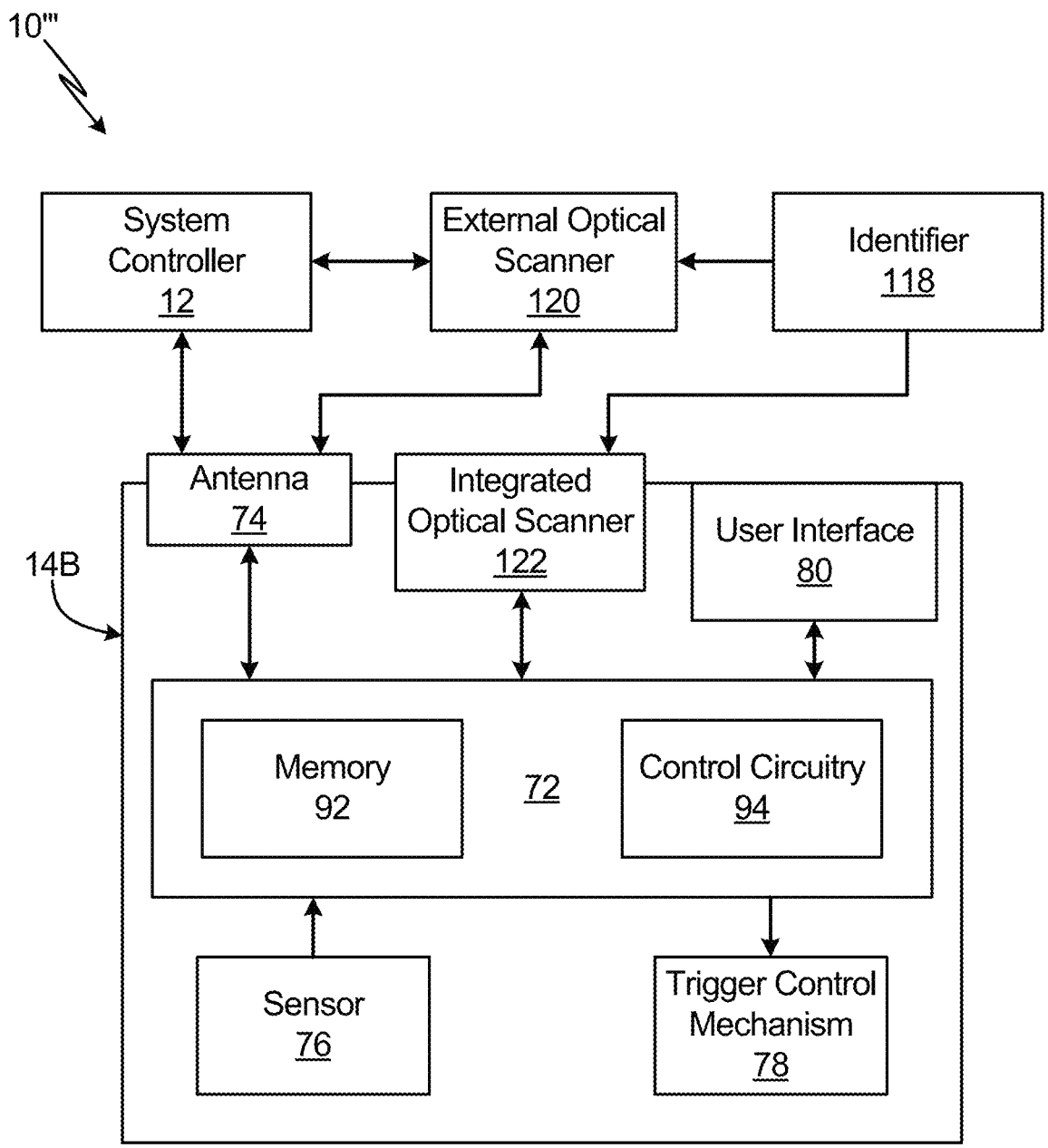
FIG. 7A is a schematic block diagram of a fluid management system.
Figure 7B:
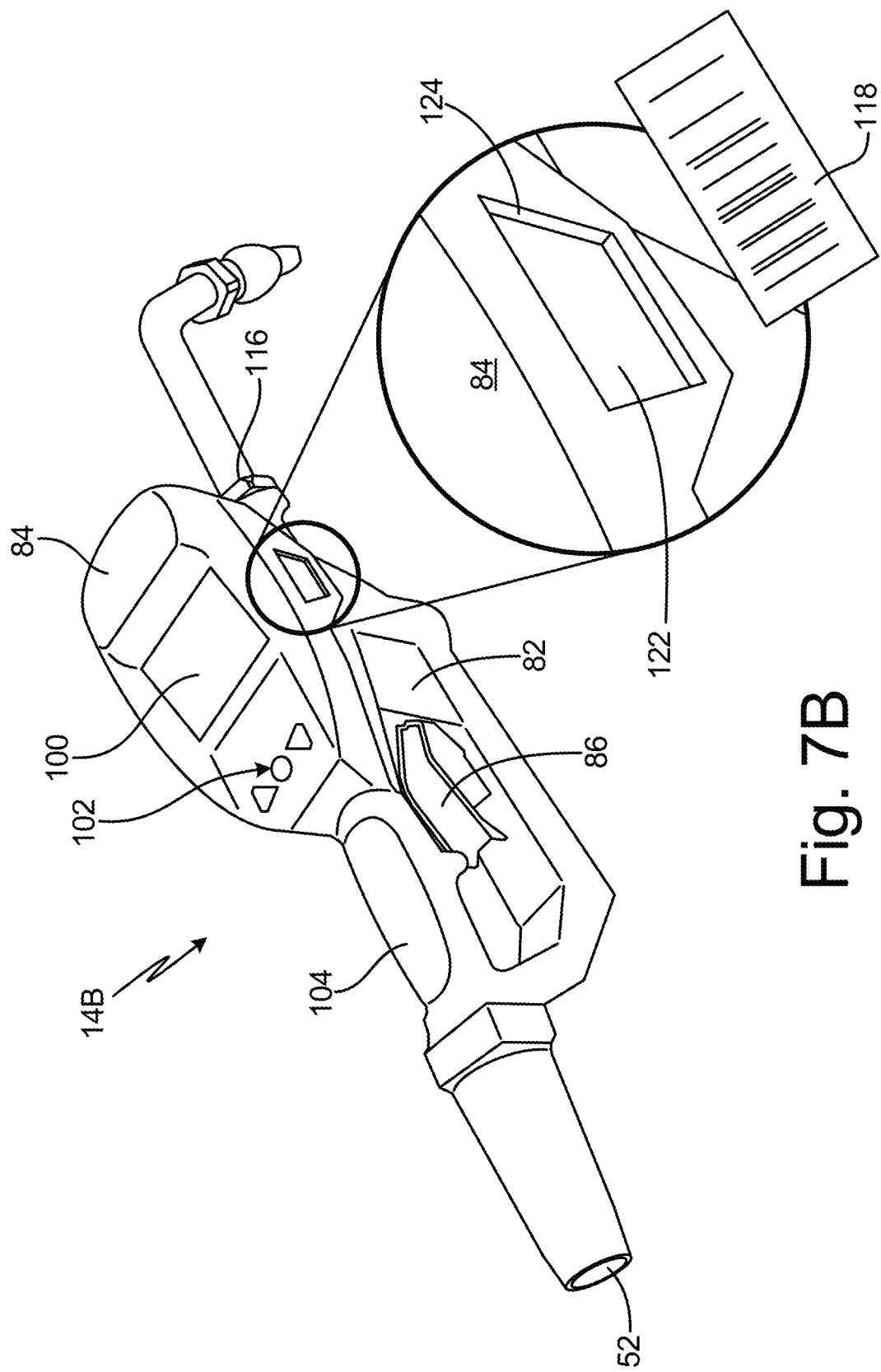
FIG. 7B is a perspective view of a fluid dispensing meter.
Figure 7C:
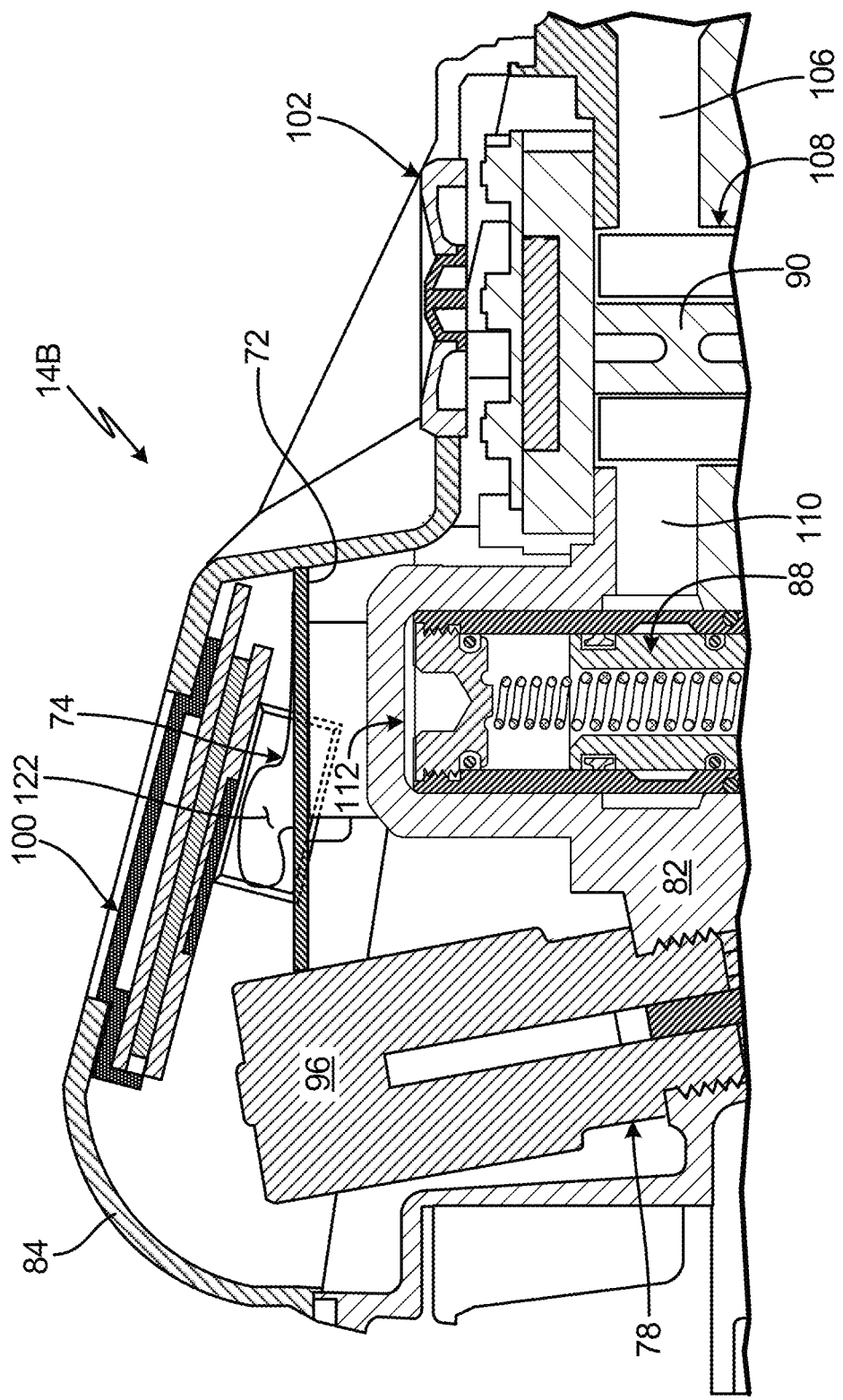
FIG. 7C is a cross-sectional view of a portion of a dispensing meter.

FIG. 7A is a schematic block diagram of fluid management system 10'''. FIG. 7B is an isometric view of handheld meter 14B with an enlarged view of integrated optical scanner 122 and scanner opening 124. FIG. 7C is a cross-sectional view of a portion of handheld meter 14B. FIGS. 7A-7C will be discussed together. Fluid management system 10''' includes handheld meter 14B, system controller 12, visual pattern 118, and external optical scanner 120. Handheld meter 14B includes meter controller 72, antenna 74, sensor 76, trigger control mechanism 78, user interface 80, meter body 82, bezel housing 84, trigger 86, valve 88, meter 90, and integrated optical scanner 122. Meter controller 72 includes memory 92 and control circuitry 94. Solenoid 96 of trigger control mechanism 78 is shown. User interface 80 includes display 100 and user input 102. Handle 104, fluid inlet 106, metering chamber 108, valve inlet port 110, valve cavity 112, and fluid outlet 116 of meter body 82 are shown. Bezel housing 84 includes scanner opening 124.

Handheld meter 14B is configured to meter and dispense fluid at various locations within fluid management system 10". Fluid management software is implemented on system controller 12, and system controller 12 is configured to generate work orders, track and record discrete fluid dispense events, and implement system-wide fluid tracking. It is understood that system controller 12 can be any suitable processor-based device for generating work orders and managing fluid data within fluid management system. For example, system controller 12 can be a PC or a mobile device, such as a smart phone, personal data assistant, handheld bill payment machine, and/or a mobile point of sale system.

Visual pattern 118, which can also be referred to as an external data source, includes a unique identifier that is associated with a work order and/or a user authorized to make a fluid dispense. As such, the unique identifier provides dispense-identification data. For example, the unique identifier data can include user-identification data where visual pattern 118 is associated with a unique user, work order-identification data where visual pattern 118 is associated with a work order, or both where visual pattern 118 is associated with both a user and a work order. Visual pattern 118 can be any visual pattern configured to uniquely identify the user, the work order, or both. For example, visual pattern 118 can be a bar code or a QR code. Each authorized user of fluid management system 10''' can be issued a unique visual pattern 118 and/or a unique visual pattern 118 can be generated for each work order. Visual pattern 118 can be disposed on a paper print out and/or can be displayed on the screen of a device.

Figure 8:
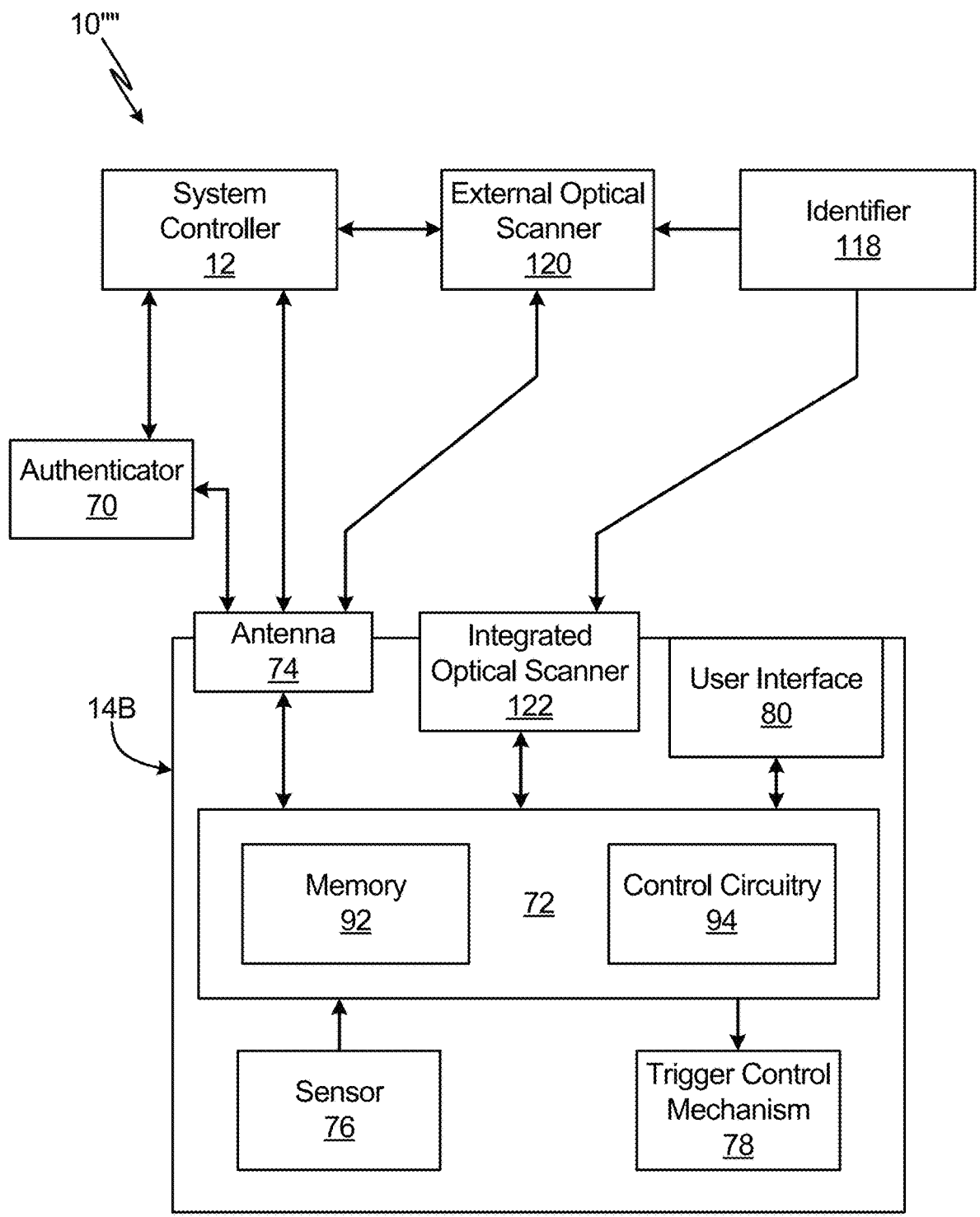
FIG. 8 is a schematic block diagram of a fluid management system.

External optical scanner 120 is configured to perform optical pattern recognition and produce coded signals corresponding to the patterns recognized. For example, external optical scanner 120 can be a bar code scanner. External optical scanner 120 is a separate component from handheld meter 14B. While external optical scanner 120 is illustrated as separate from system controller 12, it is understood that external optical scanner 120 can be integrated into system controller 12, such as where system controller 12 is a smartphone or tablet device. External optical scanner 120 can also communicate visual pattern 118 to handheld meter 14B, either directly or through by way of system controller 12. In some examples, external optical scanner 120 can be equipped with NFC card emulation, similar to authenticator 70 (FIGS. 6A and 8).

Similar to external optical scanner 120, integrated optical scanner 122 is configured to perform optical pattern recognition and produce coded signals corresponding to the patterns recognized. Integrated optical scanner 122 integrated into the electronics of handheld meter 14B and communicates with control circuitry 94. Integrated optical scanner 122 is mounted in bezel housing 84 and receives visual pattern 118 through scanner opening 124 in bezel housing 84. While scanner opening 124 is illustrated on a side of bezel housing 84, it is understood that scanner opening 124, and integrated optical scanner 122, can be located at any desired location on handheld meter 14B where integrated optical scanner 122 maintains communications with meter controller 72. For example, scanner opening 124 can extend through a left-hand side of bezel housing 84, a right-hand side of bezel housing 84, a front of bezel housing 84, or through a hand guard extending around trigger 86. A user can activate integrated optical scanner 122 via user interface 80. Integrated optical scanner 122 can also be referred to as a data receiver.

During operation, handheld meter 14B utilizes the unique identifier from visual pattern 118 to authorize a fluid dispense event. The user can scan visual pattern 118 with either external optical scanner 120 or integrated optical scanner 122 and the dispense-identification data is transmitted to control circuitry 94. When the user utilizes external optical scanner 120, external optical scanner 120 transmits the dispense-identification data from visual pattern 118 to handheld meter 14B either directly via the communication link between external optical scanner 120 and handheld meter 14B, or through system controller 12. Where the user utilizes integrated optical scanner 122, the dispense-identification data is provided directly to control circuitry 94 by integrated optical scanner 122. Control circuitry 94 recalls authorized-dispense data from memory 92 and compares the authorized-dispense data to the dispense-identification data to determine if the dispense event is authorized. The authorized-dispense data can include, among others, a list of authorized users and a list of work orders that handheld meter 14B is authorized to complete.

Control circuitry 94 compares the dispense-identification data from visual pattern 118 to the authorized-dispense data stored in memory 92. For example, where the dispense-identification data from visual pattern 118 includes user-identification data, control circuitry 94 compares the user-identification data from visual pattern 118 to a list of authorized users stored in memory 92. If control circuitry 94 determines that the dispense event is authorized, then control circuitry 94 activates trigger control mechanism 78 such that trigger 86 can shift valve 88 to the open position and the user can dispense fluid with handheld meter 14B. With trigger control mechanism 78 activated, the user can dispense the fluid using handheld meter 14B. Control circuitry 94 can end the dispense event by deactivating trigger control mechanism 78, such as where sensor 76 indicates that the actual fluid volume dispensed has reached an authorized fluid volume. Handheld meter 14B can transmit information regarding the dispense event to system controller 12 for work order management and system-wide fluid tracking.

Fluid management system 10''' provides significant advantages. Visual pattern 118 provides unique identification for both work orders and users authorized to make fluid dispenses. Control circuitry 94 is configured to authorized fluid dispenses only when control circuitry 94 determines that the dispense-identification data matches the authorized-dispense data stored in memory 92. Integrated optical scanner 122 allows the dispense-identification data contained in visual pattern 118 to be provided directly to handheld meter 14B at the dispense location. Providing the dispense-identification data from integrated optical scanner 122 or external optical scanner 120 eliminates the need for the user to remember a PIN code and does not require the user to interact with user interface 80 to unlock handheld meter 14B.

FIG. 8 is a schematic block diagram of fluid management system 10''''. Fluid management system 10'''' includes handheld meter 14B, system controller 12, authenticator 70, visual pattern 118, and external optical scanner 120. Handheld meter 14B includes meter controller 72, antenna 74, sensor 76, trigger control mechanism 78, user interface 80, and integrated optical scanner 122. Meter controller 72 includes memory 92 and control circuitry 94.

Handheld meter 14B can be configured to authorize fluid dispenses based on two-part authentication from visual pattern 118 and authenticator 70. Visual pattern 118 and authenticator 70 are both external data sources. The user scans visual pattern 118 with one of external optical scanner 120 and integrated optical scanner 122. The dispense-identification data received from visual pattern 118 is transmitted to meter controller 72 and can be stored in memory 92 to be recalled at a later time. For example, multiple work orders can be scanned and the work order-identification data for each unique work order can be stored in memory 92. Each unique work order can be associated with one or more users authorized to complete the work order, such that only that user or group of users are authorized to complete fluid dispense for those work orders. To initiate the dispense event, the user grasps fluid dispending meter 90, bringing authenticator 70 within range of antenna 74. In some examples, the user scans visual pattern 118 with integrated optical scanner 122 at the beginning of the dispense event to activate a work order identified by work order-identification data contained in visual pattern 118.

With the work order activated, control circuitry 94 compares the user-identification data received from authenticator 70 with the list of users authorized to complete that work order. If control circuitry 94 determines that the dispense event is authorized, then control circuitry 94 activates trigger control mechanism 78 such that the user can pull trigger 86 (best seen in FIG. 6B) and shift valve 88 (shown in FIG. 6B) to the open position. If control circuitry 94 determines that the dispense event is unauthorized, then control circuitry 94 does not activate trigger control mechanism 78, and handheld meter 14B is unable to dispense fluid.

Fluid management system 10'''' provides significant advantages. Authenticator 70 uniquely identifies a dispense event and/or a user, and control circuitry 94 is configured to authorize fluid dispenses only when authenticator 70 is within range of antenna 74 and when control circuitry 94 determines that the user-identification data matches a list of authorized users stored in memory 92. Visual pattern 118 provides unique dispense-identification data to handheld meter 14B. Control circuitry 94 can recall a list of work orders from memory 92 and identify if the user is authorized to make the fluid dispense based on the user-identification data provide by authenticator 70 and the list of work orders associated with that user-identification data. Passively identifying users with authenticator 70 and automatically activating handheld meter 14B based on user-identification data allows the user to more quickly and efficiently dispense fluid, as the user is not required to remember a PIN code or actively log into handheld meter 14B.

Figure 9:
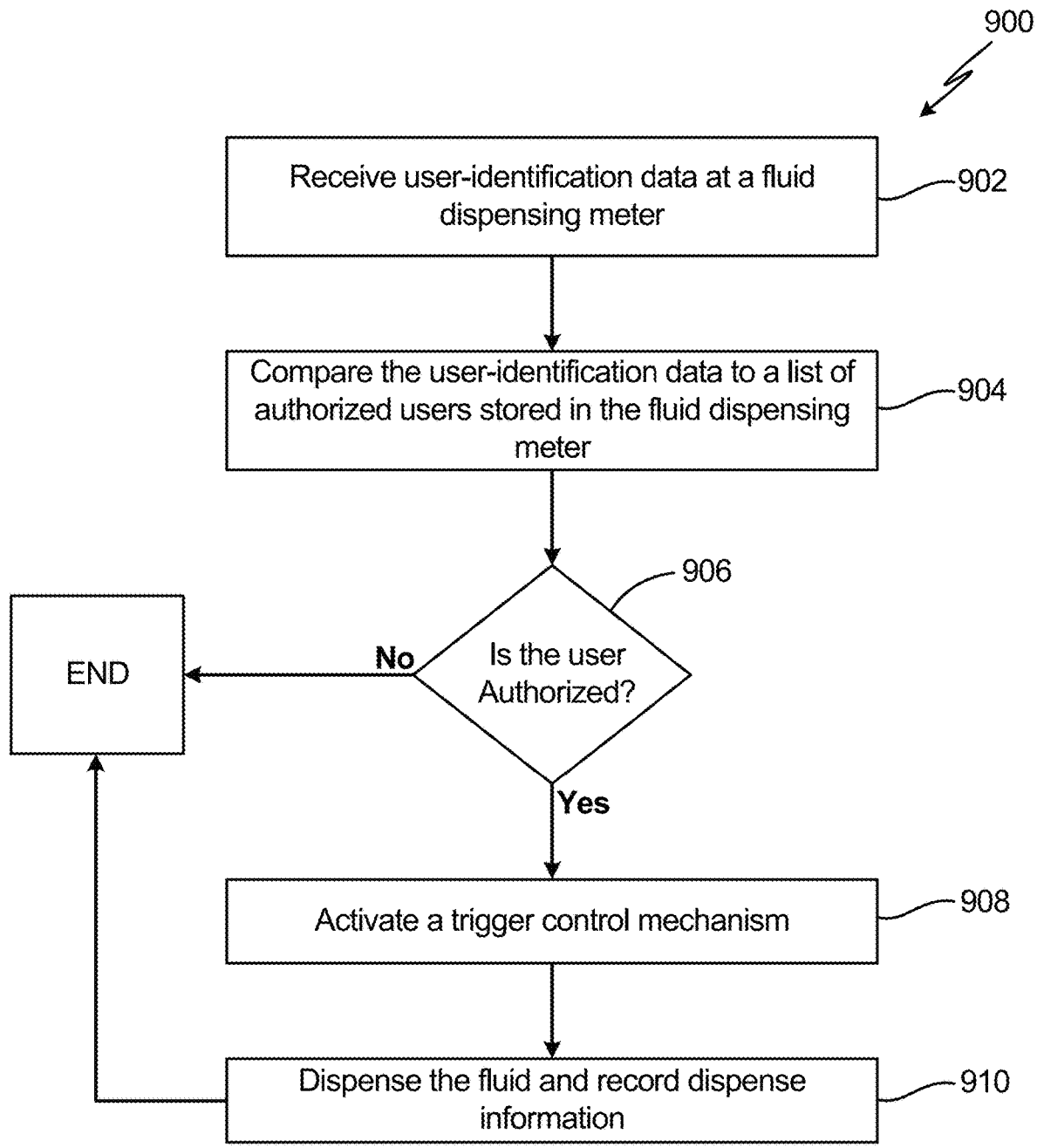
FIG. 9 is a flowchart illustrating a method of dispensing fluid.
Figure 10:
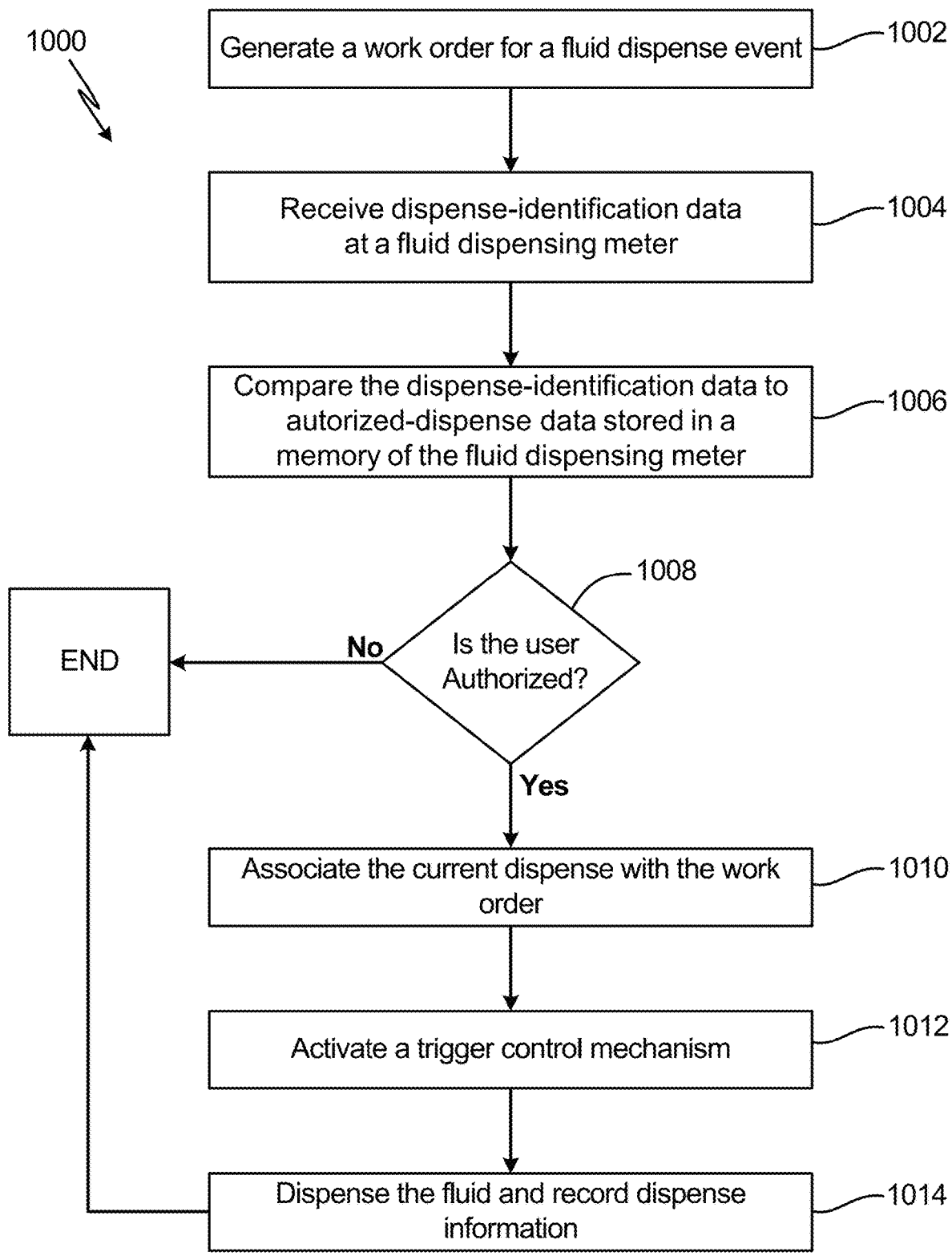
FIG. 10 is a flowchart illustrating a method of dispensing fluid.
Figure 11:
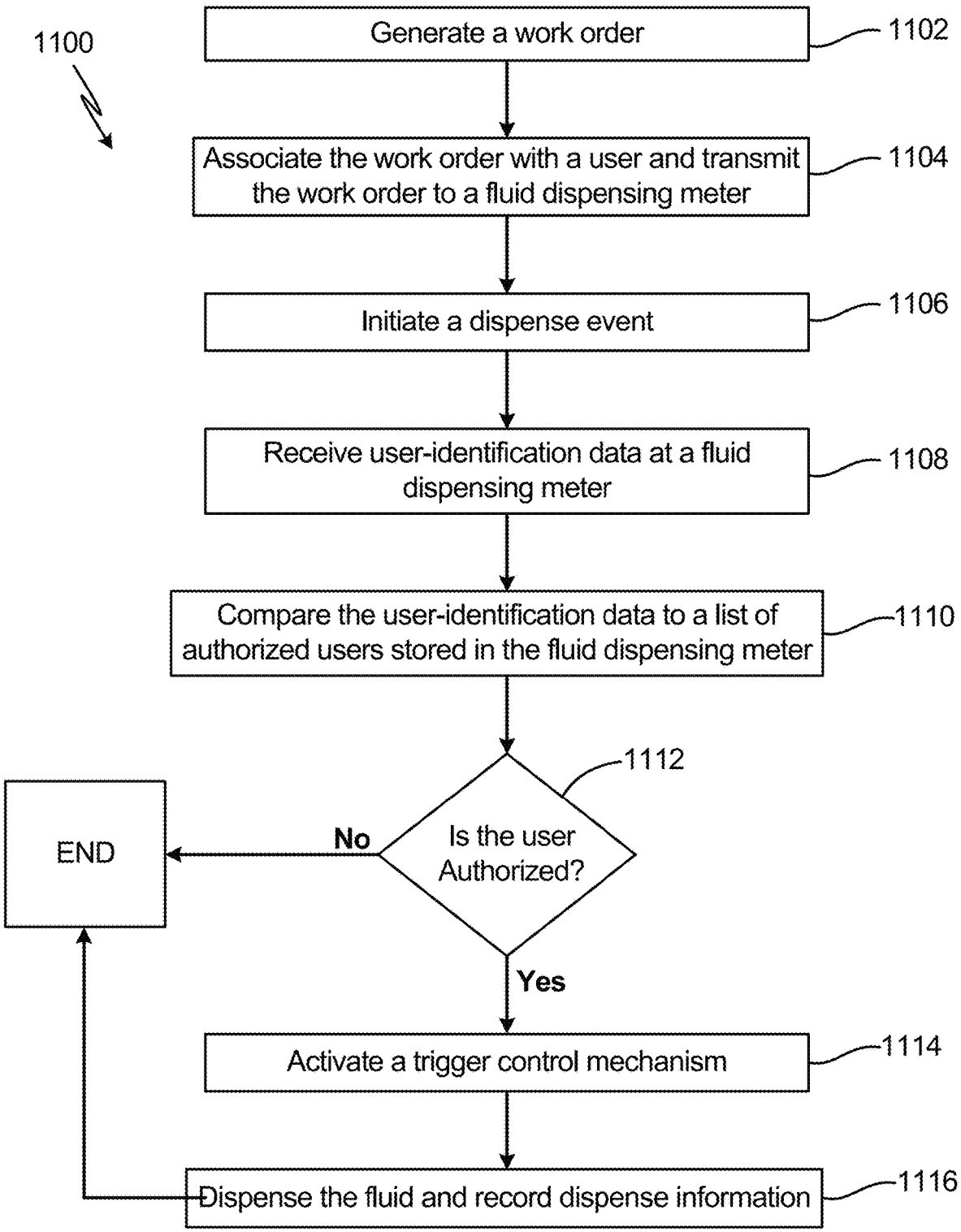
FIG. 11 is a flowchart illustrating a method of dispensing fluid.

FIG. 9, FIG. 10, and FIG. 11 are flowcharts illustrating methods of dispensing fluid. FIGS. 9-11 differ in the level of authorization required for the user. FIG. 9 illustrates method 900 of authorizing a fluid dispense that requires user authorization at handheld meter 14B, such as by authenticator 70 (FIGS. 6A and 8). FIG. 10 illustrates method 1000 of authorizing a fluid dispense that requires generation of a work order and user authorization at handheld meter 14B. FIG. 11 illustrates method 1100 of authorizing a fluid dispense that requires generation of a work order and association of specific users with that work order. User authorization is still required at handheld meter 14B, but the user is required to be authorized to both dispense fluid using handheld meter 14B and dispense fluid for that work order.

FIG. 9 is a flowchart illustrating method 900 of authorizing a fluid dispense. In step 902, dispense-identification data, such as user-identification data and/or work order-identification data, is received by a fluid dispensing meter, such as handheld meter 14B (FIGS. 6A-8). The user-identification data can be passively provided to the fluid dispensing meter by an authentication device utilizing near field communications, such as authenticator 70 (FIGS. 6A and 8). For example, the user can wear a bracelet, watch, ring, belt, or other authentication device that is NFC enabled, and the user-identification data can be transmitted to control circuitry of the fluid dispensing meter by the authenticator. In another example, the user-identification data is encoded in a visual identifier, such as visual pattern 118 (FIGS. 7A-7B and 8). The user can scan the visual identifier using an optical scanner, such as external optical scanner 120 (FIGS. 7A and 8) or integrated optical scanner 122 (FIGS. 7A-8).

In step 904, the user-identification data provided to the fluid dispensing meter in step 902 is compared to a list of authorized users stored in a memory of the fluid dispensing meter. In step 906, the control circuitry determines if the user is authorized based on the comparison made in step 904. If the user-identification data does not match a user identity stored in the list of authorized users, then the answer is NO and the fluid dispensing meter will not allow the user to dispense fluid with fluid dispensing meter. If the user-identification data matches a user identity stored in the list of authorized users stored in the memory, then the answer is YES and method 900 proceeds to step 908.

In step 908, the control circuitry of the fluid dispensing meter activates a trigger control mechanism, such as trigger control mechanism 78 (best seen in FIG. 6B). For example, the control circuitry can provide power to a solenoid, such as solenoid 96 (best seen in FIG. 6B), to cause the solenoid to lock a trip rod in position within the fluid dispensing meter. With the trigger control mechanism activated, the trigger of the fluid dispensing meter is able to shift a valve within the fluid dispensing meter into an open position.

In step 910, the user dispenses the fluid with the fluid dispensing meter. In some examples, a preset fluid volume is associated with the user, such that the control circuitry deactivates the trigger control mechanism based on the actual fluid volume dispensed reaching the preset fluid volume. Dispense information, such as the type of fluid dispensed, the identity of the user completing the dispense, the time of the dispense, the volume of fluid dispensed, and the location of the dispense are recorded. In one example, the dispense information is transmitted to a system controller, such as system controller 12 (FIGS. 6A, 7A, and 8), for fluid tracking and billing.

FIG. 10 is a flowchart illustrating method 1000 of authorizing a fluid dispense. In step 1002, a work order is generated for a discrete dispense event. The work order can include dispense information relevant to the dispense event, such as, among others, one or more of the type of fluid to be dispensed, the volume of fluid to be dispensed, the location of the dispense event, and customer information. In step 1004, dispense-identification data, such as user-identification data and/or work order-identification data, is received by a fluid dispensing meter, such as handheld meter 14B (FIGS. 6A-8). The user-identification data can be passively provided to the fluid dispensing meter by an authentication device utilizing near field communications, such as authenticator 70 (FIGS. 6A and 8). For example, the user can wear a bracelet, watch, ring, belt, or other authentication device that is NFC enabled, and the user-identification data can be transmitted to control circuitry of the fluid dispensing meter by the authenticator. In another example, the dispense-identification data is encoded in a visual identifier, such as visual pattern 118 (FIGS. 7A-7B and 8). The user can scan the visual identifier using an optical scanner, such as external optical scanner 120 (FIGS. 7A and 8) or integrated optical scanner 122 (FIGS. 7A-8).

In step 1006, the dispense-identification data provided to the fluid dispensing meter is step 1004 is compared to authorized-dispense data stored in a memory of the fluid dispensing meter. In step 1008, the control circuitry determines if the user is authorized based on the comparison made in step 1006. For example, the control circuitry can compare the user-identification data to a list of authorized users stored in the memory. If the user-identification data does not match a user identity stored in the list of authorized users, then the answer is NO and the fluid dispensing meter will not allow the user to dispense fluid with fluid dispensing meter. If the user-identification data matches a user identity stored in the list of authorized users stored in the memory, then the answer is YES and method 1000 proceeds to step 1010.

In step 1010, the current dispense event is associated with the work order. In some examples, each authorized user is authorized to complete fluid dispenses for multiple work orders. In one example, the current dispense event is associated with the work order by selecting the work order via a user interface of the fluid dispensing meter. The multiple work orders associated with the user can be displayed on a display screen, such as display 100 (best seen in FIG. 6C), of the fluid dispensing meter. The user can select the appropriate work order for the current dispense event by navigating the display screen with the input, such as user input 102 (best seen in FIG. 6C), and selecting the work order. In another example, the user work order data is encoded in a visual identifier, such as visual pattern 118, and the user scans the visual identifier into the fluid dispensing meter using an optical scanner, such as external optical scanner 120 or integrated optical scanner 122.

In step 1012, the control circuitry of the fluid dispensing meter activates a trigger control mechanism, such as trigger control mechanism 78 (best seen in FIG. 6B). For example, the control circuitry can provide power to a solenoid, such as solenoid 96 (best seen in FIG. 6B), to cause the solenoid to lock a trip rod in position within the fluid dispensing meter. With the trigger control mechanism activated, the trigger of the fluid dispensing meter is able to shift a valve within the fluid dispensing meter into an open position.

In step 1014, the user dispenses the fluid with the fluid dispensing meter. Where a preset fluid volume is associated with the work order and/or the user, the control circuitry deactivates the trigger control mechanism based on the actual fluid volume dispensed reaching the preset fluid volume. Dispense information, such as the type of fluid dispensed, the identity of the user completing the dispense, the time of the dispense, the volume of fluid dispensed, and the location of the dispense are recorded. In one example, the dispense information is transmitted to a system controller, such as system controller 12 (FIGS. 6A, 7A, and 8), for fluid tracking and billing.

FIG. 11 is a flowchart illustrating method 1100 of authorizing fluid dispenses. In step 1102, a work order, and associated work order-identification data, is generated for a discrete dispense event. The work order-identification data can include dispense information relevant to the dispense event, such as, among others, the type of fluid to be dispensed, the volume of fluid to be dispensed, the location of the dispense, and customer information. In step 1104, the work order is associated with specific authorized users, such that the fluid dispensing meter will activate only for the specific users associated with the work order. The work order-identification data and associated authorized users are transmitted to one or more fluid dispensing meters, such as handheld meter 14B (FIGS. 6A-8). In step 1106, a dispense event is initiated by loading the work order to the fluid dispensing meter. For example, the work order number can be keyed into the fluid dispensing meter via a user interface of the fluid dispensing meter, or the work order number can be scanned into the fluid dispensing meter by an optical scanner, such as external optical scanner 120 (FIGS. 7A and 8) or integrated optical scanner 122 (FIGS. 7A-8).

In step 1108, user-identification data is received by the fluid dispensing meter. The user-identification data can be passively provided to the fluid dispensing meter by an authentication device utilizing near field communications, such as authenticator 70 (FIGS. 6A and 8). For example, the user can wear a bracelet, watch, ring, belt, or other authentication device that is NFC enabled, and the user-identification data can be transmitted to control circuitry of the fluid dispensing meter by the authenticator. In another example, the user-identification data is encoded in a visual identifier, such as visual pattern 118 (FIGS. 7A-7B and 8). The user can scan the visual identifier using an optical scanner, such as external optical scanner 120 (FIGS. 7A and 8) or integrated optical scanner 122 (FIGS. 7A-8).

In step 1110, the user-identification data provided to the fluid dispensing meter is step 1108 is compared to a list of authorized users stored in a memory of the fluid dispensing meter. In step 1112, the control circuitry determines if the user is authorized based on the comparison made in step 1110. If the user-identification data does not match a user identity stored in the list of authorized users, then the answer is NO and the fluid dispensing meter will not allow the user to dispense fluid with fluid dispensing meter. If the user-identification data matches a user identity stored in the list of authorized users stored in the memory, then the answer is YES and method proceed to step 1114.

In step 1114, the control circuitry of the fluid dispensing meter activates a trigger control mechanism, such as trigger control mechanism 78 (best seen in FIG. 6B). For example, the control circuitry can provide power to a solenoid, such as solenoid 96 (best seen in FIG. 6B), to cause the solenoid to lock a trip rod in position within the fluid dispensing meter. With the trigger control mechanism activated, the trigger of the fluid dispensing meter is able to shift a valve within the fluid dispensing meter into an open position.

In step 1116, the user dispenses the fluid with the fluid dispensing meter. In examples where a preset fluid volume is associated with the work order and/or the user the control circuitry deactivates the trigger control mechanism based on the actual fluid volume dispensed reaching the preset fluid volume. Dispense information, such as the type of fluid dispensed, the identity of the user completing the dispense, the time of the dispense, the volume of fluid dispensed, and the location of the dispense are recorded. In one example, the dispense information is transmitted to a system controller, such as system controller 12 (FIGS. 6A, 7A, and 8), for fluid tracking and billing.

Figure 12A:
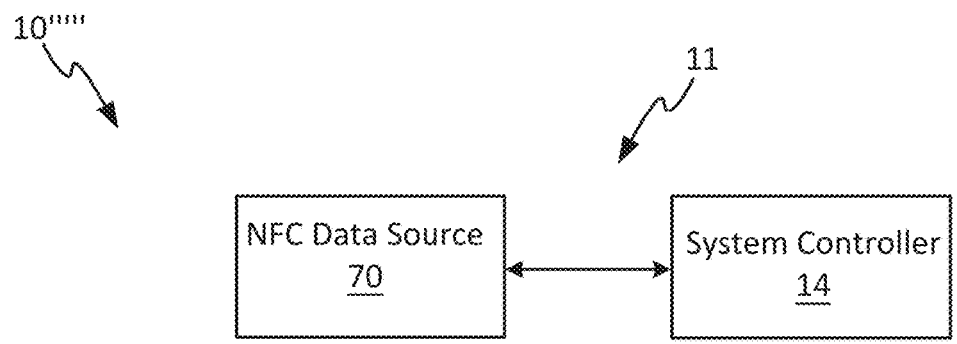
FIG. 12A is a schematic block diagram of a first part of a fluid management system.
Figure 12B:
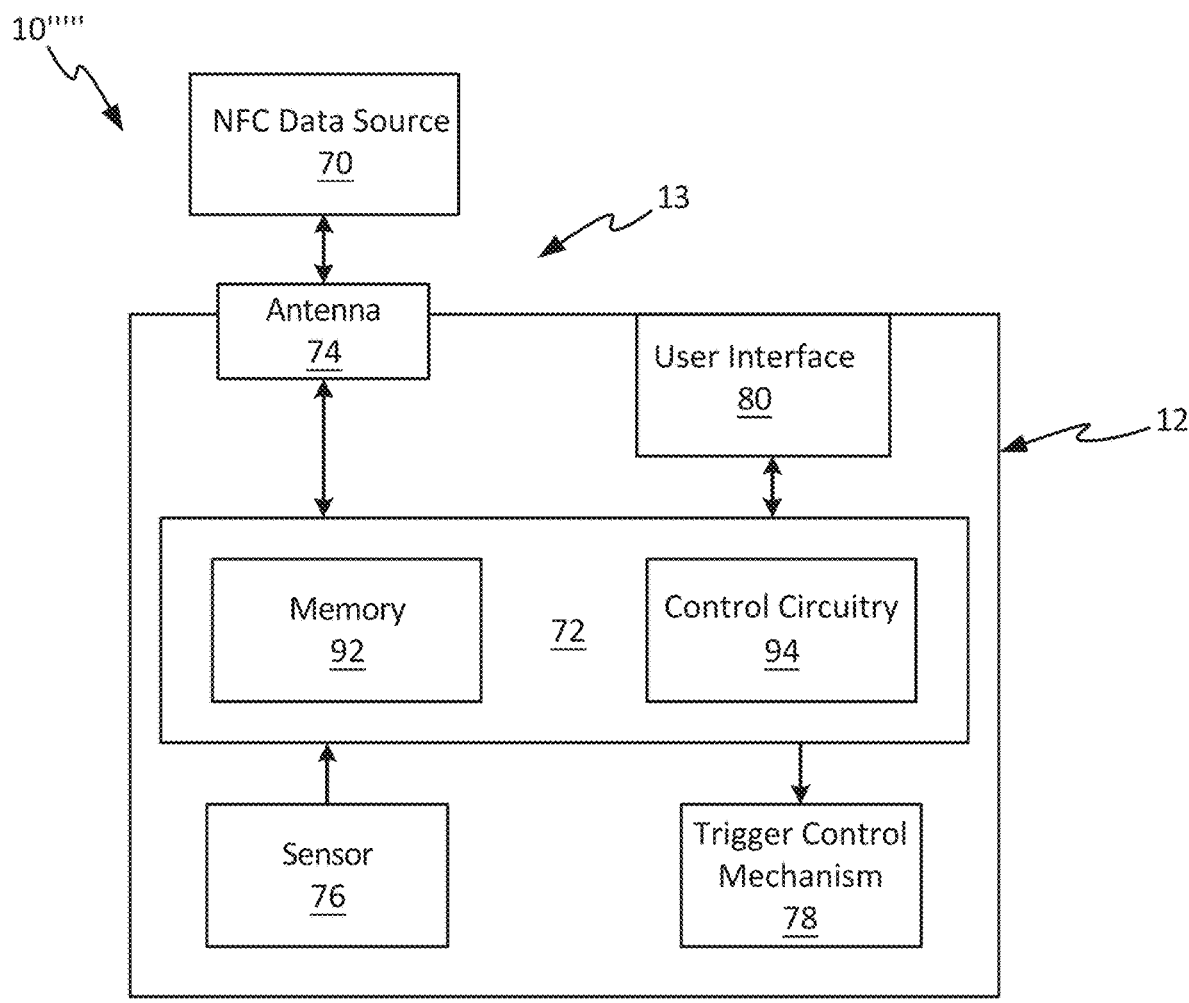
FIG. 12B is a schematic block diagram of a second part of the fluid management system shown in FIG. 12A.

FIG. 12A is a schematic block diagram of first part 11 of fluid management system 10""". FIG. 12B is a schematic block diagram of second part 13 of fluid management system 10""". First part 11 of fluid management system 10""" includes system controller 12 and authenticator 70. Second part 13 of fluid management system 10""" includes authenticator 70 and fluid dispensing meter 14B. Fluid dispensing meter 14B includes meter controller 72, antenna 74, sensor 76, trigger control mechanism 78, and user interface 80. Meter controller 72 includes memory 92 and control circuitry 94.

Fluid management system 10""" is a system for generating, authorizing, and tracking fluid dispense events. For example, fluid management system 10""" can be implemented in an automotive shop, on a manufacturing line, and/or at any other suitable location to track dispenses of oil, coolant, and other fluids. In first part 11 of fluid management system 10""", dispense-identification data is generated and written to authenticator 70. In second part 13 of fluid management system 10""", authenticator 70 communicates dispense-identification data to fluid dispensing meter 14B. Fluid dispensing meter 14B includes software stored on memory 92 that, when executed by control circuitry 94, authorizes or denies fluid dispenses by fluid dispensing meter 14B based on the dispense-identification data communicated to fluid dispensing meter 14B by authenticator 70.

Fluid dispensing meter 14B is configured to dispense and meter fluid at various locations within fluid management system 10""". Fluid management software is implemented on system controller 12, and system controller 12 is configured to generate work orders, track and record discrete fluid dispense events, and/or implement system-wide fluid tracking. It is understood that system controller 12 can be any suitable processor-based device for generating dispense information and writing the dispense information to authenticator 70. For example, system controller 12 can be a PC or a mobile device, such as a smart phone, personal data assistant, handheld bill payment machine, and/or a mobile point of sale system.

Authenticator 70 is a device configured to receive, store, and transmit data regarding fluid dispenses utilizing NFC. Authenticator 70 can also be referred to as an external data source and/or as an NFC data source. As such, authenticator 70 can automatically, wirelessly transmit and/or receive data when brought within a short distance, such as about 2.54-5.08 cm (about 1.00-2.00 in.), of a compatible device. Authenticator 70 can therefore be referred to as an NFC data source. Authenticator 70 is configured for NFC communications according to any desired standard, such as ISO/IEC 18092/ECMA-340; ISO/IEC 21481/ECMA-342; GSMA; NFC Forum; and/or any other applicable standard regarding NFC communications. Authenticator 70 can take any desired form that can receive an NFC tag to be capable of NFC communications. For example, authenticator 70 can be an NFC-configured wristband, an NFC-configured card, an NFC-configured sticker, an NFC-configured ring, an NFC-configured token, or any other desired NFC-capable device.

In first part 11 of fluid management system 10""", relevant dispense-authorization data is generated and stored on authenticator 70. The dispense-authorization data can be stored on authenticator 70 in a read-only format or a read-write format. The dispense-authorization data is provided to system controller 12, and system controller 12 writes the dispense-authorization data to authenticator 70. For example, a user can provide the dispense-authorization data to system controller 12 via a user interface of system controller 12, and the user can then cause system controller 12 to write the data to authenticator 70. While system controller 12 is described as generating and writing data to authenticator 70, it is understood that any device capable of writing information to an NFC device can be utilized to provide the dispense-identification data to authenticator 70. In addition, a programming unit separate from system controller 12 can be utilized to write the dispense-authorization data to authenticator 70. For example, a facility can include a plurality of programming units at locations remote from system controller 12 to facilitate loading information to authenticator 70. In some examples, the programming units are networked together and/or with system controller 12 to facilitate fluid management and tracking throughout fluid management system 10''''.

The dispense-authorization data includes sufficient information to facilitate a fluid dispense event. For example, the dispense-authorization data can include fluid type information and dispense volume information. The fluid type information provides information regarding the type of fluid for the dispense event, and the dispense volume information provides the volume of fluid for the fluid dispense event. The fluid type information can be generic, such as "motor oil," or can be specific, such as "10 W-30 synthetic motor oil." The dispense-authorization data can also include any additional information desired to be communicated to fluid dispensing meter 14B regarding the dispense event. For example, the dispense-authorization data can include user-identification data and work order-identification data. The dispense-authorization data can also be referred to as dispense-identification data.

In other examples, the data generated and stored in first part 11 can be initial configuration data regarding fluid dispensing meter 14B. Initial configuration data is the information provided to fluid dispensing meter 14B and stored in memory 92 during an initial set up of fluid dispensing meter 14B prior to operation. The initial configuration data is stored in memory 92 and is recalled during use of fluid dispensing meter 14B. The configuration data can include one or more of the type of fluid connected to fluid dispensing meter 14B, authorized-dispense data for fluid dispensing meter 14B, the display language of user interface 80 (e.g. English, Spanish, German, etc.), the units for dispense quantities (e.g. gallons, liters, etc.), and/or any other desired information for configuring fluid dispensing meter 14B for use.

In second part 13 of fluid management system 10'''', the dispense-authorization data generated and stored in first part 11 is communicated to fluid dispensing meter 14B by authenticator 70. The dispense-authorization data is utilized by fluid dispensing meter 14B to determine if a dispense event is authorized and/or to configure fluid dispensing meter 14B for use. Second part 13 of fluid management system 10'''' is separate from first part 11 in that authenticator 70 authorizes fluid dispenses in second part 13 without requiring any additional communication between system controller 12 and either authenticator 70 or fluid dispensing meter 14B.

Antenna 74 is disposed in and/or on fluid dispensing meter 14B and is in communication with control circuitry 94. Antenna 74, which is a data receiver and can, in some examples, also be a data transmitter, is configured to communicate with authenticator 70. As such, where authenticator 70 is an NFC-configured device, antenna 74 can be an NFC tag capable of communicating with authenticator 70. It is understood, that fluid dispensing meter 14B can be configured to communicate utilizing multiple modes of wireless communications, such as Bluetooth SIG (e.g., Bluetooth 5, Bluetooth low energy protocol stack, Bluetooth Ultra Low Power, etc.), Wibree, BlueZ, Affix, ISO 13157, IEEE 802/Wi Fi, ISO/IEC 15693, ISO/IEC 14443, ISM band, WLAN, active RFID (e.g., Active Reader Active Tag), passive RFID (e.g., Active Reader Passive Tag), NFCIP-1, ISO/IEC 18092, among other options. As such, fluid dispensing meter 14B can include one or more additional data receivers and/or data transmitters to facilitate communications utilizing the multiple modes.

Antenna 74 transmits information to and from meter controller 72 during operation. It is understood that antenna 74 can include transceiver electronics as known in the art. As such, antenna 74 can also be referred to as a transceiver that can transmit and/or receive data and that includes a physical component for transducing wireless signals and circuitry for handling/communicating the signals from the physical component, as known in the art. Memory 92 of fluid dispensing meter 14B includes software that, when executed by control circuitry 94, authorizes fluid dispenses; tracks and, in some examples, records the volume of fluid dispensed; and communicates fluid dispense information to the user and/or authenticator 70. Control circuitry 94, which can be implemented in some embodiments as a plurality of discrete circuitry subassemblies, can control trigger control mechanism 78 between the activated state and the deactivated state based on the data received from authenticator 70. As described above with regard to FIGS. 1-3, trigger control mechanism 78 controls the functionality of trigger 86 (best seen in FIG. 6B) such that the user can dispense fluid when trigger control mechanism 78 is in the activated state and the user cannot dispense fluid when trigger control mechanism 78 is in the deactivated state. Sensor 76 is disposed in fluid dispensing meter 14B and is configured to sense the volume of fluid flowing through fluid dispensing meter 14B during a dispense event and to generate a volumetric flow count. Sensor 76 communicates the volumetric flow count to meter controller 72.

During operation, authenticator 70 provides all information required to authorize a fluid dispense from fluid dispensing meter 14B. In first part 11, the dispense-authorization data is generated at system controller 12 and written to authenticator 70. Authenticator 70 facilitates information transfer between system controller 12 and fluid dispensing meter 14B. Authenticator 70 authorizes fluid dispenses by fluid dispensing meter 14B without requiring communication between fluid dispensing meter 14B and system controller 12 or any other central database. Instead, authenticator 70 is a physical object that provides information transfer between system controller 12 and fluid dispensing meter 14B

The user brings authenticator 70 within operable range of antenna 74. As described above, in some embodiments, authenticator 70 is an NFC-configured device and antenna 74 is an NFC tag. As such, the operable range is less than about 20 cm (about 8 inches) and preferably about 2.54-5.08 cm (about 1.00-2.00 in.). Antenna 74 is powered by the power source of fluid dispensing meter 14B, and antenna 74 wirelessly receives the dispense-authorization data from authenticator 70. As noted above, the dispense-authorization data includes sufficient information to facilitate the dispense event, such as the fluid type information and dispense volume information.

The dispense-authorization data is provided to fluid dispensing meter 14B by authenticator 70. Control circuitry 94 can recall configuration data from memory 92 and compare the configuration data to the dispense-authorization data. Control circuitry 94 can determine whether to authorize or deny the fluid dispense based on that comparison. For example, the configuration data can include the type of fluid that fluid dispensing meter 14B is connected to dispense. Control circuitry 94 then compares that configuration data to the fluid type information from the dispense-authorization data to determine the authorization status of the dispense event. If the fluid type information from the dispense-authorization data matches the fluid type information from the configuration data, then control circuitry 94 determines that fluid dispensing meter 14B can make the requested dispense. Control circuitry 94 causes trigger control mechanism 78 to enter the activated state, which allows the user to dispense fluid with fluid dispensing meter 14B.

As the fluid is dispensed, sensor 76 generates and communicates the volumetric flow count to control circuitry 94. Control circuitry 94 compares the volumetric flow count to the dispense volume information from the dispense-authorization data. Control circuitry 94 knows that fluid dispensing meter 14B has dispensed the full volume of fluid authorized for that dispense event when the volumetric flow count reaches the authorized dispense volume. Control circuitry 94 then causes trigger control mechanism 78 to enter the deactivated state, which stops the flow of fluid through fluid dispensing meter 14B and prevents the user from dispensing additional fluid. The fluid dispense event is thus complete.

Authenticator 70 can also, in some examples, include dispense-authorization data for multiple fluid dispense events. For example, authenticator 70 can include information for a first dispense event and a second dispense event. The dispense-authorization data for the first and second dispense events can include the same fluid type information with different dispense volume information. In such an instance, control circuitry 94 will prompt the user, via user interface 80, to select the dispense event that the user wants to complete. In examples where the first and second dispense events have different fluid types, control circuitry 94 can automatically select and authorize one of the dispense events based on the fluid type information from the configuration data.

Authenticator 70 can be configured as either read-only or read-write. When authenticator 70 is read-only, the dispense-authorization data remains on authenticator 70, such that authenticator 70 can authorize multiple dispenses of the same fluid type and quantity. When authenticator 70 is read-write, dispense-authorization data can be removed from authenticator 70 based on fluid dispensing meter 14B accepting and authorizing the fluid dispense event. Removing the dispense-authorization data from authenticator 70 prevents additional, undesired fluid dispenses and can be used to confirm dispenses. For example, the user can bring authenticator 70 back to system controller 12, and system controller 12 can read authenticator 70 to confirm the number of dispense authorizations remaining on authenticator 70. With authenticator 70 being read-write, fluid dispensing meter 14B can also write dispense information regarding each dispense event to authenticator 70. The dispense information is then stored on authenticator 70 until authenticator 70 is brought within operable range of system controller 12, at which point authenticator 70 communicates the dispense information to system controller 12 to facilitate system-wide fluid management and tracking. In other examples, fluid dispensing meter 14B can provide the dispense information directly to system controller 12, such as via Wi-Fi, Bluetooth, or other modes of wireless communication.

Fluid management system 10″″ and authenticator 70 facilitate efficient, secure fluid dispenses across a variety of applications.

In one example, authenticator 70 is configured as a fluid voucher. Authenticator 70 is loaded with dispense-authorization data for multiple dispense events at system controller 12. When authenticator 70 is brought within operable range of fluid dispensing meter 14B, fluid dispensing meter 14B authorizes a dispense event based on the dispense-authorization data contained on authenticator 70. The authorized dispense event is removed from authenticator 70 based on fluid dispensing meter 14B accepting and authorizing the dispense event. As such, authenticator 70 would then include dispense-authorization data for one less dispense event.

For example, authenticator 70 can be loaded with dispense-authorization data relating to five individual dispense events. The dispense-authorization data can be the same for each dispense event (i.e. all dispenses include the same fluid type information and dispense volume information) or can vary across the various dispense events. Authenticator 70 is brought within operable range of fluid dispensing meter 14B, and control circuitry 94 determines the authorization status based on the dispense-authorization data received from authenticator 70. If control circuitry 94 determines that the event is authorized, then control circuitry 94 will cause trigger control mechanism 78 to enter the activated state and will remove the dispense-authorization data from authenticator 70. With that dispense-authorization data removed from authenticator 70, authenticator 70 now includes dispense-authorization data for four additional dispense events.

Configuring authenticator 70 as a fluid voucher can provide significant advantages. A user, such as an automotive shop, can provide pre-loaded NFC data sources (i.e., authenticator 70) to customers that can be redeemed when bringing a vehicle in for servicing. Storing fluid vouchers on and redeeming fluid vouchers through authenticator 70 provides a secure system that avoids coupon issues, such as counterfeiting and alterations. The user simply brings authenticator 70 within operable range of fluid dispensing meter 14B to authorize the dispense event. Fluid dispensing meter 14B actually authorizing the dispense event validates the fluid voucher, providing increased confidence to both the user and the consumer.

In other examples, authenticator 70 is configured as a general authorization device for use of fluid dispensing meter 14B. For example, authenticator 70 can include dispense-authorization data that authorizes dispenses of a certain fluid type, such as transmission fluid. In some examples, the dispense-authorization data can further or alternatively include an authorized timeframe within which authenticator 70 is able to activate fluid dispensing meter 14B. For authenticator 70 to activate fluid dispensing meter 14B, control circuitry 94 compares the fluid type associated with fluid dispensing meter 14B to the fluid type information from the dispense-authorization data. Control circuitry 94 also or alternatively compares the authorized timeframe to the current time to determine if the dispense event is authorized. For example, the authorized timeframe can be the business hours of an automotive shop. Control circuitry 94 will deny any attempted fluid dispense occurring outside of the business hours based on current time being outside of the authorized timeframe provided by authenticator 70. In such an example, the authorized timeframe and/or dispense-authorization data can be read-only, such that the dispense-authorization data is not removed from authenticator 70 upon authorization of a dispense event by fluid dispensing meter 14B. Authenticator 70 being a general authorization device can provide significant advantages. As a general authorization device, authenticator 70 prevents unauthorized dispenses outside of a desired timeframe and provides greater end user confidence by ensuring that the correct, desired fluid is dispensed.

In other examples, authenticator 70 is configured as a rechargeable key. Authenticator 70 being a rechargeable key means that authenticator 70 provides authorization for a defined period before authenticator 70 needs to be reloaded to authorize additional fluid dispenses. The defined period can be based on a time period and/or a number of dispenses. For example, the authorized-dispense data can include a defined time period that begins to run when authenticator 70 first provides authorized-dispense data to fluid dispensing meter 14B or begins to run as soon as authorized-dispense data is loaded onto authenticator 70. Alternatively or in addition to the defined time period, a set number of dispenses can be written onto authenticator 70. Similar to the voucher capabilities discussed above, dispense-authorization data for a single dispense event can be subtracted from the plurality of dispense events each time a fluid dispense event is authorized by authenticator 70. Authenticator 70 would need to be reloaded with additional dispense-authorization data after the set number of dispenses is exhausted. Configuring authenticator 70 as a rechargeable key can provide significant advantages. Authenticator 70 prevents unauthorized dispense from occurring beyond the number authorized and/or outside of the authorized timeframe, providing increased security and confidence.

In other examples, fluid management system 10′′′′ is utilized for fleet-based fluid management to track, monitor, and authorize fluid dispenses for a fleet of vehicles. An authenticator 70 can be located on each individual vehicle in a fleet of vehicles and can be loaded with information specific to the individual vehicle. When the vehicle is brought in for servicing, the technician is able to recall relevant information regarding the vehicle by simply bringing fluid dispensing meter 14B within operable range of authenticator 70. Authenticator 70 provides relevant information to the user via user interface 80 of fluid dispensing meter 14B. In some examples, authenticator 70 can also provide immediate authorization for dispenses of various fluids based on the elapsed time since the vehicle was last serviced. Updated service information can be written to authenticator 70 by fluid dispensing meter 14B throughout servicing, such as at the end of each fluid dispense event.

For example, authenticator 70 can be located on a vehicle, such as by locating an NFC-configured sticker on the dashboard or the vehicle door jamb. The dispense-authorization data loaded onto authenticator 70 is based on the particular vehicle that authenticator 70 is associated with. For example, different engines require different types and quantities of fluids. The dispense-authorization data loaded onto authenticator 70 is specific to that vehicle's fluid requirements. Most vehicle fluids are supposed to be replaced after a certain time period or a certain number of miles driven. Authenticator 70 can automatically authorize fluid dispenses based on the certain time period passing since the most-recent servicing.

For example, the vehicle may require an oil change every three months and a power steering fluid change every three years. For example, it can be assumed that both of the fluids were changed at the first vehicle servicing. Dispense-authorization data regarding both the oil and the power steering fluid is written to authenticator 70 after the fluid dispenses are complete. The dispense-authorization data written to authenticator 70 can include a specific time interval for each fluid, the date on which the servicing occurred, and/or the date that the next servicing is required. The vehicle is brought in for its second servicing after five months. Fluid dispensing meter 14B is brought within operable range of authenticator 70, and authenticator 70 provides the dispense-authorization data to fluid dispensing meter 14B. Because more than three months have elapsed since the last oil change, authenticator 70 authorizes a fluid dispense event for oil. However, because less than three years have passed since the last power steering fluid change, authenticator 70 does not authorize a fluid dispense event for the power steering fluid. The dispense-authorization data for oil is reset such that authenticator 70 will not authorize another oil dispense until the specific time interval has passed since the second servicing.

Authenticator 70 can automatically reset the time interval based on authenticator 70 providing the authorization for an oil dispense to fluid dispensing meter 14B, based on fluid dispensing meter 14B accepting the authorization from authenticator 70, or based on the fluid dispense event being completed. For example, the user can dispense the oil and then bring fluid dispensing meter 14B within operable range of authenticator 70 to provide information to authenticator 70 and reset the specific time interval. Utilizing fluid management system 10′′ for fleet-based fluid management can provide significant advantages. The information specific to each vehicle in the fleet is stored on an authenticator 70 specific to that vehicle. The service technician does not need to look up the last service date for each fluid from a central database, but instead simply brings fluid dispensing meter 14B within operable range of authenticator 70. This provides a simpler, more efficient process for ascertaining the status of various fluids.

In another example, fluid management system 10′′′′ can be implemented during the vehicle manufacturing process. When a vehicle is manufactured it requires first fills of various fluids. Authenticator 70 can be loaded with dispense-authorization data for each of the various fluids, and authenticator 70 can be located on the vehicle in any desired manner. As such, authenticator 70 can provide a "recipe" for first fluid fills during manufacturing. As the vehicle reaches a point in the manufacturing process where a first fill is desired, a fluid dispensing meter 14B is brought within operable range of authenticator 70. Fluid dispensing meter 14B receives dispense-authorization data from authenticator 70. As discussed above, fluid dispensing meter 14B is initially configured at set up so fluid dispensing meter 14B knows the fluid type that fluid dispensing meter 14B is connected to. Fluid dispensing meter 14B will accept and initiate only fluid dispenses for the fluid type associated with fluid dispensing meter 14B during the initial configuration. In some instances, similar to the voucher example discussed above, the dispense-authorization data regarding that fluid is removed from authenticator 70 when the dispense event is accepted by fluid dispensing meter 14B. Removing the dispense-authorization data regarding the authorized dispense event from authenticator 70 provides tracking and eliminates uncertainty as to whether the fluid has previously been added. At the end of the manufacturing process, authenticator 70 can be checked to ensure that all required fluids have been added to the vehicle. Where authenticator 70 includes no additional dispense-authorization data, the manufacturer knows that all of the initial fluid fills have been completed.

Fluid management system 10′′′′ provides significant advantages. Fluid management system 10′′′′′ does not require any wired connections between the point of authorization, such as system controller 12, and fluid dispensing meter 14B. Instead, authenticator 70 is physically moved between the point of authorization and fluid dispensing meter 14B to provide dispense-authorization data to fluid dispensing meter 14B. In addition, first part 11 and second part 13 of fluid management system 10′′′′ are separate; as such, dispense events can be created and loaded to authenticator 70, and authenticator 70 can be managed as a physical component of fluid management system 10''''. Managing authenticator 70 as a physical component of fluid management system 10'''' provides greater certainty to the user and simplifies tracking of fluid dispenses. In addition, fluid management system 10'''' utilizes NFC to transfer data to and from authenticator 70, which protects against RF interference that can affect other wireless systems. Authenticator 70 can also take any desired form capable of supporting an NFC tag, such as a card, fob, wearable, sticker, etc. Authenticator 70 can thus be implemented in any desired way to best meet the requirements of the particular application that authenticator 70 is being used in. Authenticator 70 thereby provides flexibility to fluid management system 10'''' to allow fluid management system 10'''' to adapt to any desired environment, from an automotive shop to a manufacturing line.

Figure 13:
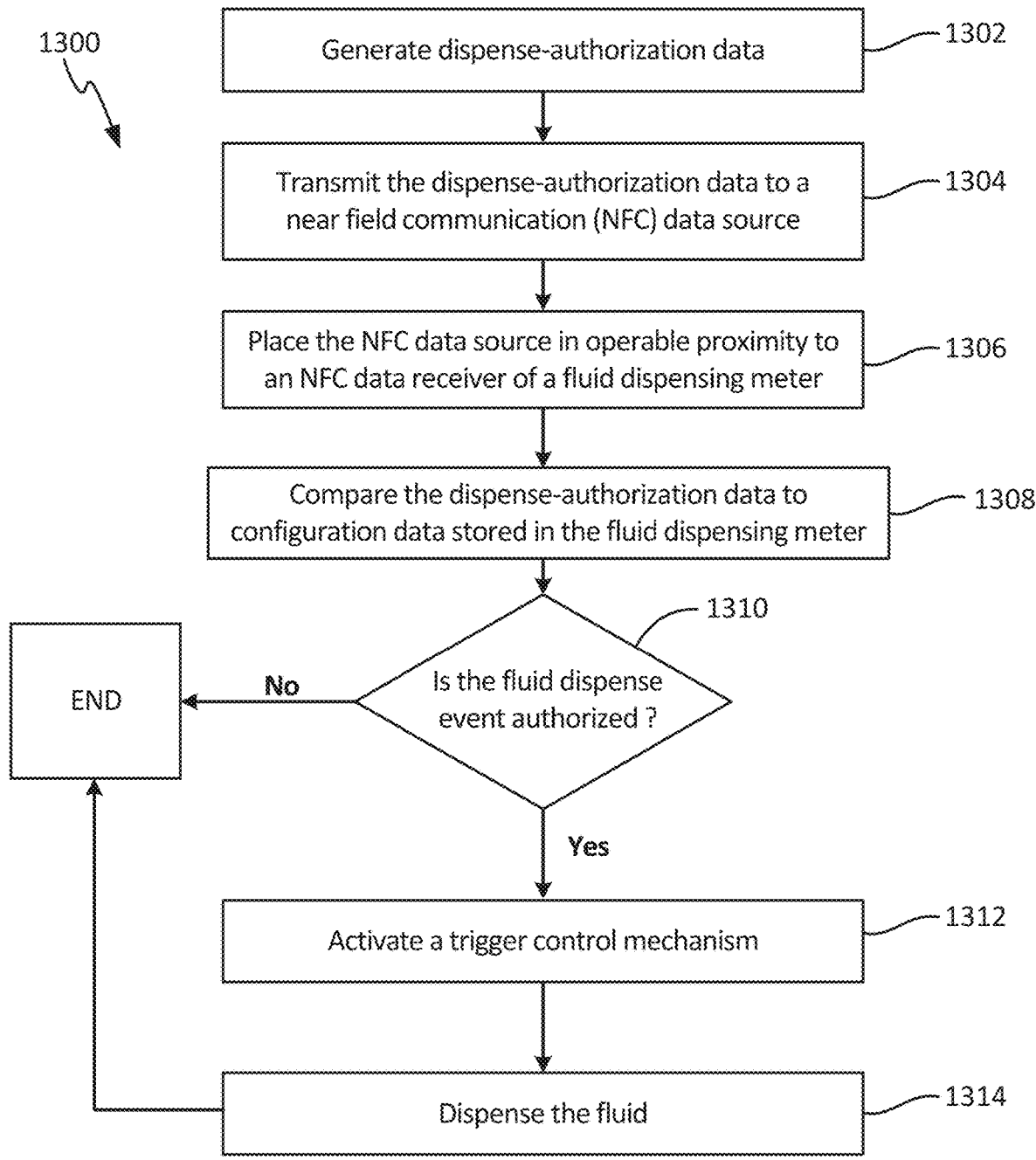
FIG. 13 is a flowchart illustrating a method of dispensing fluid.

FIG. 13 is a flowchart illustrating method 1300 of dispensing fluid. Method 1300 is performed using a fluid management system, such as fluid management system 10'' (FIGS. 12A and 12B), and a near field communication ("NFC") data source, such as authenticator 70 (FIGS. 12A and 12B), to provide user-identification data, work order data, and/or other data to a fluid dispensing meter, such as fluid dispensing meter 14B (shown in FIGS. 6A-6C, 12A, and 12B). The fluid dispensing meter includes a trigger control mechanism, such as trigger control mechanism 78 (best seen in FIG. 6B); an NFC data receiver, such as antenna 74 (FIG. 12B); and a control board, such as meter controller 72 (shown in FIGS. 6A-7A, 7C, 8, and 12B). However, with this embodiment, the dispensing meter may, optionally, not include a Wi-Fi antenna. Instead (or in addition to the Wi-Fi antenna), the fluid data receiver is configured to receive the dispense-authorization data (e.g., a fluid dispense "voucher") from an NFC-configured data source, which may be in addition to or in lieu of the user-identification data. The control board includes a processor, such as control circuitry 94 (FIG. 12B), and a memory, such as memory 92 (FIG. 12B), encoded with instructions that, when executed by the processor, cause the processor to recall the dispense-authorization data (and other data) from the NFC data source, and to control the trigger control mechanism between the activated state and the deactivated state based on the dispense-authorization data. The trigger control mechanism is mounted in a body of the fluid dispensing meter and is controllable between an activated state, where the fluid dispensing meter can dispense fluid, and a deactivated state, where the fluid dispensing meter is prevented from dispensing fluid.

In step 1302, a work order for a fluid dispense event is created. By way of example, a vehicle service department manager or parts department manager may create a fluid dispense work order on a computer with a processor, such as on system controller 12 (shown in FIGS. 1, 2, 6A, 7A, and 12A). The work order includes dispense-authorization data, such as the type and amount of fluid to be dispensed.

In step 1304, the dispense-authorization data is written to the NFC data source. The dispense-authorization data can be written to the NFC data source in any applicable manner. For example, the computer on which the work order was created can be linked to a NFC reader/writer, which is used to transmit the dispense-authorization data to the NFC chip.

In step 1306, the NFC data source is placed within an operable proximity of the NFC data receiver of the fluid dispensing meter. With NFC data source within operable proximity, NFC data source is activated and transmits the dispense-authorization data to the fluid dispensing meter via the NFC data receiver. In some examples, the data transmission can be preceded by activating the fluid dispensing meter. For example, the dispensing meter may be asleep, and as such, may need to be awoken; or the NFC data receiver in the dispensing meter may need to be activated. Additionally, method 1300 can include the user authentication steps as described in method 900 (FIG. 9), method 1000 (FIG. 10), or method 1100 (FIG. 11). The NFC data receiver transmits the dispense-authorization data to the control board, where the processor determines the authorization status of the fluid dispense event based on the dispense-authorization data.

In step 1308, the dispense-authorization data provided in step 1306 is compared to configuration data stored in the memory of the fluid dispensing meter. In step 1310, the processor of the fluid dispensing meter determines an authorization status based on the dispense-authorization data. Initially, the processor can determine whether the dispense-authorization data includes sufficient information for a fluid dispense event. For example, the processor can be configured to accept the dispense-authorization data only if fluid type information is provided to ensure that the fluid dispensing meter can actually perform the requested fluid dispense. The processor compares the dispense-authorization data to configuration data recalled from the memory of the fluid dispensing meter to determine the authorization status of the fluid dispense event. In some examples, the processor can proceed straight to the comparison without checking for sufficient information. In such an example, the processor recognizes that there is insufficient information when making the comparison and can deny the fluid dispense based on that recognition. Alternatively, the authorization and/or denial can be based on additional authorization parameters (e.g., dispense volume information, user authorization status, etc.). If the dispense-authorization data is insufficient or not accepted, then the answer is NO and the fluid dispensing meter will not allow the user to dispense fluid with the fluid dispensing meter. If the dispense-authorization data is sufficient and accepted, then the answer is YES and method 1300 proceeds to step 1310.

In step 1312, if the fluid dispense is authorized, the processor causes the trigger control mechanism to enter the activated state. With the trigger control mechanism in the activated state, the user is able to depress the trigger and dispense fluid from the fluid dispensing meter. In step 1314, the fluid is dispensed from the fluid dispensing meter. In some examples, the control circuitry can cause the trigger control mechanism to shift back to the deactivated state based on the dispense-authorization data. As discussed above, the dispense-authorization data can include dispense volume information. A sensor disposed in the fluid dispensing meter senses the volumetric fluid flow through the fluid dispensing meter. The sensor generates a volumetric flow count and provides that volumetric flow count to the processor. The processor can cause the trigger control mechanism to reenter the deactivated state based on the volumetric flow count reaching the dispense volume. Some embodiments may also allow reporting of the fluid dispense, such as writing the dispense results back onto the NFC chip, storing the dispense results in the dispensing meter memory until such time a data migration is performed, or transmitting the dispense results via a Wi-Fi network (if the dispensing meter is equipped with a Wi-Fi antenna and connected to the network).

Figure 14A:
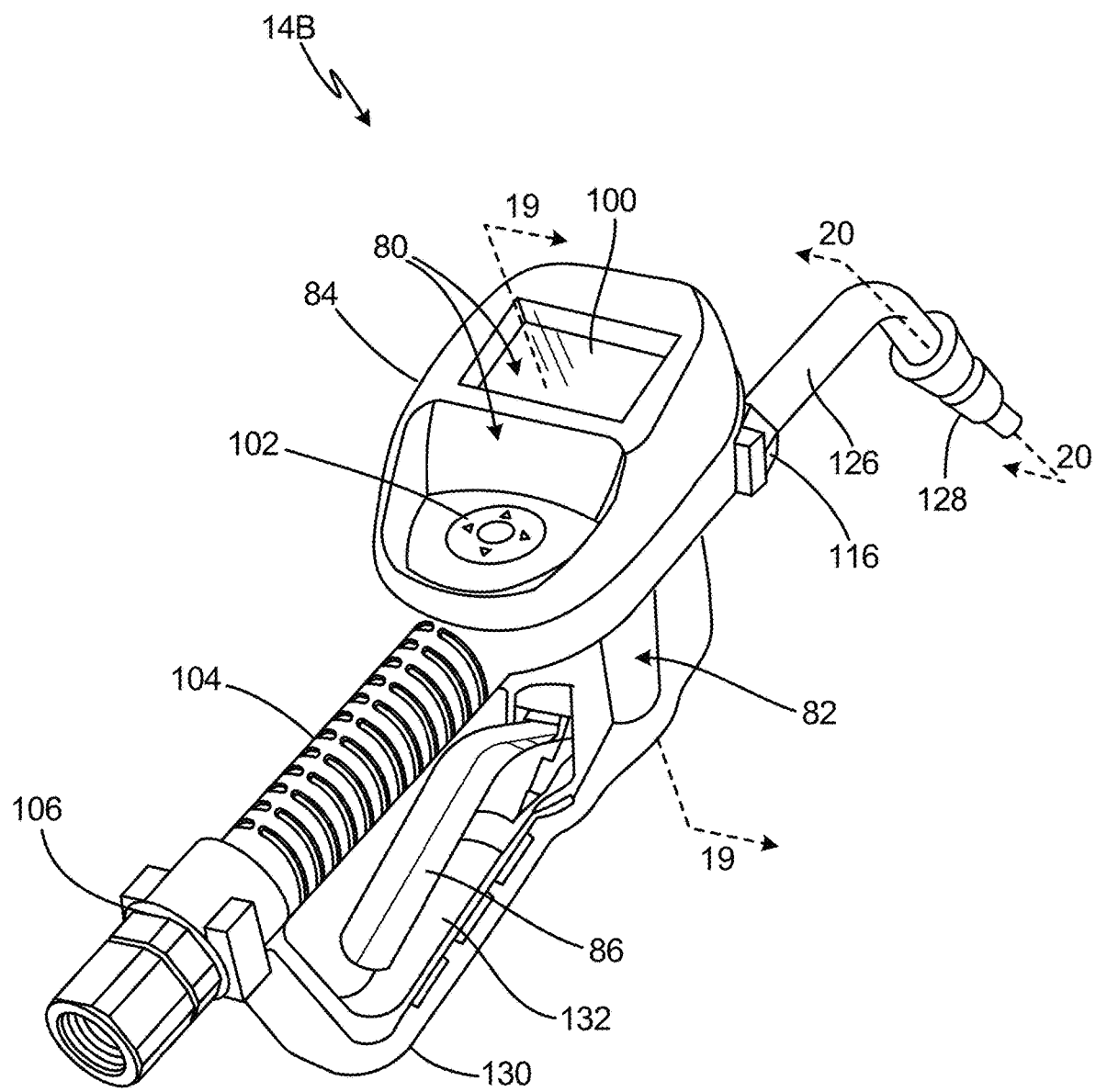
FIG. 14A is an isometric view of a handheld meter.
Figure 14B:
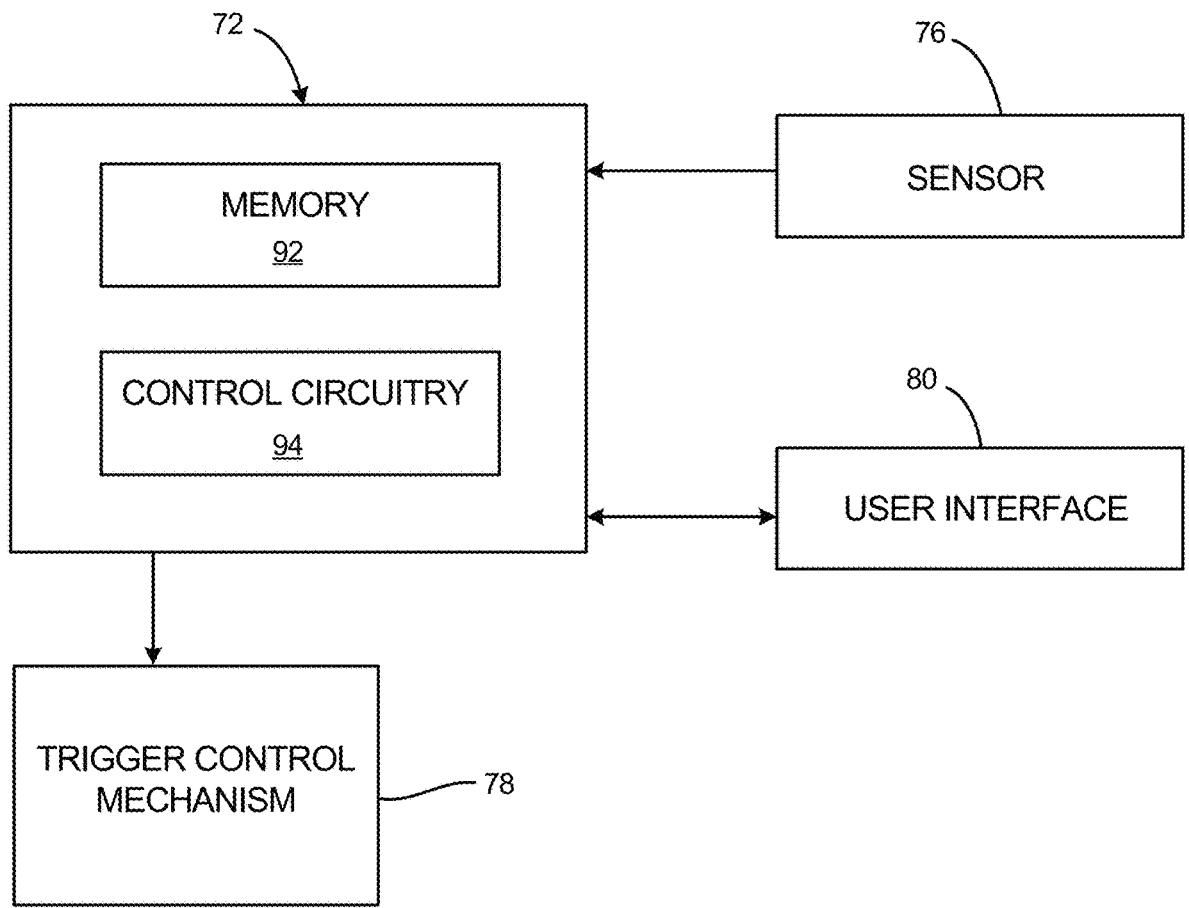
FIG. 14B is a simplified block diagram of the electronic components of a handheld meter.

FIG. 14A is an isometric view of handheld meter 14B. FIG. 14B is a simplified schematic block diagram of the electronic components of handheld meter 14B. FIGS. 4A and 14B will be discussed together. Handheld meter 14B includes meter controller 72 (FIG. 14B), sensor 76 (FIG.

14B), trigger control mechanism 78 (FIG. 14B), user interface 80, meter body 82 (FIG. 14A), trigger 86 (FIG. 14A), bezel housing 84 (FIG. 14A), extension 126 (FIG. 14A), nozzle 128 (FIG. 14A), and elastomeric trigger guard 130 (FIG. 14A). Meter body 82 includes handle 104 (FIG. 14A), fluid inlet 106 (FIG. 14A), fluid outlet 116 (FIG. 14A), and integral trigger guard 132 (FIG. 14A). Meter controller 72 includes memory 92 (FIG. 14B) and control circuitry 94 (FIG. 14B). User interface 80 includes user input 102 (FIG. 14A) and display 100 (FIG. 14A).

Handheld meter 14B is a meter for use in a system for dispensing fluid and tracking fluid dispenses, such as fluid management system 10 (FIG. 1), fluid management system 10' (FIG. 2), fluid management system 10" (FIG. 6A), and fluid management system 10'" (FIG. 7A), fluid management system 10"" (FIG. 8), and fluid management system 10""' (FIGS. 12A and 12B). For example, the fluid dispensing system can be implemented in an automotive shop to track oil, automotive transmission fluid, coolant, and other bulk dispense fluids.

Fluid inlet 106 opens into handle 104 and is configured to connect to a supply line to receive fluid from a storage container. Fluid outlet 116 extends through meter body 82 downstream of an internal valve, such as valve 88 (best seen in FIGS. 16A-16C), and other metering components. Fluid outlet 116 provides an outlet for fluid to exit meter body 82. Extension 126 is connected to fluid outlet 116, and nozzle 128 is mounted on an end of extension 126 opposite fluid outlet 116. The fluid exits handheld meter 14B through nozzle 128.

Bezel housing 84 is mounted on meter body 82. Bezel housing 84 encloses and supports various electronic components of handheld meter 14B, such as meter controller 72, user interface 80, and trigger control mechanism 78. Meter controller 72 is disposed in bezel housing 84 and includes memory 92 and control circuitry 94. Memory 92 stores software that, when executed by control circuitry 94, authorizes fluid dispenses, tracks and records the volume of each fluid dispense, and communicates fluid dispense information to and from the user. User interface 80 is disposed on and in bezel housing 84 and is configured to receive inputs from and provide outputs to the user. User input 102 is disposed on bezel housing 84 in line with handle 104. User input 102 is slightly elevated relative to handle 104 and is positioned in a convenient, ergonomic location for the user to utilize user input 102 with the user's thumb while the user grasps handle 104 of handheld meter 14B. User input 102 includes a button pad, but it is understood that user input 102 can be of any suitable configuration for receiving information from the user, such as a touchscreen. Display 100 provides visual information to the user. For example, display 100 can be a liquid-crystal display ("LCD") for providing visual information to the user. Display 100 is oriented such that display 100 tilts towards handle 104, which positions display perpendicular to the user's viewing angle, providing an ergonomic viewing angle for the user.

Control circuitry 94, in one example, is configured to implement functionality and/or process instructions. For instance, control circuitry 94 can be capable of processing instructions stored in memory 92. Examples of control circuitry 94 can include any one or more of a microprocessor, a controller, a digital signal processor (DSP), an application specific integrated circuit (ASIC), a field-programmable gate array (FPGA), or other equivalent discrete or integrated logic circuitry.

Memory 92, in some examples, can be configured to store information during operation. Memory 92, in some examples, is described as computer-readable storage media. In some examples, a computer-readable storage medium can include a non-transitory medium. The term "non-transitory" can indicate that the storage medium is not embodied in a carrier wave or a propagated signal. In some examples, memory 92 is a temporary memory, meaning that a primary purpose of memory 92 is not long-term storage. Memory 92, in some examples, is described as volatile memory, meaning that memory 92 does not maintain stored contents when power to handheld meter 14B is turned off. Memory 92, in some examples, also includes one or more computer-readable storage media. Memory 92 can be configured to store larger amounts of information than volatile memory. Memory 92 can further be configured for long-term storage of information. In some examples, memory 92 includes non-volatile storage elements.

Trigger 86 extends from meter body 82 and interfaces with the valve disposed in meter body 82. The user pulls trigger 86 to shift the valve to the open position, thereby opening the fluid flow path through meter body 82 between fluid inlet 106 and fluid outlet 116. Integral trigger guard 132 is integral with meter body 82 and encloses trigger 86. As such, integral trigger guard 132 can be metallic, same as meter body 82. Elastomeric trigger guard 130 is mounted to integral trigger guard 132 and encloses the pivot point where trigger 86 connects to trigger control mechanism 78. Elastomeric trigger guard 130 is configured to prevent any pinching or entanglement at the pivot point.

During operation, the user grasps handle 104 to control the position of handheld meter 14B and to control dispenses from handheld meter 14B. The user can input information to handheld meter 14B via user input 102. In some examples, meter controller 72 wirelessly communicates with a system controller. Meter controller 72 can receive a dispense command and, based on the dispense command, can authorize a dispense event. With a dispense event authorized, meter controller 72 communicates with trigger control mechanism 78 allow trigger 86 to shift the valve to the open position. With the valve in the open position, the metered fluid flows through handheld meter 14B from fluid inlet 106 to fluid outlet 116 and then downstream to nozzle 128 through extension 126. The metered fluid is dispensed through nozzle 128. As the metered fluid flows through meter body 82, sensor 76 provides a measure of the volumetric flow of the fluid to meter controller 72. In some examples, sensor 76 is a reed switch configured to sense the rotation of metering gears in the fluid flow path between fluid inlet 106 and fluid outlet 116. When the volumetric flow reaches the authorized volume, meter controller 72 can deactivate trigger control mechanism 78 such that trigger 86 is no longer able to shift and/or hold the valve in the open position.

Figure 15A:
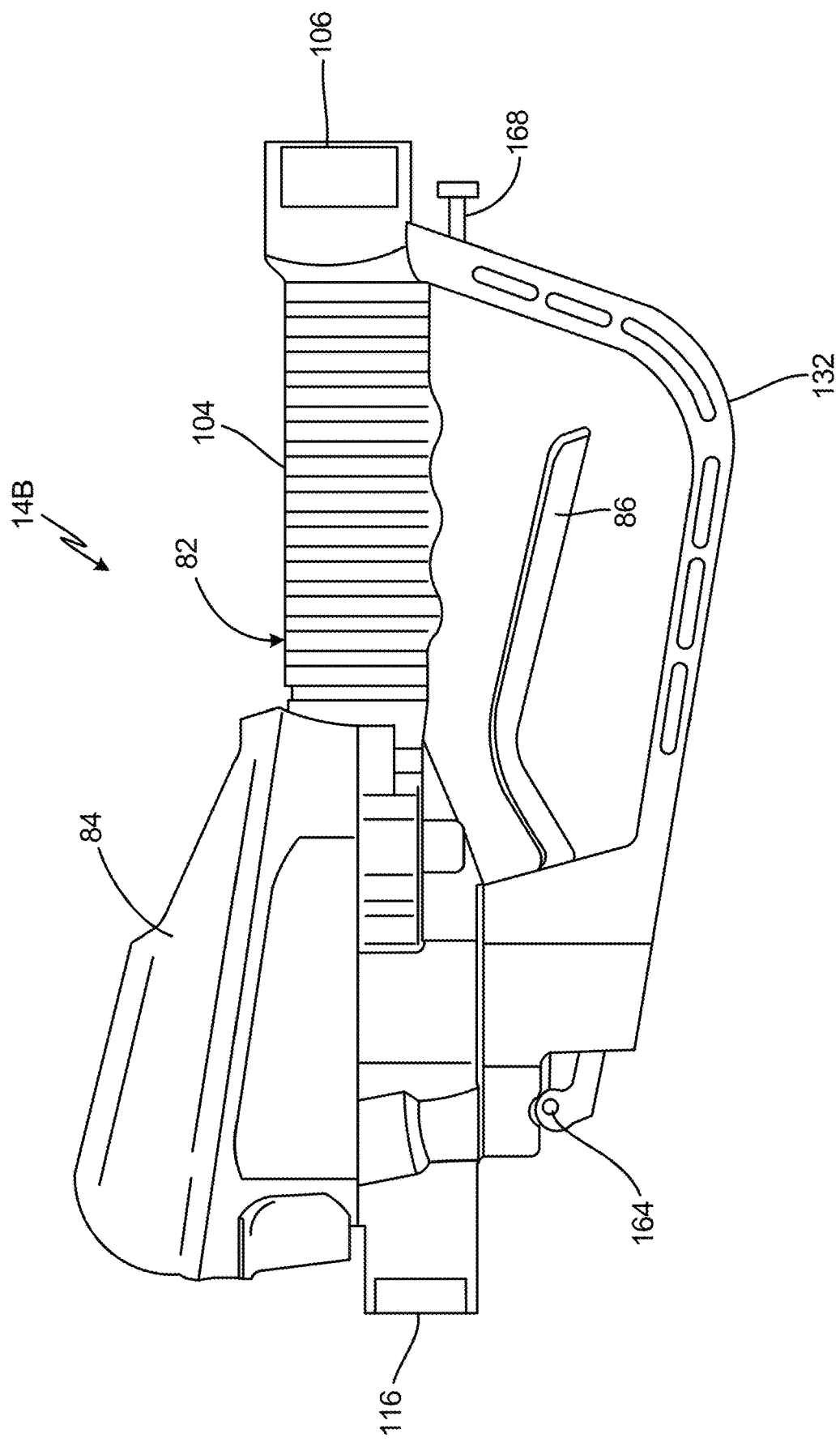
FIG. 15A is a side elevation view of a meter body of a dispense meter.
Figure 15B:
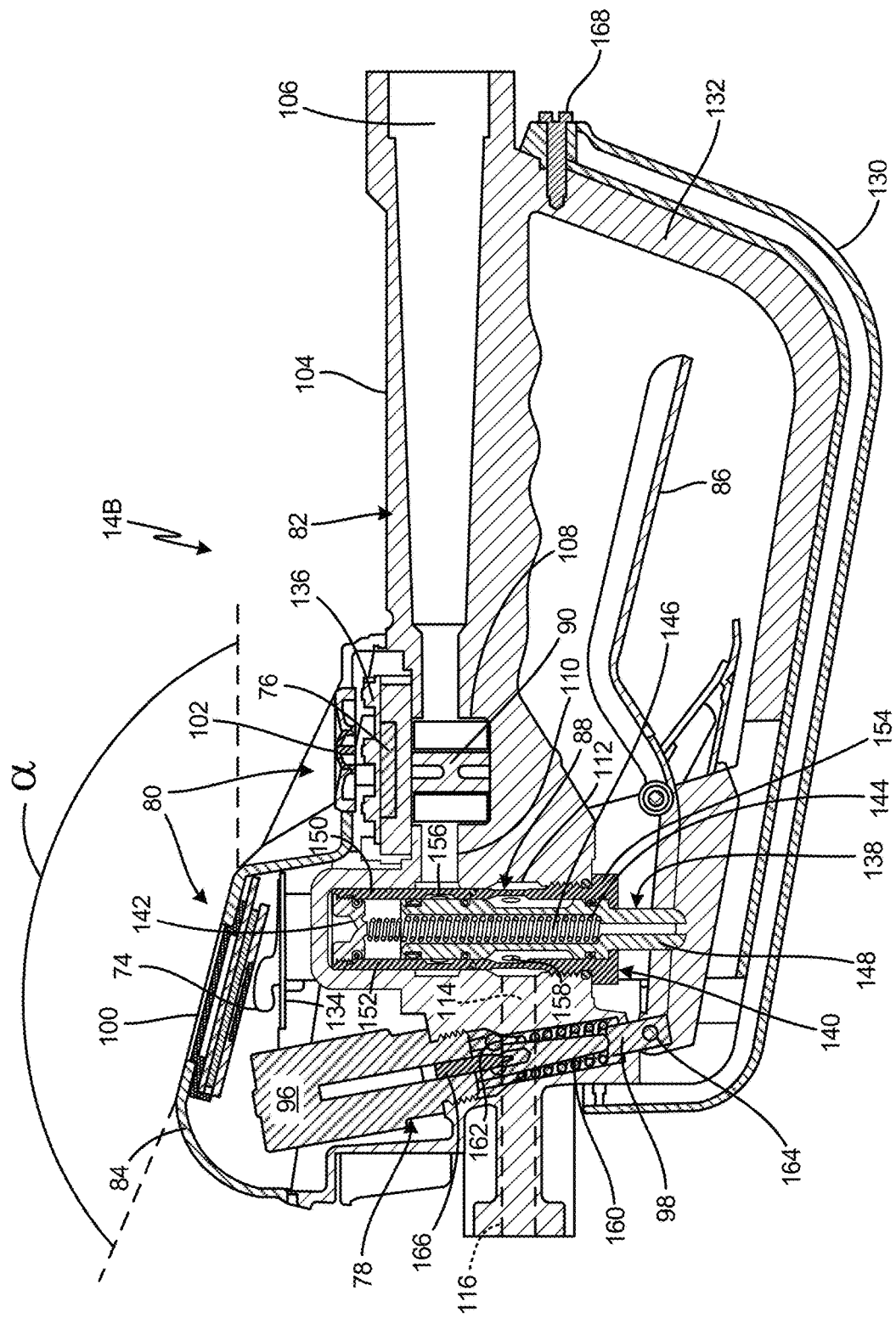
FIG. 15B is a cross-sectional view of the meter body of FIG. 15A.

FIG. 15A is a side elevation view of handheld meter 14B. FIG. 15B is a cross-sectional view of handheld meter 14B. FIGS. 15A-15B will be discussed together. Handheld meter 14B includes meter body 82, trigger 86, bezel housing 84, elastomeric trigger guard 130 (FIG. 15B), sensor 76 (FIG. 15B), user interface 80 (FIG. 15B), trigger control mechanism 78 (FIG. 15B), handle 104, meter 90 (FIG. 15B), valve 88 (FIG. 15B), first circuit board 134 (FIG. 15B), second circuit board 136 (FIG. 15B), and antenna 74 (FIG. 15B). Meter body 82 includes integral trigger guard 132, fluid inlet 106, fluid outlet 116, metering chamber 108 (FIG. 15B), valve inlet port 110 (FIG. 15B), valve outlet port 114 (FIG. 15B), and valve cavity 112 (FIG. 15B). User interface 80 includes user input 102 (FIG. 15B) and display 100 (FIG. 15B). Valve 88 includes valve stem 138 (FIG. 15B), valve cartridge 140 (FIG. 15B), valve cap 142 (FIG. 15B), and valve spring 144 (FIG. 15B). Valve stem 138 includes stem bore 146 (FIG. 15B) and actuation tip 148 (FIG. 15B). Valve cartridge 140 includes cartridge body 150 (FIG. 15B), and cartridge body 150 includes first end 152 (FIG. 15B), second end 154 (FIG. 15B), radial inlets 156 (FIG. 15B), and radial outlets 158 (FIG. 15B). Trigger control mechanism 78 includes solenoid 96 (FIG. 15B), trip rod 98 (FIG. 15B), reset spring 160 (FIG. 15B), balls 162 (FIG. 15B), trigger pin 164, and plunger pin 166 (FIG. 15B).

Handle 104 is configured to be grasped by a single hand of the user. Trigger 86 is disposed below handle 104 and is configured to be pulled by the user to commence a dispense event. Integral trigger guard 132 is integral with meter body 82 and encloses trigger 86. Elastomeric trigger guard 130 is mounted to integral trigger guard 132 by fastener 168 and two additional fasteners (not shown) extending into meter body 82 at location 99. Elastomeric trigger guard 130 encloses the pivot point between trigger 86 and trigger control mechanism 78. Bezel housing 84 is mounted on meter body 82 and is configured to enclose various electronic components of handheld meter 14B. Bezel housing 84 can be made of any suitable material, such as a plastic.

Trigger control mechanism 78 is attached to meter body 82 and partially extends into bezel housing 84. Trigger control mechanism 78 is configured to control trigger 86 between an activated state, where trigger 86 can actuate valve 88 to the open position, and a deactivated state, where trigger 86 cannot actuate valve 88. Solenoid 96 is connected to meter body 82. Trip rod 98 interfaces with solenoid 96 and extends between solenoid 96 and trigger 86. Balls 162 are disposed in trip rod 98. Plunger pin 166 extends from solenoid 96 and is configured to interface with balls 162 to lock trip rod 98 in position in the activated state. Trip rod 98 is connected to trigger 86 by trigger pin 164. Reset spring 160 is disposed around trip rod 98 and is configured to drive trip rod 98 towards solenoid 96 to return trip rod 98, and thus trigger 86, to an inactive position, such that trip rod 98 is ready to be engaged for the next dispense event.

Fluid inlet 106 extends into handle 104 of handheld fluid meter 90. Fluid inlet 106 is configured to connect to a supply line to receive fluid from a storage container through the supply line. Fluid inlet 106 extends through handle 104 to metering chamber 108. Metering chamber 108 is disposed in meter body 82 between fluid inlet 106 and valve inlet port 110. Meter 90 is disposed in metering chamber 108. In some examples, meter 90 is a positive displacement meter, such as a gear meter.

Valve cavity 112 is disposed in meter body 82. Valve inlet port 110 extends through meter body 82 between metering chamber 108 and valve cavity 112. Valve outlet port 114 extends out of valve cavity 112 to fluid outlet 116. Valve 88 is disposed in valve cavity 112 and controls the flow of fluid through valve cavity 112 between valve inlet port 110 and valve outlet port 114.

Valve cartridge 140 is disposed in valve cavity 112. Radial inlets 156 extend through first end 152 of cartridge body 150 proximate valve inlet port 110. Radial inlets 156 are disposed circumferentially around cartridge body 150 and provide a flow path for the metered fluid to flow into valve cartridge 140 from fluid inlet 106. Radial outlets 158 extend through second end 154 of cartridge body 150 proximate valve outlet port 114. Radial outlets 158 are disposed circumferentially around cartridge body 150 and provide a flow path for the metered fluid to flow out of valve cartridge 140 to fluid outlet 116. Valve cap 142 is attached to first end 152 of valve cartridge 140 and is configured to prevent the metered fluid from entering valve cartridge 140 through first end 152.

Valve stem 138 is disposed in valve cartridge 140. Valve stem 138 is movable between an open position, where the metered fluid can flow from valve inlet port 110 to valve outlet port 114 through valve 88, and a closed position, where the metered fluid is prevented from flowing from valve inlet port 110 to valve outlet port 114 through valve 88. Actuation tip 148 extends out of valve cavity 112 and second end 154 of valve cartridge 140 and abuts trigger 86. Stem bore 146 extends through valve stem 138 and actuation tip 148 and is exposed to atmosphere. Stem bore 146 provides a pathway for air to flow into and out of valve cartridge 140 as valve stem 138 shifts between the open position and the closed position, thereby preventing undesired pressurization within valve cartridge 140. In addition, stem bore 146 provides a leak path for the metered fluid to flow out of valve 88 and provide a visual indication of a leak between valve stem 138 and valve cartridge 140. Valve spring 144 extends from valve cap 142 into stem bore 146 of valve stem 138. Valve spring 144 is configured to exert a force on valve stem 138 to return valve stem 138 to the closed position.

Sensor 76 is disposed directly above and adjacent to meter 90. Sensor 76 can be any suitable sensor for determining the volumetric flow of the fluid passing through metering chamber 108. For example, sensor 76 can be a reed switch. Where sensor 76 is a reed switch, sensor 76 interfaces with meter 90 to count the rotation of the gears, which provides a volumetric count of the fluid passing through meter 90. User input 102 is disposed on bezel housing 84 above sensor 76. User input 102 is configured to receive commands from the user and provide those commands to meter controller 72 (FIG. 14B). Second circuit board 136 is associated with both user input 102 and sensor 76 and provides electrical and communicative connections for both user input 102 and sensor 76. In some examples, second circuit board 136 is attached to bezel housing 84. Having both user input 102 and sensor 76 integrated into common second circuit board 136 allows for user input 102 to be disposed on a portion of bezel housing 84 disposed below the remaining portion of bezel housing 84. As discussed above, positioning user input 102 in-line with handle 104 and at approximately the same height as handle 104 provides increased comfort and ergonomics to the user. As such, the in-line user input 102 provides the user comfortable access to user input 102 while the user grasps handle 104 with a single hand. Moreover, the height of user input 102 reduces strain on the hand and thumb of the user and reduces the hand movements required to manipulate user input 102.

Display 100 is supported by bezel housing 84. Display 100 provides visual information regarding the fluid dispense and handheld meter 14B to the user. Display 100 is angled towards handle 104 to provide the user with an ergonomic viewing angle. As shown in FIG. 15B, display 100 is disposed at angle α relative to handle 104. Angle α can be any desired angle such that display 100 is not oriented away from the user or downward towards handle 104, such as where angle α is between 90-degrees and 180-degrees. In some examples, angle α is between 150-degrees and 170-degrees. Antenna 74 is disposed within bezel housing 84 and is configured to provide wireless communications abilities to handheld meter 14B to allow handheld meter 14B to communicate with other components within a fluid management system. First circuit board 134 is mounted within bezel housing between meter body 82 and user interface 80. The meter controller, such as meter controller 72, can be disposed on first circuit board 134, second circuit board 136, or both.

A dispense event is initiated when handheld meter 14B receives a dispense command, either from the user or from the fluid management system. The dispense command can be provided to handheld meter 14B wirelessly via antenna 74 and/or can be provided by the user via user input 102. In some examples, the dispense command can include a desired volumetric count, which is the volume of the metered fluid that is to be dispensed during the dispense event. Based on the dispense command, the meter controller activates trigger control mechanism 78. In the activated position, solenoid 96 displaces plunger pin 166 into trip rod 98. Plunger pin 166 causes balls 162 to engage meter body 82, thereby locking trip rod 98 in the position shown in FIG. 15B. With trip rod 98 locked in position, trigger 86 pivots about trigger pin 164. Depressing trigger 86 thus causes valve stem 138 to shift upwards within valve cartridge 140 to the open position, opening a flow path through valve 88.

The metered fluid enters handheld meter 14B through fluid inlet 106, flows through metering chamber 108, and flows into valve inlet port 110. In examples where meter 90 is a gear meter, the flow of the metered fluid causes the gears of meter 90 to rotate, and sensor 76 counts the rotations of the gears. Because the volume of fluid flowing through the gears with each rotation is known, the meter controller can generate a volumetric count based on the information provided by sensor 76. The meter controller tracks the volumetric count and, in some examples, is configured to deactivate trigger control mechanism 78 when the actual volumetric count provided by sensor 76 reaches the desired volumetric count. The meter controller can provide information regarding the dispense event to the user via display 100.

The metered fluid flows into valve cavity 112 from valve inlet port 110. The fluid enters valve cartridge 140 through radial inlets 156, flows around valve stem 138, and exits valve cartridge 140 through radial outlets 158. The meter fluid exits valve cavity 112 through valve outlet port 114 and flows downstream out of meter body 82 through fluid outlet 116.

When the volumetric count reaches the desired volumetric count, the meter controller deactivates trigger control mechanism 78, preventing any additional, unauthorized fluid dispensing. Solenoid 96 retracts plunger pin 166, thereby unlocking trip rod 98 such that trip rod 98 can freely slide within meter body 82. Reset spring 160 exerts an upward force on trip rod 98, which assists solenoid 96 in the removal of plunger pin 166 from trip rod 98. In some examples, reset spring 160 is preloaded to decrease the force solenoid 96 is required to exert to retract plunger pin 166. In some examples, reset spring 160 has a preload of about 10N-15N. In one example, reset spring 160 has a preload of about 12.8N. With trip rod 98 unlocked, trigger 86 no longer pivots about trigger pin 164. Instead, depressing trigger 86 causes trigger 86 to pull trip rod 98 downwards within meter body 82, and trigger 86 pivots about actuation tip 148. Shifting the pivot point of trigger 86 from trigger pin 164 to actuation tip 148 prevents trigger 86 from exerting the necessary force on valve stem 138 that is required to shift valve stem 138 from the closed position to the open position.

When replacement of valve 88 is desired, trigger 86 must be removed from meter body 82 prior to replacing valve 88. Elastomeric trigger guard 130 facilitates quick and simple removal and replacement of valve 88. To replace valve 88, fastener 168 is removed and elastomeric trigger guard 130 is pulled off of meter body 82. With elastomeric trigger guard 130 removed, trigger pin 164 is exposed to the user. The user can knock trigger pin 164 out, such that trigger 86 is no longer attached to trip rod 98. With trigger pin 164 removed, trigger 86 can then be pulled off of meter body 82. The user then has access to valve 88 and valve 88 can be removed and replaced. During replacement of valve 88, the user typically sets meter body 82 in an upside down orientation to have access to valve 88. With meter body 82 in the upside down orientation, the metered fluid can pool in valve cavity 112. When a replacement valve 88 is installed, valve cap 142 prevents the metered fluid from entering into first end 152 of valve cartridge 140. If the metered fluid were to enter first end 152 of valve cartridge 140, then that metered fluid could migrate through stem bore 146 and leak out of actuation tip 148, which would provide a false-positive indication of a leak to the user, even though a leak does not exist. Valve cap 142 prevents that pooled metered fluid from entering first end 152 of valve cartridge 140, and as such, valve cap 142 eliminates false-positive leak indications that could occur during replacement of valve 88.

Figure 16A:
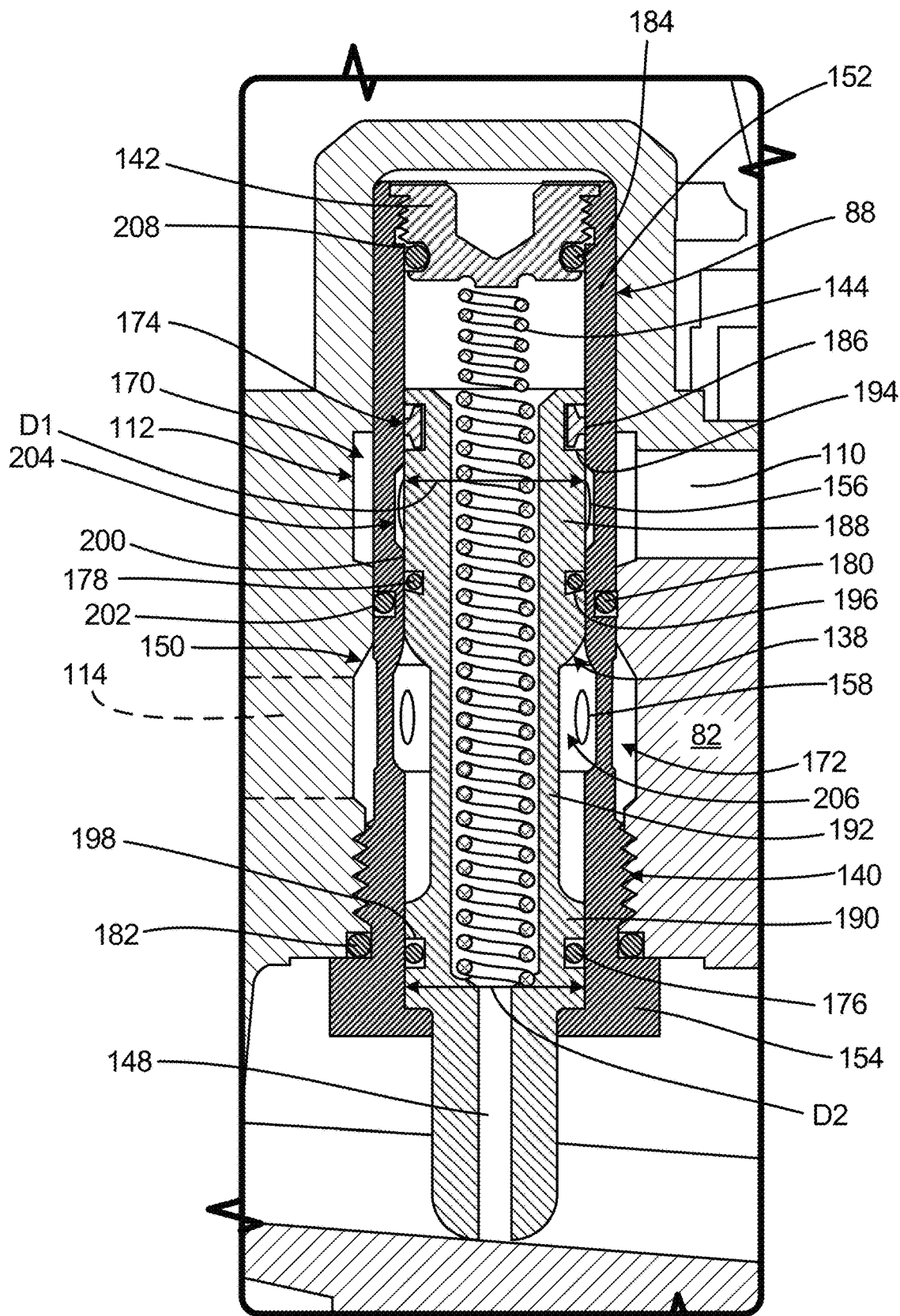
FIG. 16A is a cross-sectional view of a valve in a closed position.
Figure 16B:
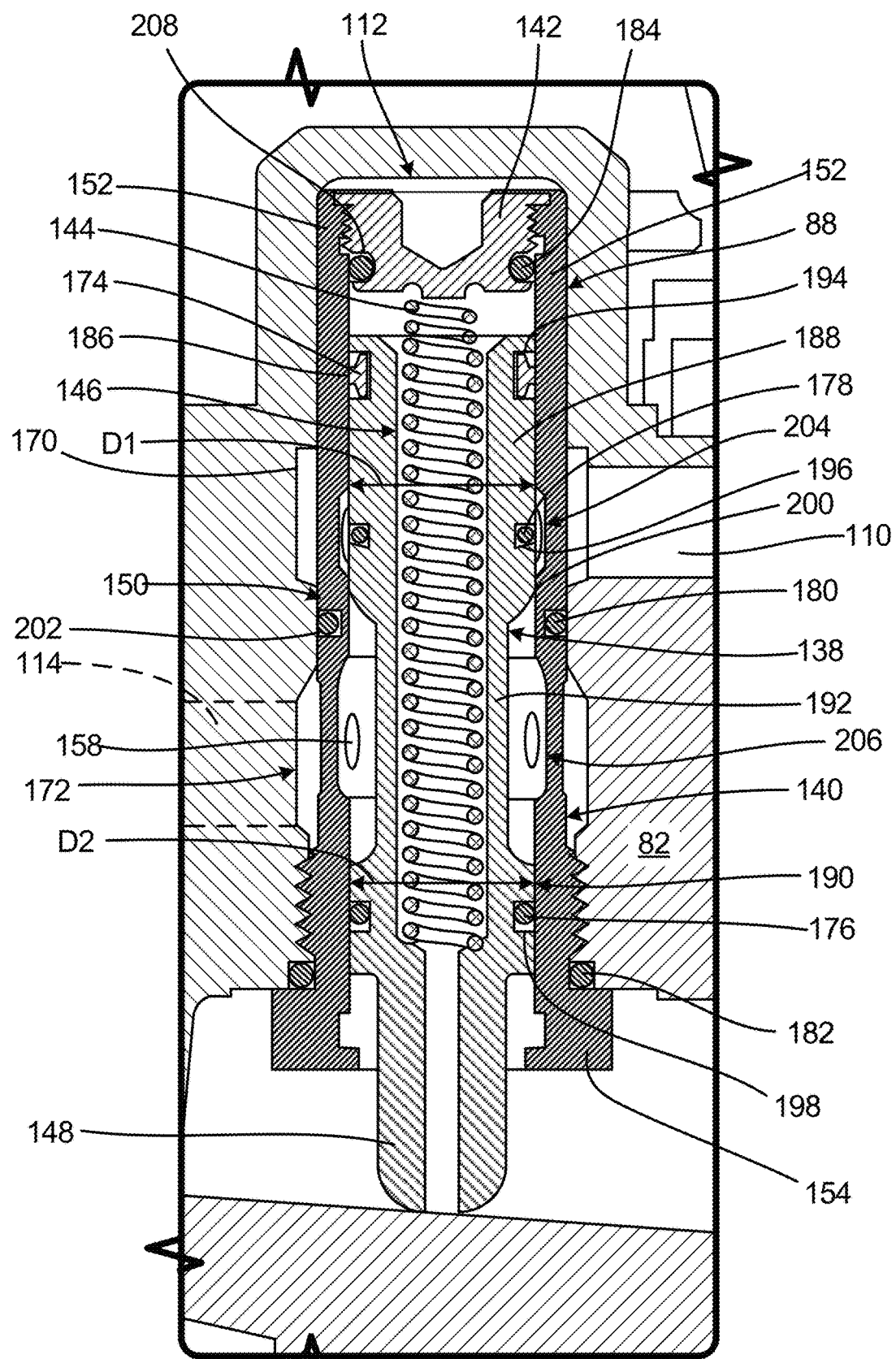
FIG. 16B is a cross-sectional view of a valve in a modulated position.
Figure 16C:
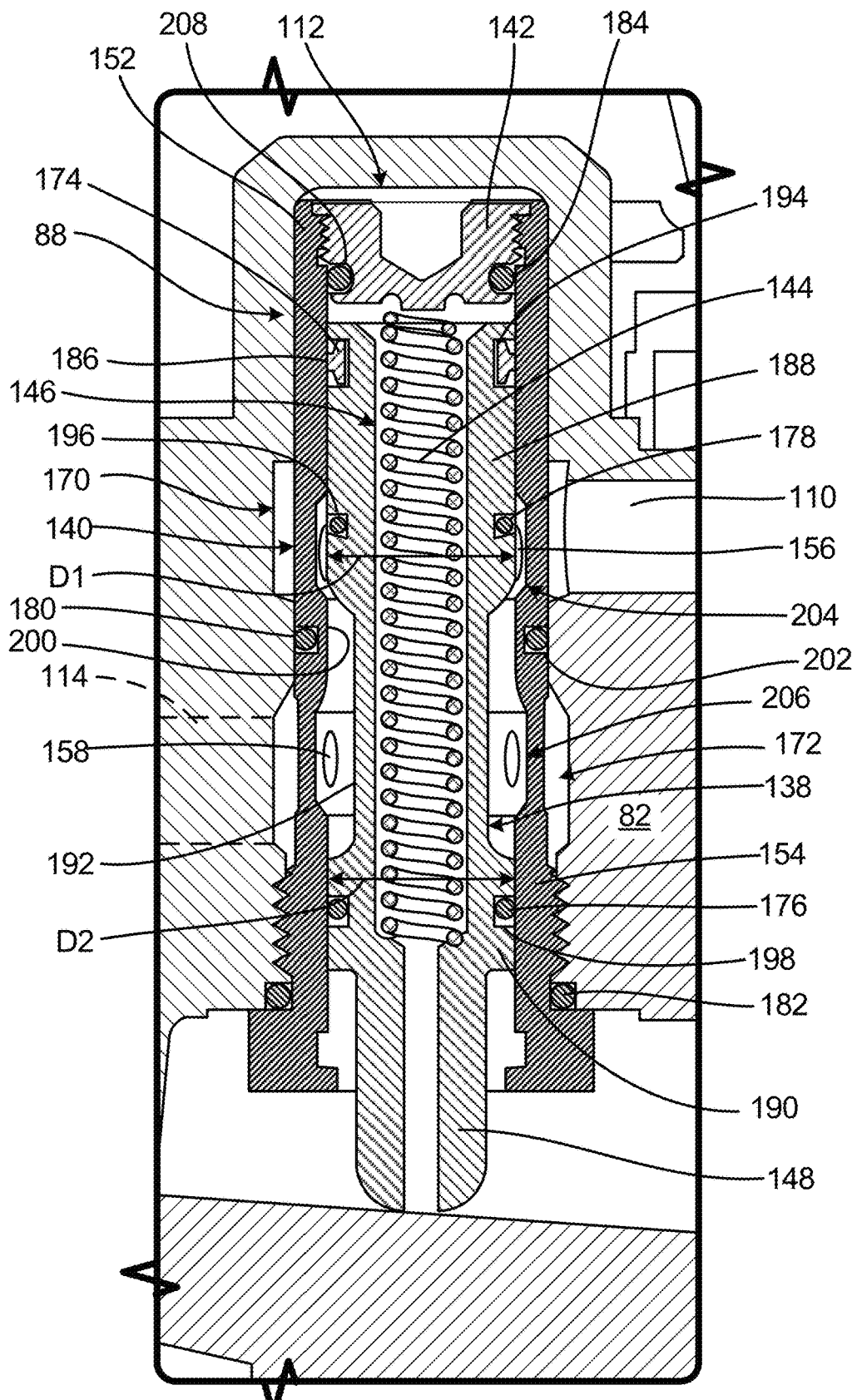
FIG. 16C is a cross-sectional view of a valve in an open position.
Figure 16D:
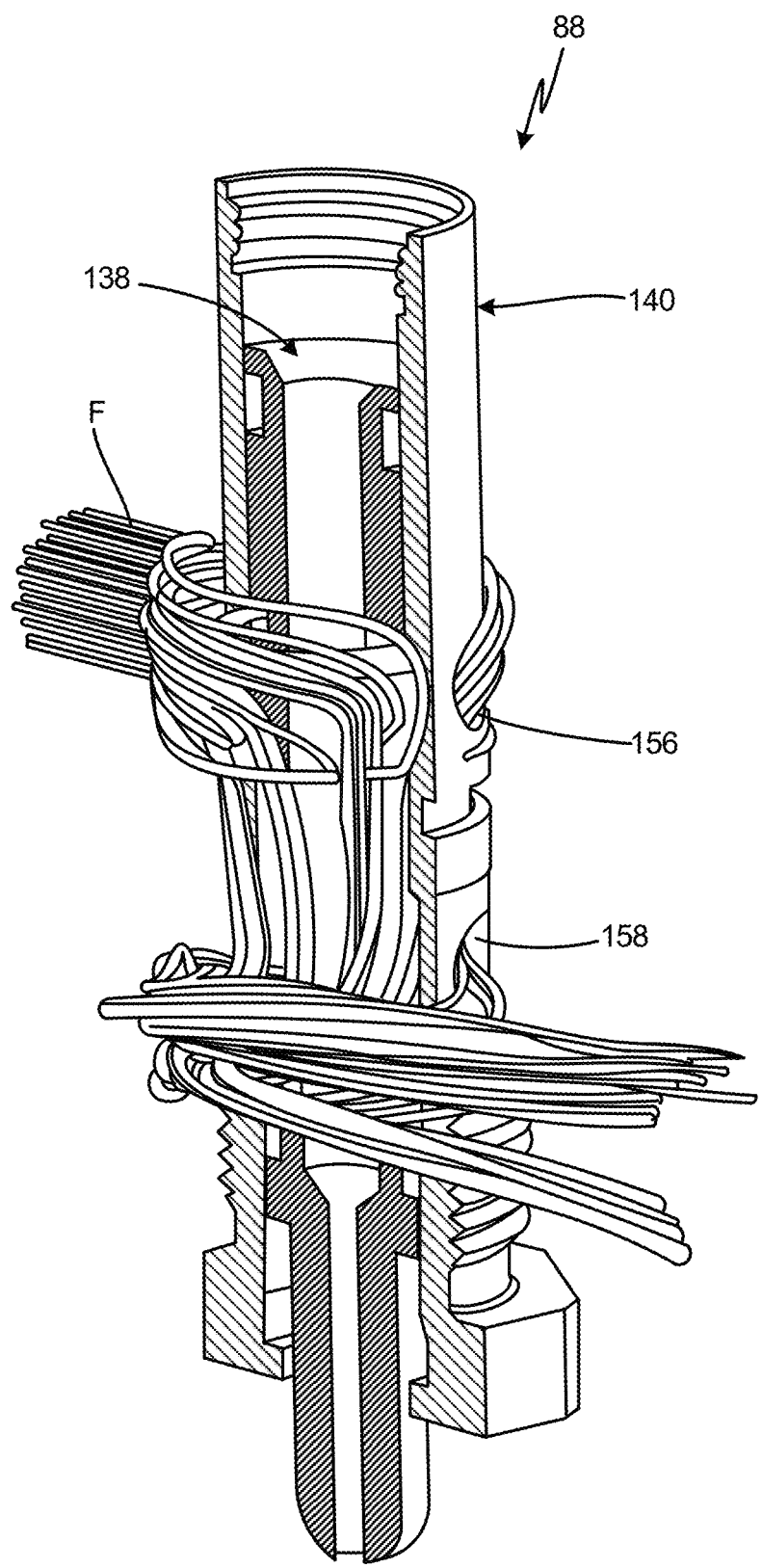
FIG. 16D is a cross-sectional, perspective view of a valve showing fluid flow lines.

FIG. 16A is a cross-sectional view of valve 88 in the closed position. FIG. 16B is a cross-sectional view of valve 88 in a throttled position. FIG. 16C is a cross-sectional view of valve 88 in an open position. FIG. 16D is a cross-sectional, perspective view of valve 88 showing flow lines F. FIGS. 16A-16D will be discussed together. Valve inlet port 110, valve outlet port 114, and valve cavity 112 of meter body 82 are shown in FIGS. 16A-16C. Valve cavity 112 includes first exterior circumferential flow passage 170 and second exterior circumferential flow passage 172. Valve 88 includes valve stem 138, valve cartridge 140, valve cap 142, valve spring 144, first dynamic seal 174, second dynamic seal 176, control seal 178, static seal 180, static seal 182, and cap seal 184. First dynamic seal 174 includes projection 186. Valve stem 138 includes stem bore 146, actuation tip 148, upper portion 188, lower portion 190, and elongate portion 192. Upper portion 188 includes first dynamic seal groove 194 and control seal groove 196, and upper portion 188 has diameter D1. Lower portion 190 includes second dynamic seal groove 198 and has diameter D2. Valve cartridge 140 includes cartridge body 150, and cartridge body 150 includes first end 152, second end 154, radial inlets 156, radial outlets 158, control seat 200, static seal groove 202, first interior circumferential flow passage 204, and second interior circumferential flow passage 206. Valve cap 142 includes cap seal groove 208.

Valve inlet port 110 extends through meter body 82 into valve cavity 112. Valve outlet port 114 extends from valve cavity 112 through meter body 82. First exterior circumferential flow passage 170 extends about valve cavity 112 proximate valve inlet port 110. Second exterior circumferential flow passage 172 extends about valve cavity 112 proximate valve outlet port 114. Valve 88 is disposed within valve cavity 112.

Valve cartridge 140 extends into valve cavity 112. In some examples, valve cartridge 140 is machined from bar stock, such as steel bar stock. First interior circumferential flow passage 204 extends around an interior of first end 152 of cartridge body 150. Radial inlets 156 extend through first end 152 of cartridge body 150 between first exterior circumferential flow passage 170 and first interior circumferential flow passage 204. Second interior circumferential flow passage 206 extends around an interior of second end 154 of cartridge body 150. Radial outlets 158 extend through second end 154 of cartridge body 150 between second exterior circumferential flow passage 172 and second interior circumferential flow passage 206. In some examples, valve cartridge 140 includes a plurality of radial inlets 156 and radial outlets 158, each extending circumferentially about valve cartridge 140. In one example, valve cartridge 140 includes six radial inlets 156 and six radial outlets 158, but it is understood that valve cartridge 140 can include as many or as few radial inlets 156 and radial outlets 158 as desired. Control seat 200 is an annular projection extending from an interior of cartridge body 150. Control seat 200 is disposed between first interior circumferential flow passage 204 and second interior circumferential flow passage 206. Control seat 200 provides a seat for control seal 178 to seal against when valve 88 is in the closed position.

Static seal groove 202 extends around an exterior of cartridge body 150 between first end 152 and second end 154. Static seal 180 is disposed in static seal groove. Static seal 180 prevents the metered fluid from leaking around cartridge body 150 between first exterior circumferential flow passage 170 and second exterior circumferential flow passage 172. Second end 154 of valve cartridge 140 is connected to meter body 82 to secure valve cartridge 140 within valve cavity 112. In some examples, second end 154 includes external threading configured to mate with internal threading on meter body 82. While valve cartridge 140 is described as connected to meter body 82 by interfaced threading, it is understood that valve cartridge 140 can be secured to meter body 82 in any suitable manner, such as a snap-fit connection. Static seal 182 extends around second end 154 between valve cartridge 140 and meter body 82. Static seal 182 prevents the metered fluid from leaking out of valve cavity 112 around second end 154.

Valve stem 138 is disposed within valve cartridge 140. Upper portion 188 is disposed within first end 152, and lower portion 190 is disposed within second end 154. Elongate portion 192 extends between and connects upper portion 188 and lower portion 190. Actuation tip 148 extends from lower portion 190 out of second end 154. Stem bore 146 extends through upper portion 188, elongate portion 192, lower portion 190, and actuation tip 148; and stem bore 146 is open to atmosphere. Upper portion 188 has first diameter D1 and lower portion 190 has second diameter D2. First diameter D1 is the same as second diameter D2, such that the pressure forces exerted on both upper portion 188 and lower portion 190 by the metered fluid are balanced.

First dynamic seal groove 194 extends around upper portion 188. First dynamic seal 174 is disposed in first dynamic seal groove 194 and is configured to provide a seal between upper portion 188 and cartridge body 150. First dynamic seal groove 194 is disposed above first interior circumferential flow passage 204, and first dynamic seal 174 maintains engagement with cartridge body 150 when valve stem 138 is in the open position, the closed position, and any intermediate position there between. First dynamic seal 174 includes projection 186 that extends from first dynamic seal 174 and contacts cartridge body 150. Projection 186 provides increased resistance to rolling deformation to first dynamic seal 174. The reduction of rolling deformation prevents running leakage around first dynamic seal 174 as valve stem 138 reciprocates within valve cartridge 140.

Second dynamic seal groove 198 extends around lower portion 190. Second dynamic seal 176 is disposed in second dynamic seal groove 198 and is configured to provide a seal between lower portion 190 and cartridge body 150. Second dynamic seal 176 is disposed below second interior circumferential flow passage 206. Second dynamic seal 176 maintains engagement with cartridge body 150 when valve stem 138 is in the open position, the closed position, or any intermediate position there between. In some examples, second dynamic seal 126 is configured similar to first dynamic seal 122, such that second dynamic seal 126 also includes a projection, such as projection 186, to increase resistance to rolling deformation.

Control seal groove 196 extends around upper portion 188 below first dynamic seal groove 194. Control seal 178 is disposed in control seal groove 196 and is configured to provide a seal between valve stem 138 and valve cartridge 140. Control seal 178 is configured to control the flow of meter fluid through valve 88. Control seal 178 engages control seat 200 when valve 88 is in the closed position, preventing flow between first interior circumferential flow passage 204 and second interior circumferential flow passage 206. Control seal 178 is disengaged from control seat 200 when valve 88 is in the open position, allowing flow between first interior circumferential flow passage 204 and second interior circumferential flow passage 206. In some examples control seal 178 in an o-ring.

Valve cap 142 is connected to first end 152 of valve cartridge 140. Cap seal groove 208 extends around valve cap 142. Cap seal 184 is disposed in cap seal groove 208 and is configured to provide a seal between valve cap 142 and valve cartridge 140. Cap seal 184 prevents fluid from leaking from fluid inlet 60 to valve passage 74 and into first end 152 of valve cartridge 140 around valve cap 142. As discussed above, valve cap 142 prevents any pooled metered fluid within valve cavity 112 from entering valve cartridge 140 through first end 152 during replacement of valve 88. As such, valve cap 142 eliminates leak false-positives from occurring during replacement of valve 88.

Valve spring 144 extends from valve cap 142 and into stem bore 146. Valve spring 144 exerts a force on valve stem 138 to bias valve stem 138 towards the closed position.

During operation, valve 88 is modulated between the closed position, shown in FIG. 16A, and the open position, shown in FIG. 16C. Valve stem 138 is initially in the closed position shown in FIG. 16A. With valve stem 138 in the closed position, control seal 178 engages control seat 200 and prevents the meter fluid from flowing through valve 88. Both first dynamic seal 174 and control seal 178 are subjected to the fluid pressure upstream of valve 88 when valve stem 138 is in the closed position. Second dynamic seal 176 is isolated from the upstream fluid pressure with valve stem 138 in the closed position, such that second dynamic seal 176 is not subjected to the upstream fluid pressure when valve stem 138 is in the closed position.

When a dispense event is initiated, the trigger, such as trigger 86 (best seen in FIGS. 15A-15B) is depressed causing valve stem 138 to shift upward within valve cartridge 140. Valve stem 138 initially shifts to the throttled position shown in FIG. 16B. With valve stem 138 in the throttled position, control seal 178 is disengaged from control seat 200 and is disposed in the flow path of the fluid entering valve cartridge 140 through radial inlets 156. As discussed in more detail below with regard to FIGS. 17A-17C, with valve stem 138 in the throttled position a restricted flow path opens between upper portion 188 and valve cartridge 140. The restricted flow path limits the velocity of the metered fluid flowing through valve 88 and impinging on control seal 178. Limiting the fluid velocity when control seal 178 is directly in the fluid flow path through radial inlets 156 prevents the metered fluid from displacing control seal 178 out of control seal groove 196.

Valve stem 138 continues to displace upwards within valve cartridge 140 to the fully open position shown in FIG. 16C. In the fully open position, control seal 178 is offset from and disposed above radial inlets 156 such that a portion of valve cartridge 140 shields control seal 178 from the direct flow path of the metered fluid. Valve cartridge 140 shielding control seal 178 from the full fluid velocity prevents undesired displacement of control seal 178 out of control seal groove 196.

The metered fluid enters first exterior circumferential flow passage 170 from valve inlet port 110 and flows circumferentially around first end 152 of cartridge body 150 within first exterior circumferential flow passage 170. The metered fluid flows into first interior circumferential flow passage 204 through radial inlets 156. As shown in FIG. 16D, first exterior circumferential flow passage 170 ensures balanced circumferential flow around first end 152 of cartridge body 150, and first interior circumferential flow passage 204 ensures balanced circumferential flow around valve stem 138. Ensuring balanced circumferential flow provides an even pressure distribution about control seal 178. As such, control seal 178 experiences similar flow velocities regardless of the angular position of the flow on control seal 178. First exterior circumferential flow passage 170 and first interior circumferential flow passage 204 thus allow for consistent external pressure on control seal 178, preventing displacement of control seal 178 out of control seal groove 196.

The metered fluid flows downstream from first interior circumferential flow passage 204 to second interior circumferential flow passage 206. The metered fluid flows from second interior circumferential flow passage 206 to second exterior circumferential flow passage 172 through radial outlets 158, and the metered fluid flows out of second exterior circumferential flow passage 172 through valve outlet port 114. Similar to first exterior circumferential flow passage 170 and first interior circumferential flow passage 204, second exterior circumferential flow passage 172 and second interior circumferential flow passage 206 provide an even distribution of flow through valve 88, thereby providing balanced pressure and flow velocity.

First exterior circumferential flow passage 170, first interior circumferential flow passage 204, second interior circumferential flow passage 206, and second exterior circumferential flow passage 172 thus provide an even annular distribution of fluid flow lines F through valve 88, such that the metered fluid flows around the full circumference of valve cavity 112 and valve cartridge 140, rather than through a direct path connecting valve inlet port 110 and valve outlet port 114.

With valve stem 138 in the fully open position, both first dynamic seal 174 and second dynamic seal 176 experience the fluid pressure of the meter fluid. After the fluid dispense ends, valve stem 138 shifts back to the closed position shown in FIG. 16A. Valve spring 144 exerts a downward force on valve stem 138 to drive valve stem 138 to the closed position. Upper diameter D1 is the same as lower diameter D2 such that the fluid pressure acting on first dynamic seal 174 and upper portion 188 is balanced with the fluid pressure acting on second dynamic seal 176 and lower portion 190. Balancing the pressure forces on first dynamic seal 174 and second dynamic seal 176 creates a pressure equilibrium, eliminating pressure imbalance on valve stem 138. The balanced pressure forces ensure that valve spring 144 can shift valve stem 138 to the closed position under all rated operating conditions.

Throughout operation valve stem 138 is retained within and guided by cartridge body 150. First dynamic seal 174, control seal 178, and second dynamic seal 176 are all configured to extend between valve stem 138 and valve cartridge 140. Guiding valve stem 138 with cartridge body 150 provides enhanced seal alignment, as valve stem 138 is not guided by multiple parts having multiple diameters. In addition, having first dynamic seal 174 seal on valve cartridge 140, which is machined from bar stock, prevents running leaks around first dynamic seal 174 as first dynamic seal 174 does not seal against a cast member, such as meter body 82.

Valve 88 provides significant advantages. The fluid velocity through valve 88 is maintained below a maximum level until control seal 178 is out of the direct flow path of the metered fluid, preventing undesired displacement of control seal 178 from control seal groove 196. First exterior circumferential flow passage 170, first interior circumferential flow passage 204, second interior circumferential flow passage 206, and second exterior circumferential flow passage 172 ensure that the metered fluid flows around the full circumference of valve cartridge 140 and valve stem 138, providing balanced forces on control seal 178 regardless of angular position. Projection 186 extends from first dynamic seal 174 and reduces rotational flexing, which reduces running leakage around first dynamic seal 174. Valve cap 142 prevents fluid from entering valve cartridge 140 through first end 152, which eliminates false-positive leak indications from appearing during replacement of valve 88. Upper diameter D1 is equal to lower diameter D2, such that the pressure forces on first dynamic seal 174 and second dynamic seal 176 are balanced when valve 88 is in the open position. The balanced forces ensure that valve spring 144 can drive valve stem 138 to the closed position under all rated operating conditions. Cartridge body 150 provides the only sealing surface for first dynamic seal 174, control seal 178, and second dynamic seal 176, which provides better seal alignment as valve stem 138 is guided by a single part.

Figure 17A:
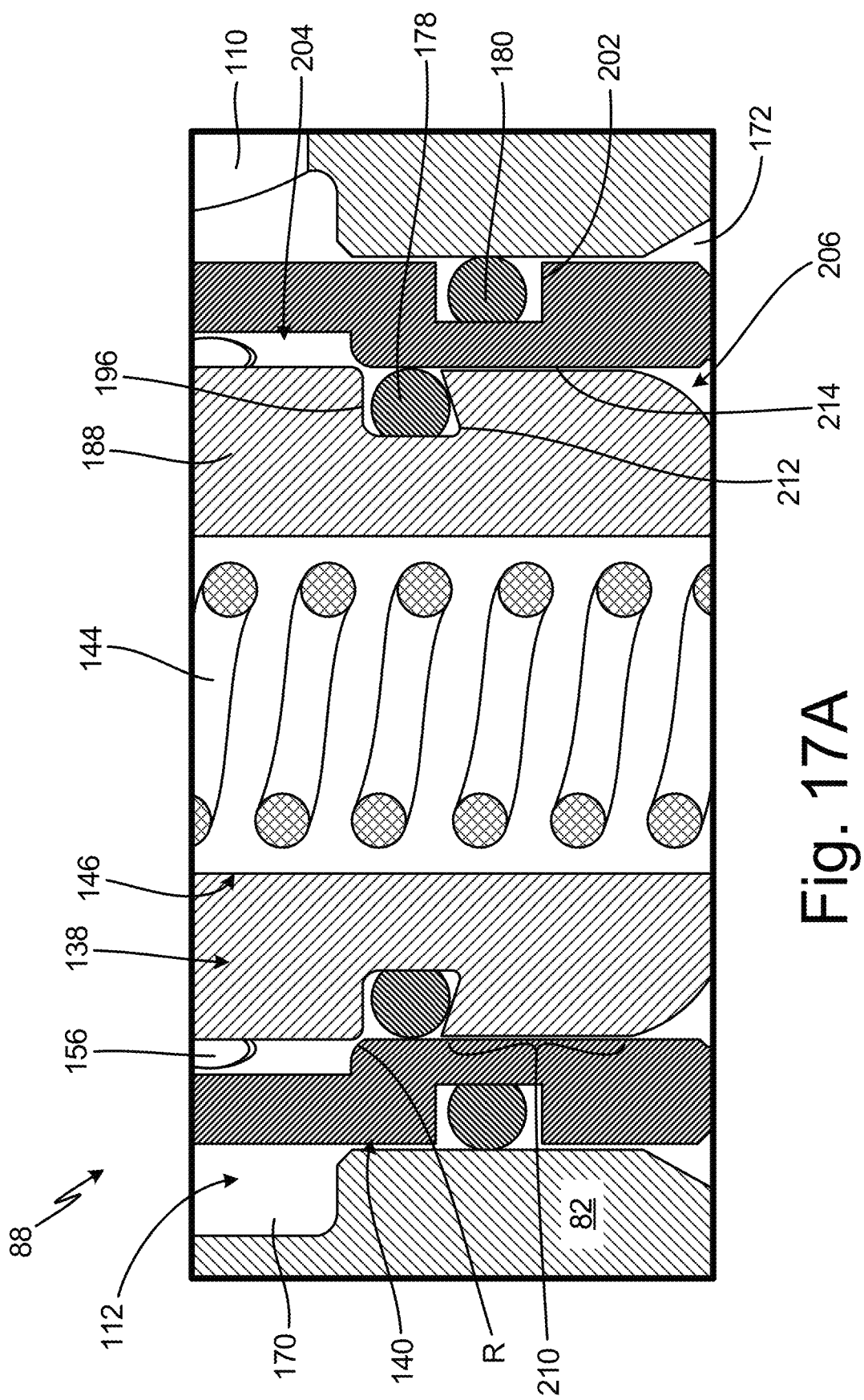
FIG. 17A is a cross-sectional view of a cartridge valve showing a control seal in a closed position.
Figure 17B:
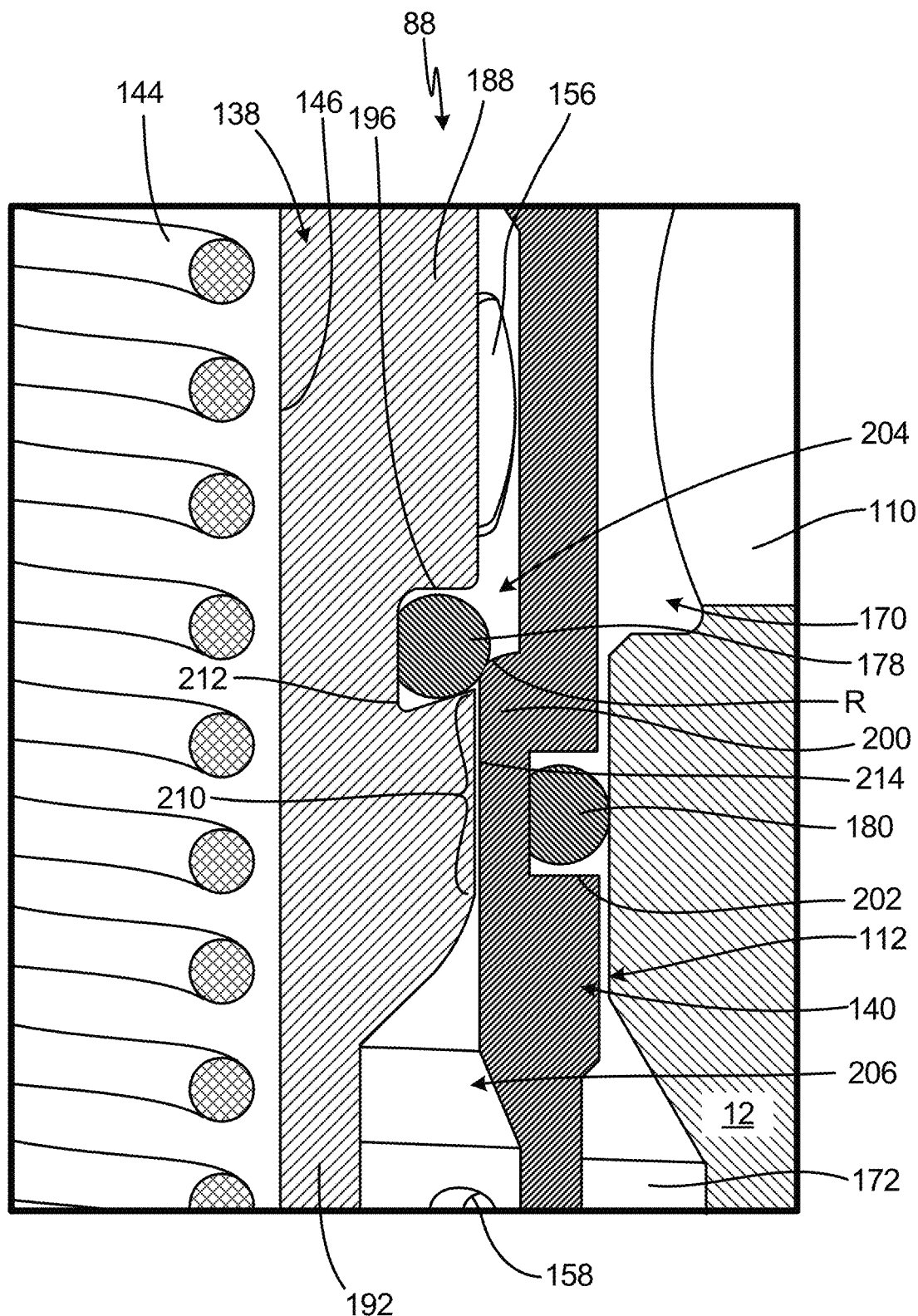
FIG. 17B is a cross-sectional view of a cartridge valve showing a control seal in a modulated position.
Figure 17C:
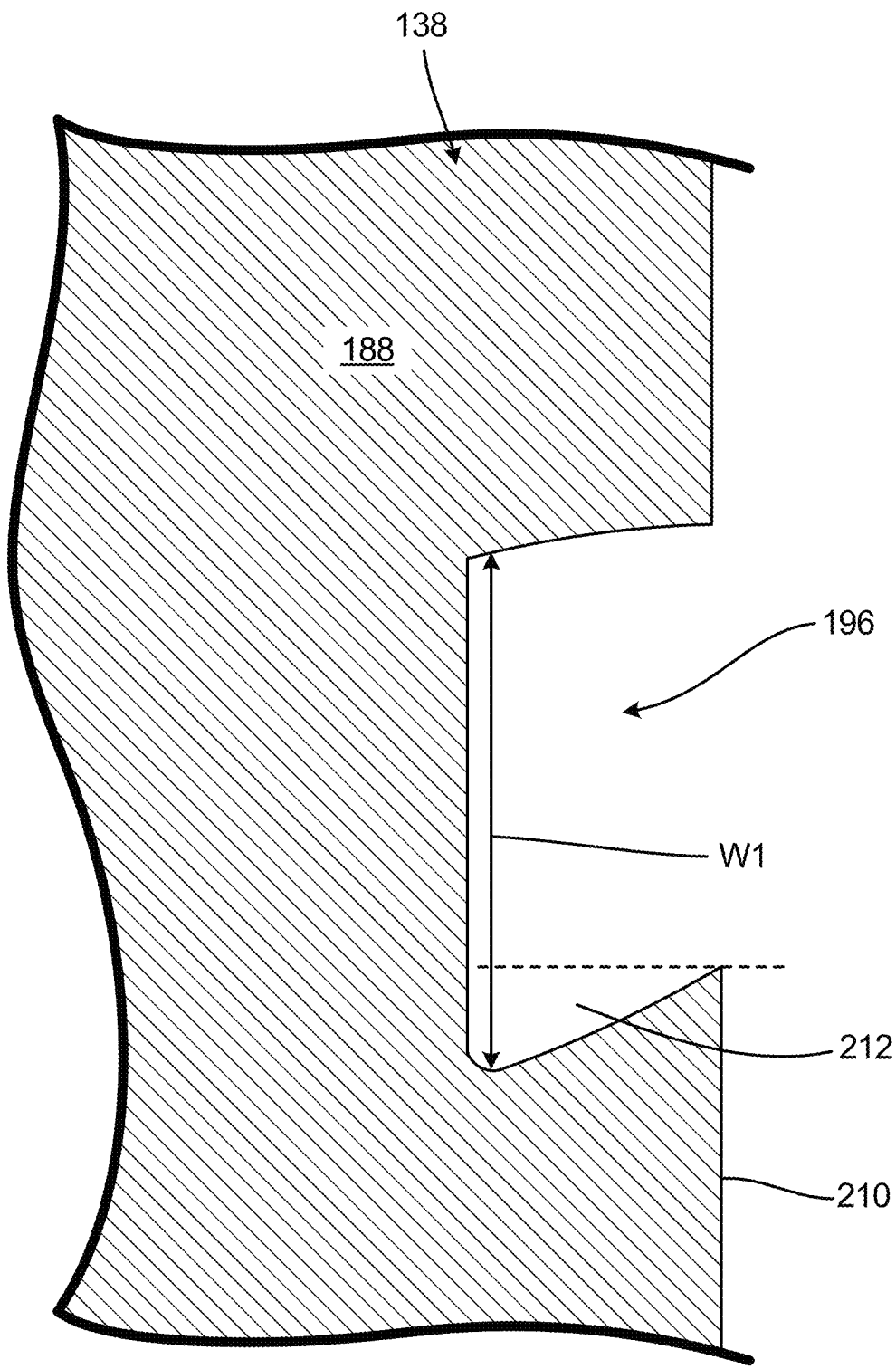
FIG. 17C is a cross-sectional view of a control seal groove.

FIG. 17A is an enlarged cross-sectional view of control seal 178 with valve 88 in a closed position. FIG. 17B is an enlarged cross-sectional view of control seal 178 with valve 88 in a modulated position. FIG. 17C is a cross-sectional view of control seal groove 196. FIGS. 17A-17C will be discussed together. Valve inlet port 110 and valve cavity 112 of meter body 82 are shown. First exterior circumferential flow passage 170 and second exterior circumferential flow passage 172 of valve cavity 112 are shown. Valve stem 138, valve cartridge 140, valve spring 144, control seal 178, and static seal 180 of valve 88 are shown. Upper portion 188, elongate portion 192 (FIG. 17B), and stem bore 146 of valve stem 138 are shown, and upper portion 188 includes control seal groove 196 and throttling portion 210. Control seal groove 196 includes dovetail 212, and dovetail 212 has width W1 (FIG. 17C). Radial inlet 156, radial outlet 158 (FIG. 17B), control seat 200, static seal groove 202, first interior circumferential flow passage 204, and second interior circumferential flow passage 206 of valve cartridge 140 are shown. Control seat 200 includes seat radius R.

Valve stem 138 is disposed in valve cartridge 140 and is movable between the open position and the closed position. Control seal groove 196 extends into upper portion 188, and control seal 178 is disposed in control seal groove 196. Dovetail 212 extends from a downstream side of control seal groove 196 such that control seal groove 196 presents a partial dovetail. Width W1 is a width of control seal groove 196 at dovetail 212. Width W1 is preferably about 0.178 cm (0.070 in.), which in one example is approximately the same as a cross-sectional diameter of control seal 178. In some examples, a ratio of the cross-sectional diameter of control seal 178 to width W1 is between about 1:0.9 and 1:1.1. In one example, the ratio of the cross-sectional diameter of control seal 178 to width W1 about 1:1. Dovetail 212 ensures that control seal 178 remains seated in control seal groove 196 throughout all rated operating conditions. Throttling portion 210 is a part of upper portion 188 that extends below control seal groove 196.

Static seal groove 202 extends about an exterior of valve cartridge 140. Static seal groove 202 is disposed between first exterior circumferential flow passage 170 and second exterior circumferential flow passage 172. Static seal 180 is disposed in static seal groove 202 and is configured to provide a seal at the interface of valve cartridge 140 and meter body 82. Control seat 200 extends from an interior of valve cartridge 140 and is disposed between first interior circumferential flow passage 204 and second interior circumferential flow passage 206. Control seat 200 provides a sealing surface for control seal 178.

During operation, valve stem 138 is modulated between a closed position, where control seal 178 is engaged with control seat 200, and an open position, where control seat 200 is disengaged from control seat 200. Control seal 178 is initially in the closed position shown in FIG. 17A, such that control seal 178 is disposed between valve stem 138 and control seat 200 to prevent any metered fluid from flowing between first interior circumferential flow passage 204 and second interior circumferential flow passage 206. To initiate a fluid dispense, valve stem 138 shifts upwards until control seal 178 disengages from control seat 200. When control seal 178 initially disengages from control seat 200, annular flow path 214 is opened between throttling portion 210 and control seat 200. Annular flow path 214 provides a restricted area for the metered fluid to flow between first interior circumferential flow passage 204 and second interior circumferential flow passage 206. The restricted area created by annular flow path 214 limits the initial flow velocity of the metered fluid through valve 88.

The length of annular flow path 214 decreases as valve stem 138 continues to shift upwards to the fully open position (shown in FIG. 16C). As the length of annular flow path 214 decreases, the flow velocity of the meter fluid flowing into first interior circumferential flow passage 204 and through annular flow path 214 simultaneously increases. As such, annular flow path 214 provides flow feathering for precise flow control. For example, the further the user depresses the trigger, the greater the flow velocity through valve 88. The flow feathering provided by annular flow path 214 allows the user to precisely and consistently top-off the dispensed metered fluid during a dispense event. During a top-off, valve stem 138 is slightly opened and closed to dispense small amounts of fluid to bring the actual dispense volume up to the desired dispense volume.

Throttling portion 210 is offset from control seat 200 when valve stem 138 is in the fully open position. With valve stem 138 in the fully open position, a non-restricted flow path is created between first interior circumferential flow passage 204 and second interior circumferential flow passage 206. Throttling portion 210 is sized to disengage from control seat 200 when control seal 178 is disposed above radial inlets 156 such that control seal 178 is at least partially shielded from the full fluid velocity by valve cartridge 140. As such, control seal 178 is not disposed in the direct flow path of the metered fluid when valve stem 138 is in the fully open position.

At the end of the dispense event valve stem 138 returns to the closed position. As valve stem 138 transitions to the closed position, control seal 178 initially engages control seat 200 at control seat radius R. In some examples, a ratio of control seat radius R to a cross-sectional radius of control seal 178 is 1:2-1:10. In one example, the ratio of control seat radius R to the cross-sectional radius of control seal 178 is about 1:3. Control seat radius R allows control seal 178 to pop in and pop out of sealing engagement with control seat 200, preventing control seal 178 from experiencing scarfing caused by deformation of control seal 178 at control seat 200. This further prevents high-velocity fluid flow seal erosion as control seal 178 is not itself controlling the fluid velocity. Control seal 178 thus provides poppet-style flow control. When control seal 178 is engaged with control seat 200 flow is shut off. When control seal 178 is disengaged from control seat 200 flow proceeds. Control seal 178 does not throttle flow; instead, annular flow path 214 provides all flow throttling through valve 88. As annular flow path 214 controls the flow velocity, control seal 178 is less susceptible to high-velocity fluid flow erosion.

Valve 88 provides significant advantages. Annular flow path 214 provides flow feathering as valve stem 138 shifts from the closed position to the open position. Annular flow path 214 also maintains the flow velocity below the maximum flow velocity until control seal 178 is out of the direct path of the meter fluid. Control seat radius R prevents scarfing of control seal 178 as control seal 178 transitions between the open position and the closed position. Dovetail 212 prevents displacement of control seal 178 from control seal groove 196.

Figure 18A:
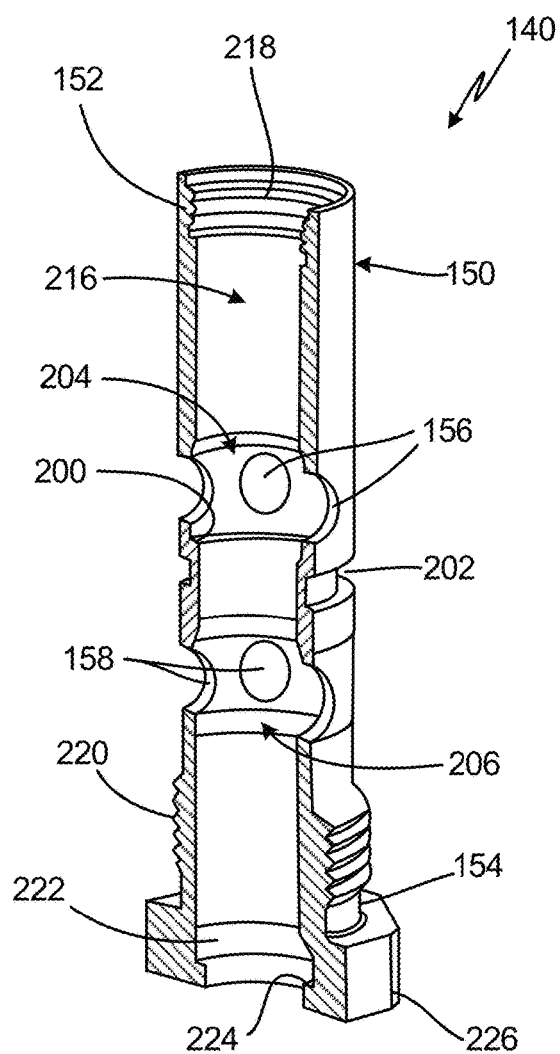
FIG. 18A is a first cross-sectional view of a valve cartridge.
Figure 18B:
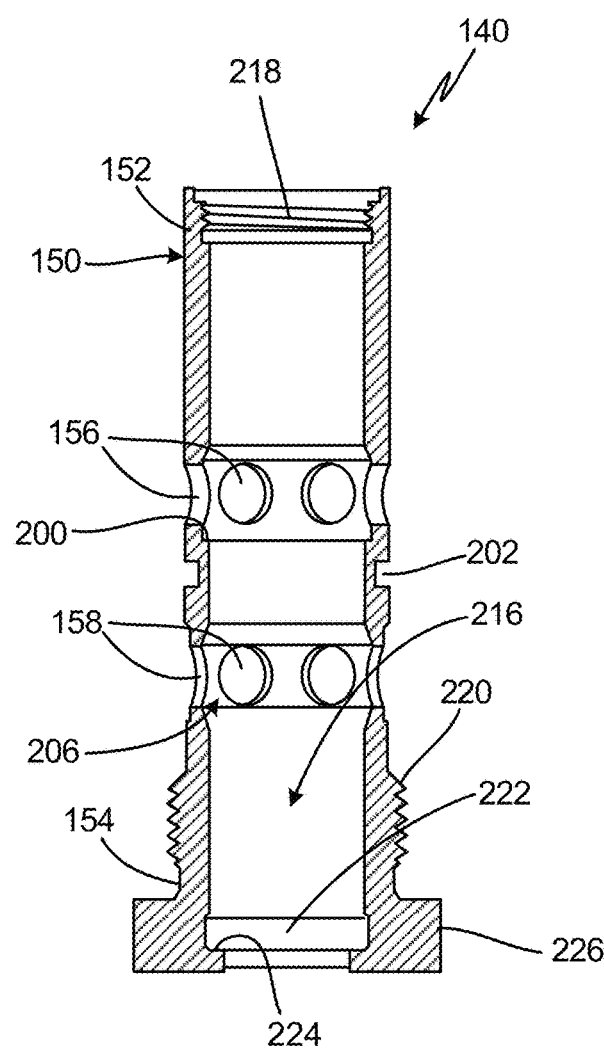
FIG. 18B is a second cross-sectional view of a valve cartridge.

FIG. 18A is a first cross-sectional view of valve cartridge 140. FIG. 18B is a second cross-sectional view of valve cartridge 140. FIGS. 18A and 18B will be discussed together. Valve cartridge 140 includes cartridge body 150, first end 152, second end 154, radial inlets 156, radial outlets 158, control seat 200, static seal groove 202, first interior circumferential flow passage 204, second interior circumferential flow passage 206, and cartridge bore 216. First end 152 includes interior threads 218. Second end 154 includes exterior threads 220, undercut 222, valve stem bearing surface 224, and cartridge flange 226.

Cartridge bore 216 extends through cartridge body 150 from first end 152 to second end 154. Interior threads 218 are disposed at a distal end of first end 152 and are configured to interface with exterior threads on a valve cap, such as valve cap 142 (best seen in FIGS. 16A-16C), to retain the valve cap on valve cartridge 140. Radial inlets 156 extend through cartridge body 150 into first interior circumferential flow passage 204. Radial outlets 158 extends through cartridge body 150 into second interior circumferential flow passage 206. Control seat 200 extends into cartridge bore 216 from an interior of cartridge body 150 and is disposed between first interior circumferential flow passage 204 and second interior circumferential flow passage 206. Static seal groove 202 extends around an exterior of cartridge body 150 between radial inlets 156 and radial outlets 158, and static seal groove 202 is configured to receive a seal, such as static seal 180 (best seen in FIGS. 17A-17B).

Cartridge flange 226 extends radially from second end 154. Cartridge flange 226 is configured to abut an exterior of a meter body, such as meter body 82 (best seen in FIG. 15B), when valve cartridge 140 is installed in the meter body. Exterior threads 220 extend around second end 154 above cartridge flange 226. Exterior threads 220 are configured to interface with interior threads on the meter body to secure valve cartridge 140 to the meter body. Valve stem bearing surface 224 extends into second end 154. Valve stem bearing surface 224 limits downward movement of a valve stem, such as valve stem 138 (best seen in FIGS. 16A-16C), disposed in valve cartridge 140. The valve stem rests against valve stem bearing surface 224 when the valve is in the closed position. Undercut 222 extends into an interior of cartridge body 150 adjacent valve stem bearing surface 224. In some examples, valve cartridge 140 is machined from a bar stock, such as steel. Undercut 222 facilitates dimensional control and surface finishing on the interior of cartridge bore 216 during the manufacture of valve cartridge 140.

Figure 19:
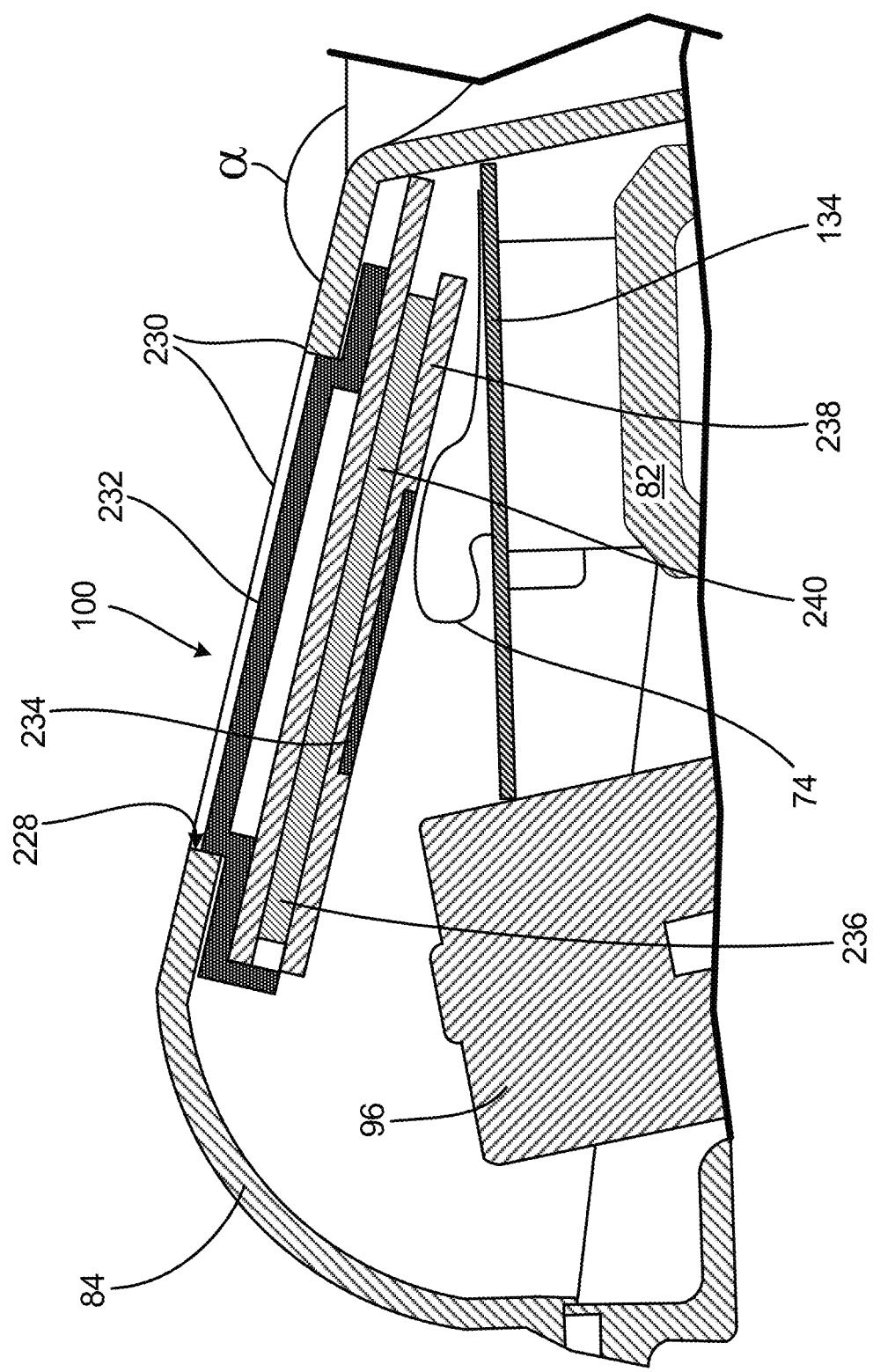
FIG. 19 is an enlarged cross-sectional view of a bezel housing and a display taken along line 19-19 in FIG. 14A.

FIG. 19 is an enlarged cross-sectional view of bezel housing 84 and display 100 taken along line 19-19 in FIG. 14A. Bezel housing 84 includes display opening 228, and display opening 228 includes edges 230. Display 100 includes upper retainer 232, lower retainer 234, first pad 236, second pad 238, and display screen 240.

First circuit board 134, antenna 74, and solenoid 96 are disposed within bezel housing 84. Solenoid 96 extends at least partially into meter body 82, which facilitates a lower profile of bezel housing 84. Antenna 74 is configured to provide wireless communication for a meter controller, such as meter controller 72 (FIG. 14B). First circuit board 134 and second circuit board 136 (best seen in FIG. 15B) can include various electrical components, such as the meter controller, configured to control operation of handheld meter 14B (best seen in FIG. 14A).

Display 100 is mounted to bezel housing 84 within display opening 228. Display 100 is tilted towards the user at angle α. As discussed above, angle α can be any desired angle between 90-degrees and 180-degrees. In one example, angle α is between 150-degrees and 170-degrees. Display screen 240 is disposed between first pad 236 and second pad 238. In some examples, display screen 240 is an LCD. Both first pad 236 and second pad 238 can include adhesive backing. Upper retainer 232 is connected to lower retainer 234, and upper retainer 232 and lower retainer 234 encapsulate first pad 236, second pad 238, and display screen 240. Upper retainer 232 is clear, to allow the user to view the images provided by display screen. In some examples, lower retainer 234 is also clear. For example, both upper retainer 232 and lower retainer 234 can be polycarbonate. Upper retainer 232 is attached to bezel housing 84 to secure display 100 in position in display opening 228. In some examples, upper retainer 232 can be mounted to bezel housing 84 with a double sided acrylic foam tape, such as 3M® VHB™ tape.

Edges 230 of display opening 228 are elevated relative to display 100 when display 100 is mounted in bezel housing 84. Elevating edges 230 of display opening 228 relative to display 100 protects display 100 from experiencing an impact force if handheld meter 14B is dropped or otherwise experiences an impact.

Figure 20A:
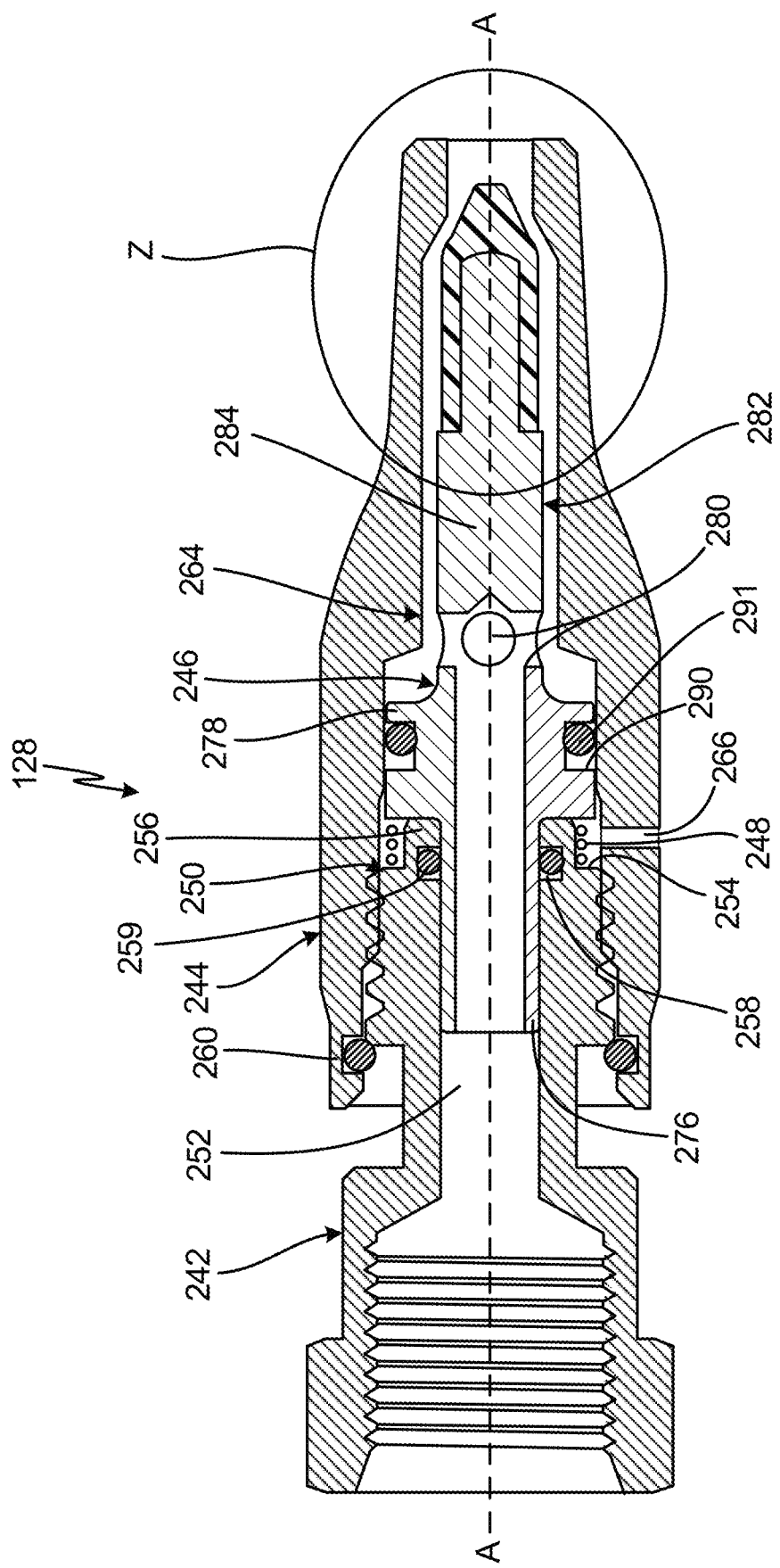
FIG. 20A is a cross-sectional view of a nozzle taken along line 20-20 in FIG. 14A.
Figure 20B:
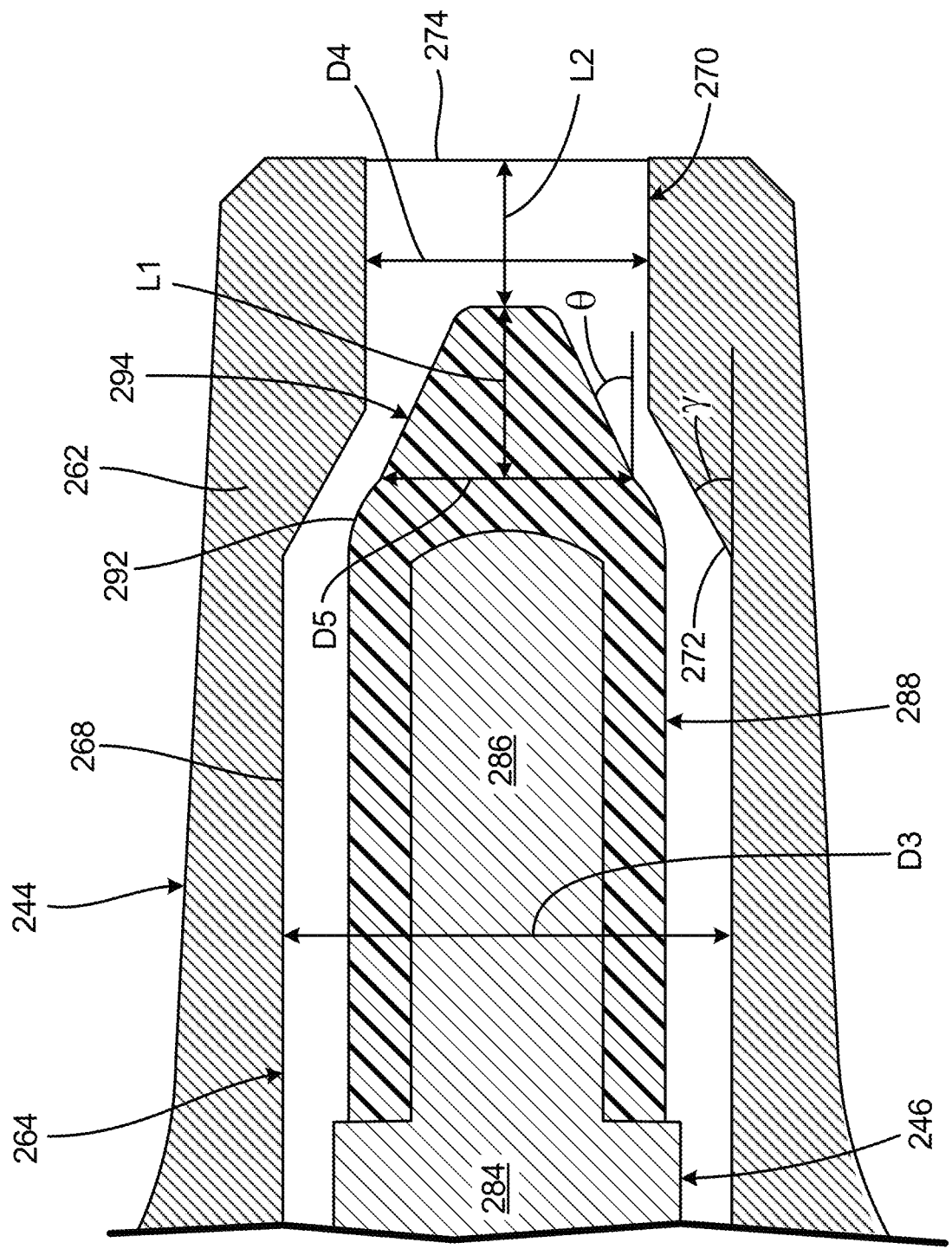
FIG. 20B is an enlarged view of detail Z in FIG. 20A showing a nozzle in an open position.
Figure 20C:
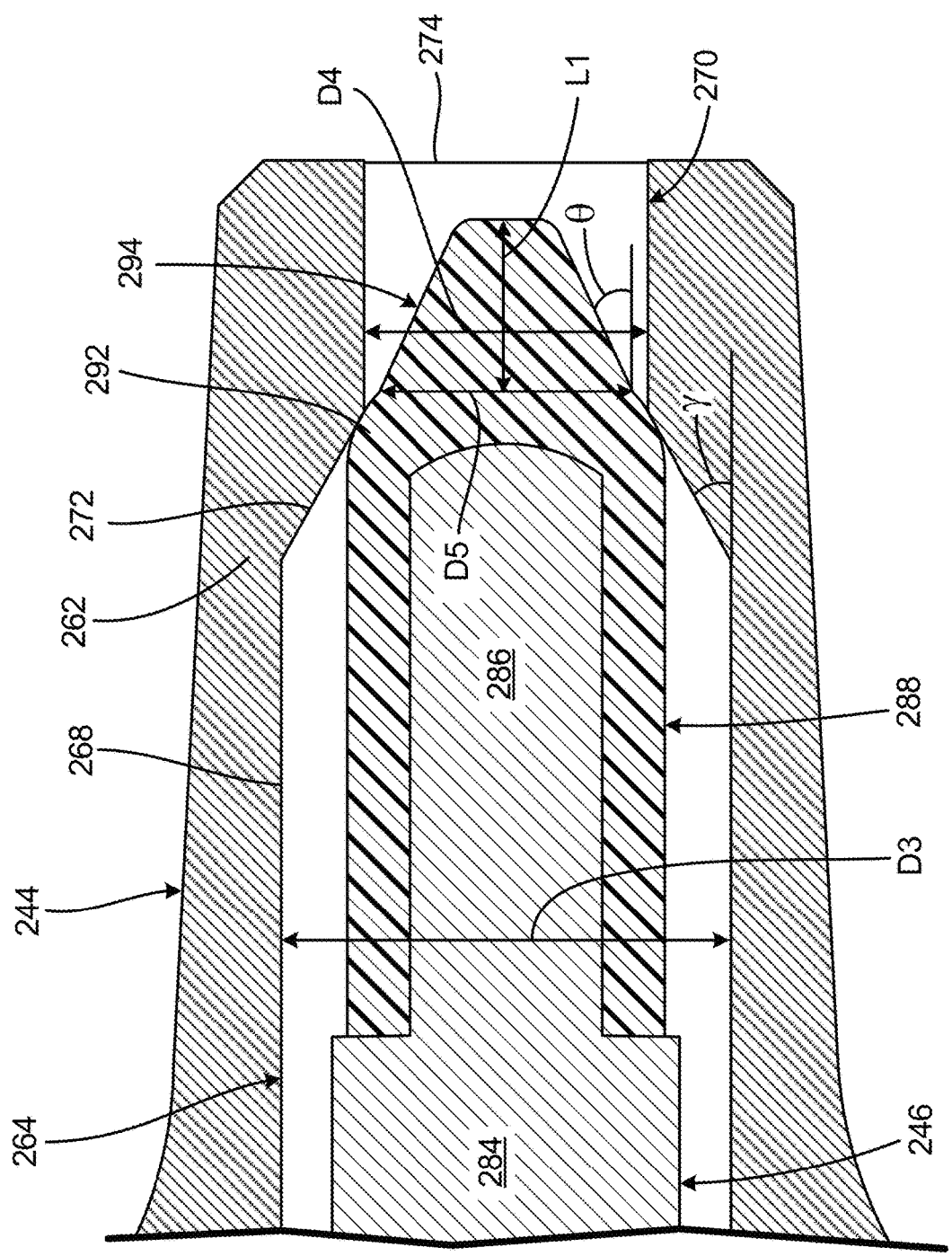
FIG. 20C is an enlarged cross-sectional view showing a nozzle in a closed position.

FIG. 20A is a cross-sectional view of nozzle 128 taken along line 20-20 in FIG. 14A showing nozzle 128 in an open position. FIG. 20B is an enlarged view of detail Z in FIG. 20A. FIG. 20C is an enlarged cross-sectional view showing nozzle 128 in a closed position. FIGS. 20A-20C will be discussed together. Nozzle 128 includes connector 242, nozzle body 244, nozzle stem 246, and nozzle spring 248. Connector 242 includes seating end 250 and connector bore 252. Seating end 250 includes shoulder 254, neck 256, and connector seal groove 258. Nozzle body 244 includes receiving end 260, dispensing end 262, nozzle bore 264, and vent hole 266. Dispensing end 262 includes upstream portion 268, downstream portion 270, and connecting portion 272. Upstream portion 268 includes upstream diameter D3.

Downstream portion 270 includes downstream diameter D4 and nozzle outlet 274. Connecting portion 272 includes angle γ. Nozzle stem 246 includes inlet tube 276, stem flange 278, flow passages 280, and stem tip 282. Stem tip 282 includes main tip body 284, reduced diameter portion 286, and overmolded tip 288. Stem flange 278 includes flange seal groove 290. Overmolded tip 288 includes sealing portion 292 and tip cone 294. Tip cone 294 includes angle θ, base diameter D5, and length L1.

Connector 242, nozzle stem 246, and nozzle body 244 are disposed coaxially on nozzle axis A-A. Connector 242 is configured to attach to a handheld meter, such as handheld meter 14B (FIG. 14A). In some examples, connector 242 is attached to an extension, such as extension 126 (FIG. 14A). In other examples, connector 242 is attached to a swivel elbow of an oil bar, such as swivel elbow 332 (best seen in FIG. 21B). Seating end 250 of connector 242 extends into nozzle bore 264 and is connected to receiving end 260 of nozzle body 244. In some examples, seating end 250 includes external threads configured to mate with internal threads in receiving end 260. Neck 256 extends into nozzle bore 264 from seating end 250. Shoulder 254 extends radially from neck 256. Connector seal groove 258 extends into seating end 250, and connector seal 259 is disposed in connector seal groove 258.

Nozzle bore 264 extends through nozzle body 244 between receiving end 260 and dispensing end 262. Downstream portion 270 is a distal end of dispensing end 262. The metered fluid exits downstream portion 270 through nozzle outlet 274. Connecting portion 272 is a cone-shaped passage extending between and connecting upstream portion 268 and downstream portion 270. Connecting portion 272 provides a smooth transition between upstream diameter D3 of upstream portion 268 and downstream diameter D4 of downstream portion 270. Angle γ is an angle of connecting portion 272, and in some examples, angle γ is about 30-degrees. Vent hole 266 extends through nozzle body 244 into nozzle bore 264. Vent hole 266 is open to atmosphere to allow air to flow into and out of nozzle body 244 to prevent over pressurization in nozzle bore 264 as nozzle stem 246 transitions between the open position and the closed position.

Nozzle stem 246 is disposed within nozzle bore 264. Nozzle stem 246 is configured to shift between an open position, where sealing portion 292 is disengaged from connecting portion 272, and a closed position, where sealing portion 292 is engaged with connecting portion 272. Inlet tube 276 extends into connector bore 252 through seating end 250. Stem flange 278 extends radially from inlet tube 276. Stem flange 278 is configured to abut neck 256 to limit displacement of nozzle stem 246. Nozzle spring 248 extends between shoulder 254 and stem flange 278. Flange seal groove 290 extends into an outer edge of stem flange 278. Flange seal 291 is disposed in flange seal groove 290 between stem flange 278 and nozzle body 244. Flow passages 280 are disposed downstream of stem flange 278 and extend radially through nozzle stem 246 into inlet tube 276.

Stem tip 282 extends axially from inlet tube 276. Main tip body 284 extends from inlet tube 276, and reduced diameter portion 286 extends axially from main tip body 284. Overmolded tip 288 is disposed on reduced diameter portion 286. Overmolded tip 288 can be formed from an elastomer. In some examples, overmolded tip 288 is formed from nitrile rubber. It is understood, however, that overmolded tip 288 can be formed from any elastomer chemically-compatible with the metered fluid. Sealing portion 292 is configured to engage connecting portion 272 with nozzle stem 246 in the closed position. Tip cone 294 extends from sealing portion 292. Angle θ is the angle between tip cone 294 and downstream portion 270. In some examples, angle θ is between about 20-degrees and 30-degrees. In one example, angle θ is about 25-degrees.

Nozzle body 244 is movable relative to connector 242 to shift nozzle 128 between an activated state and a deactivated state. In the activated state, nozzle stem 246 is able to shift between the open and closed positions within nozzle body 244. In the deactivated state, stem flange 278 abuts neck 256 and sealing portion 292 abuts connecting portion 272 such that nozzle stem 246 is unable to shift within nozzle body 244. In the deactivated state nozzle stem 246 is locked in the closed position to prevent inadvertent fluid dispenses. To shift nozzle between the activated state and the deactivated state, the user screws nozzle body 244 further on to or off of connector 242, thereby changing the distance that nozzle stem 246 can move within nozzle body 244.

During operation, nozzle body 244 is placed in the activated position. With nozzle body 244 in the activated position the user initiates a flow of metered fluid to nozzle 128. The metered fluid flows through connector bore 252 and enters inlet tube 276. The metered fluid flows out of inlet tube 276 through flow passages 280, generating a fluid pressure within nozzle bore 264. The fluid pressure acts on stem flange 278 and overcomes the force of nozzle spring 248 to cause nozzle stem 246 to shift from the closed position to the open position. With nozzle stem 246 in the open position, sealing portion 292 is disengaged from connecting portion 272 and a flow path is opened through dispensing end 262. The meter fluid flows through upstream portion 268, between tip cone 294 and connecting portion 272, and exits nozzle body 244 through downstream portion 270.

Tip cone 294 facilitates a tight stream of metered fluid exiting dispensing end 262 through nozzle outlet 274. A ratio of base diameter D5 to length L1 is between about 10:7 and 3:2. In one example, the ratio of base diameter D5 to length L1 is about 11:8. Tip cone 294 prevents sputtering, fanning, and atomizing of the metered fluid exiting dispensing end 262. As the metered fluid enters connecting portion 272, the flow path created between connecting portion 272 and tip cone 294 orients the flow of the metered fluid along nozzle axis A-A. The meter fluid converges in downstream portion 270 and is dispensed out of nozzle outlet 274 in a tight stream. With nozzle stem 246 in the open position, tip cone 294 is offset from nozzle outlet 274 of downstream portion 270 by length L2. In some examples, length L2 is about 0.305-0.343 cm (about 0.120-0.135 in.). In one example, length L2 is about 0.320 cm (about 0.126 in.). A ratio of diameter D4 to length L2 is about 2:1. Length L2 and angle θ generate a laminar flow in downstream portion prior to the meter fluid exiting nozzle outlet 274. The laminar flow eliminates sputtering, fanning, and atomization of the metered fluid. In some examples, tip cone 294 facilitates a tight stream of meter fluid at flow rates up to about 10 gallons per minute.

After a dispense event is complete, the user releases the trigger and the flow of meter fluid to nozzle 128 is shut off. When the flow of meter fluid stops, valve spring 248 drives nozzle stem 246 to the closed position. With nozzle stem 246 in the closed position, sealing portion 292 engages connecting portion 272 and tip cone 294 extends into downstream portion 270. Connecting portion 272 aligns sealing portion 292 on nozzle axis A-A as nozzle stem 246 shifts to the closed position, facilitating alignment of nozzle stem 246 within dispensing end 262 and ensuring formation of a fluid-tight seal. As discussed above, overmolded tip 288 is formed from a compliant material, such as nitrile rubber, which facilitates formation of the fluid-tight seal even where contaminants are present in the meter fluid.

Tip cone 294 extends into downstream portion 270 with nozzle stem 246 in the closed position. In some examples, tip cone 294 occupies about 50% of the volume of downstream portion 270 when nozzle stem 246 is in the closed position. Tip cone 294 ensures that the mass of the metered fluid remaining in downstream portion 270 is sufficiently low such that the surface tension of the metered fluid prevents the metered fluid from dripping out of downstream portion 270. As such, tip cone 294 extending into and occupying at least 50% of the volume of downstream portion 270 prevents latent dripping of any metered fluid that is within downstream portion 270 when nozzle stem 246 shifts to the closed position.

Nozzle 128 provides significant advantages. Overmolded tip 288 facilitates sealing and alignment of nozzle stem 246. Overmolded tip 288 being compliant further facilitates sealing, particularly where contaminants are present in the metered fluid. Connecting portion 272 provides a smooth transition between upstream diameter D3 and downstream diameter D4, further ensuring alignment and sealing of nozzle stem 246. Tip cone 294 and length L2 generate laminar flow in downstream portion 270, which prevents sputtering, fanning, and/or atomization of the metered fluid. Tip cone 294 extends into and occupies downstream portion 270 with nozzle stem 246 in the closed position, thereby preventing latent dripping of the metered fluid out of nozzle outlet 274.

Figure 21A:
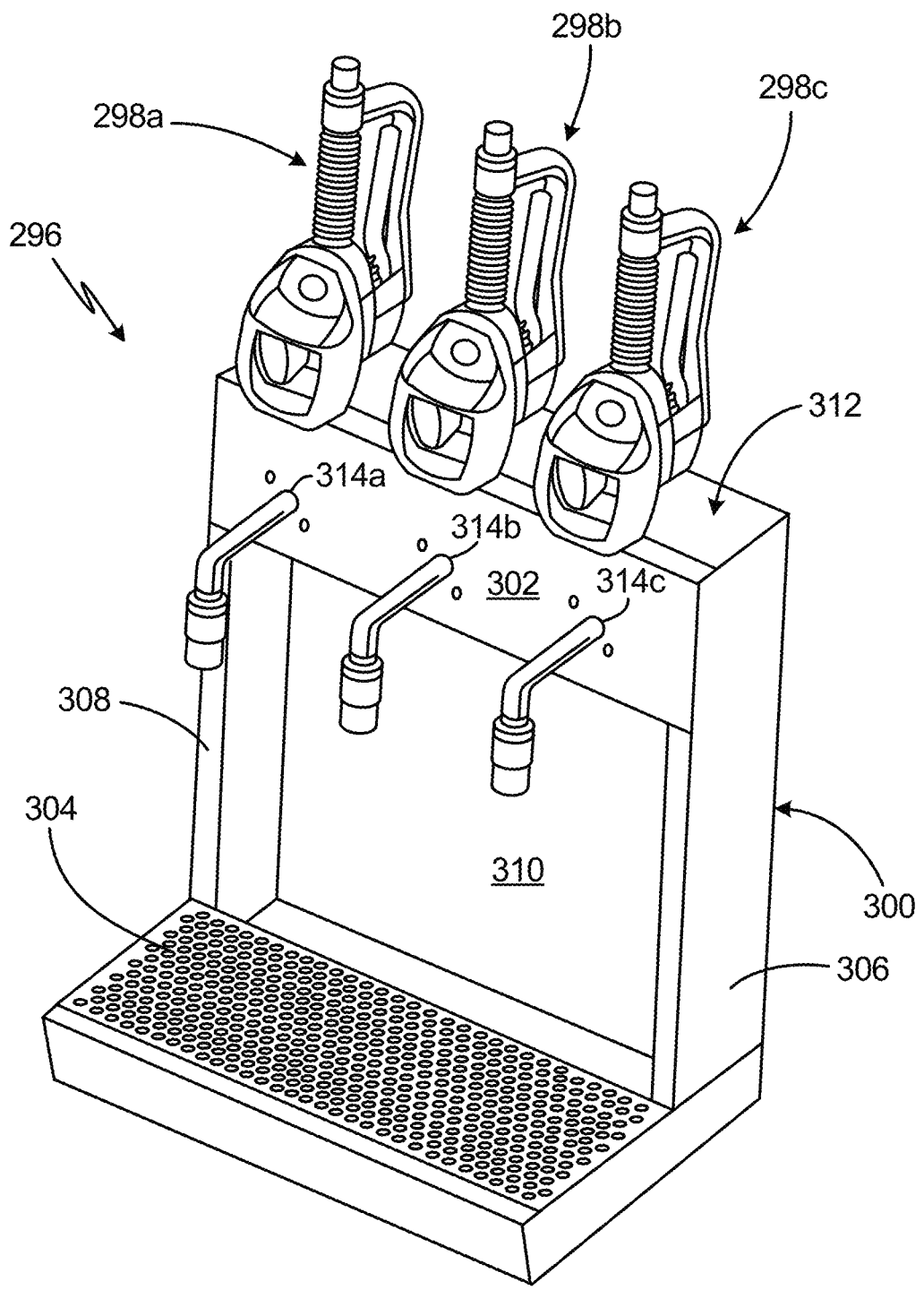
FIG. 21A is an isometric view of an oil bar.
Figure 21B:
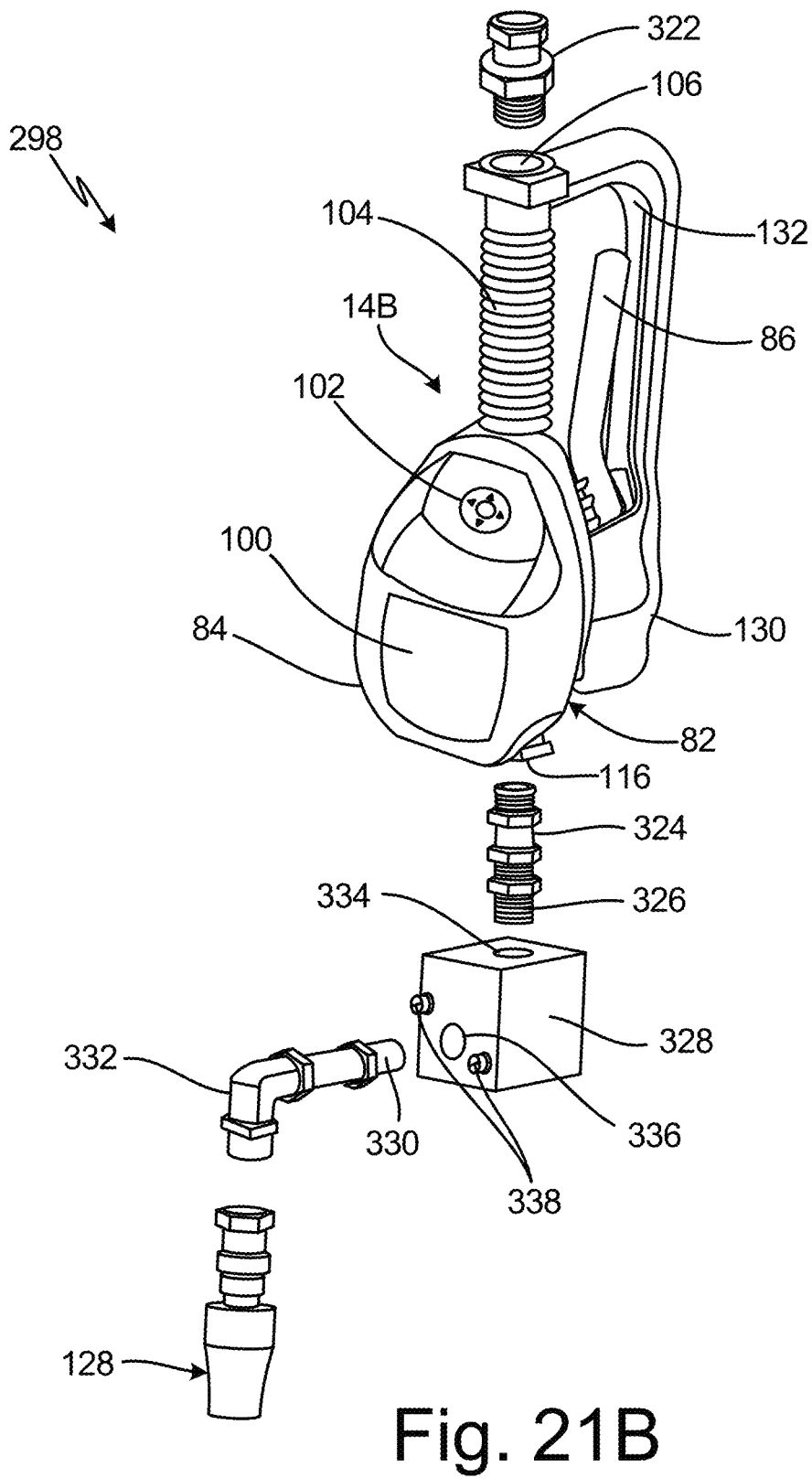
FIG. 21B is an exploded view of a dispense assembly for an oil bar.
Figure 21C:
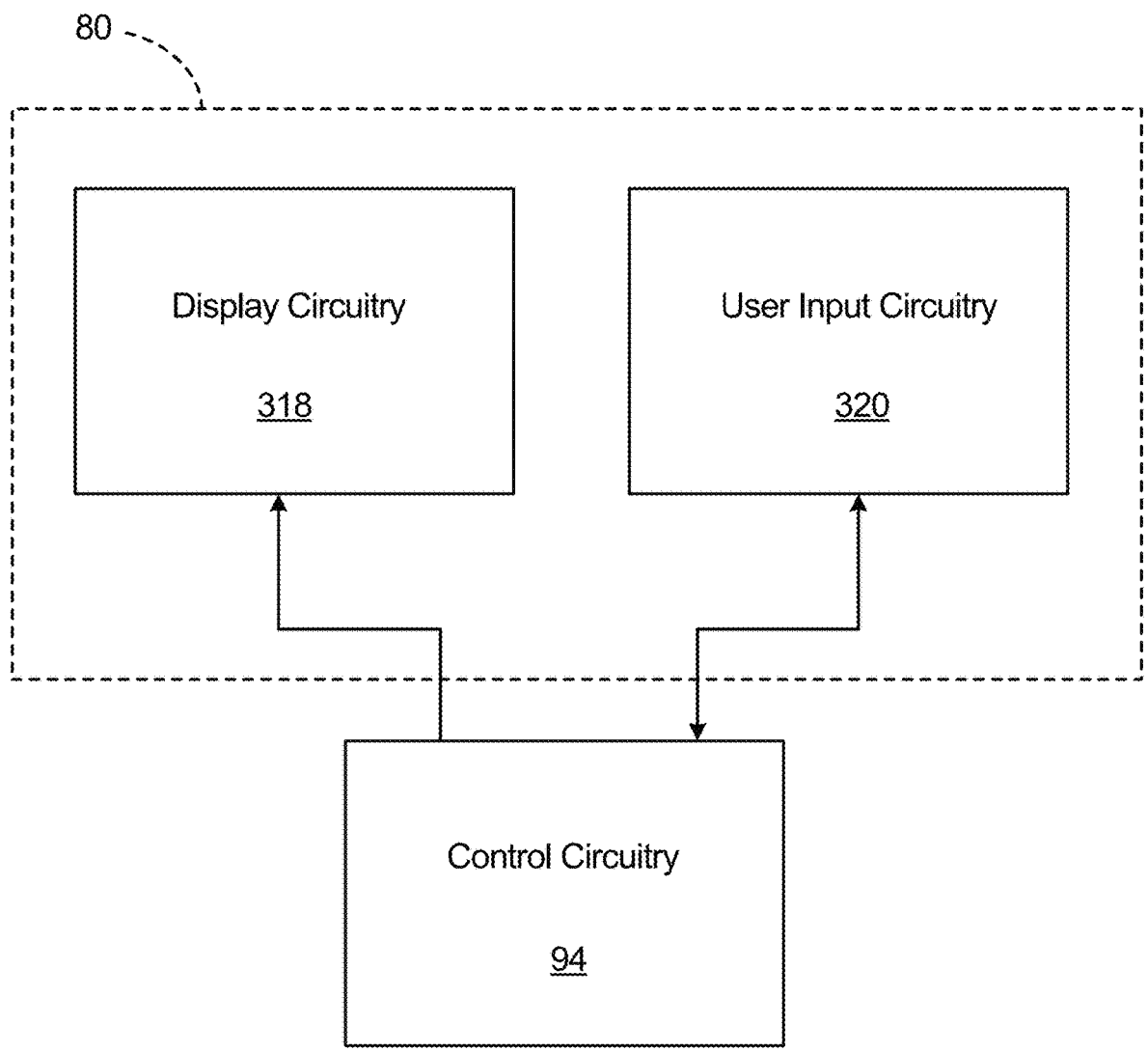
FIG. 21C is a simplified block diagram illustrating a meter controller.
Figure 21D:
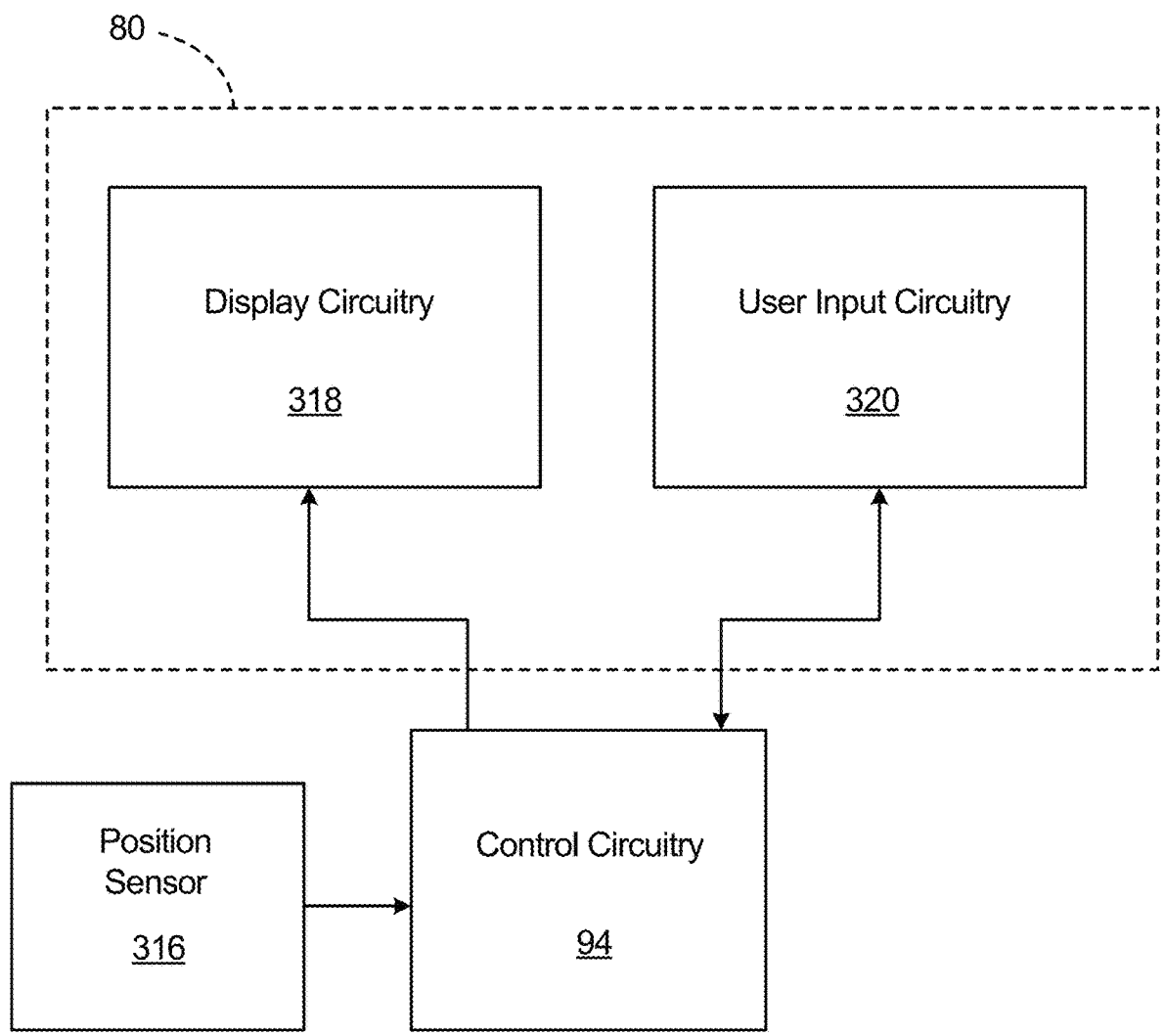
FIG. 21D is a simplified block diagram of another meter controller.

FIG. 21A is an isometric view of oil bar 296. FIG. 21B is an exploded view of dispense assembly 298. FIG. 21C is a block diagram illustrating an example of meter controller 72 and user interface 80. FIG. 21D is a block diagram illustrating another example of meter controller 72 and user interface 80. FIGS. 21A-21D will be discussed together. Oil bar 296 includes dispense assemblies 298a-298c (collectively herein "dispense assembly 298"), frame 300, front panel 302, and pan 304. Frame 300 includes first side panel 306, second side panel 308, back panel 310, and plenum 312. Front panel 302 includes dispenser openings 314a-314c (collectively herein "dispenser opening 314"). Control circuitry 94 of meter controller 72 is shown in FIGS. 21C-21D. Position sensor 316 is shown in FIG. 21D. Display circuitry 318 and user input circuitry 320 of user interface 80 are shown in FIGS. 21C-21D.

As shown in FIG. 21B, each dispense assembly 298 includes handheld meter 14B, nozzle 128, inlet fitting 322, outlet fitting 324, manifold inlet adapter 326, manifold 328, manifold outlet adapter 330, and swivel elbow 332. Manifold 328 includes manifold inlet opening 334 and manifold outlet opening 336. Meter body 82, trigger 86, bezel housing 84, elastomeric trigger guard 130, and user interface 80 of handheld meter 14B are shown. Handle 104, integral trigger guard 132, fluid inlet 106, and fluid outlet 116 of meter body 82 are shown. User interface 80 includes user input 102 and display 100.

Back panel 310 extends between and is connected to first side panel 306 and second side panel 308. In some examples, first side panel 306, second side panel 308, and back panel 310 are integrally formed as a single part. In other examples, first side panel 306 and second side panel are connected to back panel 310 by fasteners. Front panel 302 is mounted to a top of first side panel 306 and second side panel 308. Pan 304 is disposed at a bottom of frame 300. Plenum 312 is defined between front panel 302 and back panel 310. Dispense assemblies 298 are mounted on oil bar 296 and are configured to dispense fluid to containers. Handheld meter 14B is plumbed for incorporation on oil bar 296 to provide dispense authorization and fluid tracking. Manifold 328 is disposed in plenum 312 and is connected to front panel 302 by fasteners 338, which extend through front panel 302 and into manifold 328. Inlet fitting 322 extends into and is connected to fluid inlet 106. Inlet fitting 322 is configured to receive a supply hose extending from a bulk fluid storage tank. Outlet fitting 324 is connected to fluid outlet 116. Manifold inlet adapter 326 is connected to outlet fitting 324 and manifold inlet opening 334. Manifold outlet adapter 330 is connected to manifold outlet opening 336 and extends through dispenser opening 314 in front panel 302. Swivel elbow 332 is attached to an end of manifold outlet adapter 330 extending out of front panel 302. Nozzle 128 is connected to swivel elbow 332 and configured to dispense the metered fluid. Mounting multiple dispense assemblies 298 on oil bar 296 allows for various types of fluids to be connected to oil bar 296 for dispensing, such as where each dispense assembly 298 is connected to a different bulk storage tank containing different fluids.

User interface 80 includes display circuitry 318 and user input circuitry 320. User input circuitry 320 can be of any suitable configuration to enable actuation by the user. For example, user input 102 can include a plurality of mechanical buttons that receive inputs from the user and provide the inputs to user input circuitry 320, with each button corresponding to a directional command for an indicator provided on display 100. Display circuitry 318 is of any suitable digital or analog display capable of producing a visual output viewable at display 100. Control circuitry 94 is electrically connected within handheld meter 14B and can be of any suitable configuration for controlling operation of handheld meter 14B. Control circuitry 94 is configured to control the generation of displays on display circuitry 318 and to recognize and process operator commands provided through user input circuitry 320. While control circuitry 94 is described as configured to control operation of handheld meter 14B, it is understood that control circuitry 94 can be separate from the control circuitry controlling operation of handheld fluid meter 14B.

Handheld meter 14B is mounted in an inverted orientation on oil bar 296. Display 100 and user input 102 are fixedly mounted on bezel housing 84. Meter controller 72 is configured to invert an orientation of a visual output provided by display 100 such that the visual output is readable by the user with handheld meter 14B mounted in the inverted orientation. The user prepares handheld meter 14B for use on oil bar 296 by inputting an oil bar command to handheld meter 14B via user input 102. While the oil bar command is described as provided by the user, it is understood that the oil bar command can be automatically generated and provided to control circuitry 94.

As shown in FIG. 21D, handheld fluid meter 14B can include position sensor 316, which can be any suitable sensor for determining the relative position of handheld fluid meter 14B, such as an accelerometer, for example. Position sensor 316 senses the relative position of handheld fluid meter 14B and is configured to determine when handheld fluid meter 14B is in the inverted position. Position sensor 316 provides the relative position information to control circuitry 94, and control circuitry 94 can automatically generate the oil bar command based on the relative position information indicating that handheld fluid meter 14B is in the inverted position. In another example, handheld fluid meter 14B can include a sensor, configured to generate the oil bar command based on handheld fluid meter 14B being in position on oil bar 296. For example, handheld fluid meter 14B can include a reed switch that is activated by a magnet installed on oil bar 296.

Control circuitry 94 receives the oil bar command from user input circuitry 320 and/or from position sensor 316 and provides orientation instructions to display circuitry 318. Based on the orientation instructions, the orientation of the visual output provided by display circuitry 318 is modified such that the visual output is readable by the user with handheld meter 14B mounted on oil bar 296. In one example, display circuitry 318 rotates the visual output 180-degrees.

In addition to rotating the visual orientation, control circuitry 94 can modify the functionality of the buttons of user input 102 such that the orientation of the visual output is reflected in the functionality of the buttons. Control circuitry 94 modifies the functionality of the buttons of user input 102 such that commands provided at each button are related to the desired relative direction on the visual output. For example, where user input 102 is configured such that the button orientations are related to the standard, upright display orientation, control circuitry 94 is configured to invert the "up" and "down" buttons in addition to inverting the visual output provided by display 100. As such, the "up" button becomes the "down" button and the "down" button becomes the "up" button. As such, the commands input by the user are provided the desired directional control on visual output with handheld meter 14B mounted in the inverted position on oil bar 296. Control circuitry 94 can also invert the left and right buttons to correctly associate "left" and "right" with the inverted screen orientation. In other examples, user input 102 is configured such that the button orientations are related to a relative direction on screen. In such an example, control circuitry 94 does not invert the commands from user input 102, as the relative direction of the buttons to display 100 remains the same, even though the visual output is inverted. Control circuitry 94 thus inverts the visual output provided by display circuitry 318 and can modify the functionality of the buttons to ensure that the visual output is readable with handheld meter 14B in the inverted position, and to ensure that button commands are related to the desired relative direction on the visual output.

With the visual output of display 100 inverted, display 100 is readable by the user with handheld meter 14B mounted on oil bar 296. As discussed above, display 100 extends through bezel housing 84 and is oriented at angle α (shown in FIGS. 15B and 19) relative to handle 104, such that display 100 is tilted towards handle 104. With display 100 at angle α, the visual orientation is angled upwards, towards the user and perpendicular to the user's line of sight. Angle α can be any desired angle for positioning display 100 in the user's line of sight while the user is dispensing with dispense assembly 298. As such, angle α can be between 90-degrees and 180-degrees. In some examples, angle α is between 150-degrees and 170-degrees. Display 100 is thus in an ergonomic viewing position for the user. In addition, trigger 86 is mounted above both display 100 and fluid outlet 116, which positions trigger 86 in an ergonomic position that allows the user to easily and simultaneously view display 100 and manipulate trigger 86.

Control circuitry 94 is described as inverting the visual output of display circuitry 318 and/or the functionality of the buttons of user input 102 to prepare handheld fluid meter 14B for use on oil bar 296. It is understood, however, that the oil bar command is not limited to use of handheld fluid meter 14B on oil bar 296. For example, in automotive shops handheld fluid meters 10 can hang from a hose reel mounted on the ceiling. While hanging, the handheld fluid meter 14B is in the inverted position. Control circuitry 94 can modify the orientation of the visual output and the button functionality whenever handheld fluid meter 14B is in the inverted position, such as based on information received from position sensor 316. As such, the user is able to easily and quickly view the visual output whenever handheld fluid meter 14B is in the inverted position.

Dispense assembly 298 and meter controller 72 provide significant advantages. Mounting handheld meter 14B in the inverted position orients display 100 in an ergonomic position for the user. Mounting handheld meter 14B in the inverted position also reduces the number of parts and eliminates complicated plumbing previously required to make handheld meters suitable for use on oil bar 296. Dispense assembly 298 including handheld meter 14B reduces the required inventory in a shop as a special PN meter is not required for oil bar 296 applications. Control circuitry 94 modifies the orientation of visual output such that the visual output is easily readable with handheld meter 14B in the inverted position. Control circuitry 94 also modifies the functionality of the buttons of user input 102 such that the button orientation is associated with the visual orientation, which allows the user to easily and intuitively control of handheld meter 14B. Control circuitry 94 modifying the visual output based on information received from position sensor 316 ensures that the visual output is properly oriented whenever handheld fluid meter 14B is in an inverted position, without requiring user input.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid dispensing meter comprising:
a trigger control mechanism disposed in a body of the fluid dispensing meter, the trigger control mechanism controllable between an activated state, where the fluid dispensing meter can dispense fluid, and a deactivated state, where the fluid dispensing meter is prevented from dispensing fluid;
a near field communications (NFC) data receiver disposed in the fluid dispensing meter, the NFC data receiver configured to receive data from an external data source, the data including dispense-authorization data that includes at least one dispense authorization for a dispense event; and
a control board disposed in the fluid dispensing meter, the control board comprising:
a processor; and
a memory encoded with instructions that, when executed by the processor, cause the processor to:
recall configuration data configured to indicate a fluid type associated with the fluid dispensing meter from the memory;
compare the configuration data to dispense-authorization data received from the external data source;
control the trigger control mechanism between the activated state and the deactivated state based on the data received from the external data source, and based on the comparison of the configuration data and the dispense-authorization data; and
remove a dispense authorization from the dispense-authorization data to reduce a count of the dispense authorizations remaining in the dispense-authorization data.

2. The fluid dispensing meter of claim 1, wherein the dispense-authorization data includes fluid type information.

3. The fluid dispensing meter of claim 1, wherein the dispense-authorization data includes dispense volume information.

4. The fluid dispensing meter of claim 1, wherein the data from the external data source is configuration data configured to indicate a fluid type associated with the fluid dispensing meter, and wherein the configuration data is stored in the memory.

5. The fluid dispensing meter of claim 1, further comprising:
a fluid inlet extending into the body;
a valve chamber extending into the body, the valve chamber comprising:
a first circumferential flow passage; and
a second circumferential flow passage;
a valve inlet extending fluidly connecting the fluid inlet and the first circumferential flow passage;
a valve outlet extending downstream out of the valve chamber from the second circumferential flow passage;
a valve disposed in the valve chamber, the valve comprising:
a valve cartridge mounted in the valve chamber, the valve cartridge comprising:
a cartridge body extending between a first end and a second end, the cartridge body including a third circumferential flow passage in the first end and a fourth circumferential flow passage in the second end;
a radial inlet extending through the first end between the first circumferential flow passage and the third circumferential flow passage;
a radial outlet extending through the second end between the second circumferential flow passage and the fourth circumferential flow passage; and
a control seat disposed about an interior of the cartridge body between the third circumferential flow passage and the fourth circumferential flow passage; and
a valve stem disposed in the valve cartridge, the valve stem comprising:
an upper portion disposed within the first end, the upper portion including an annular control seal groove;
a lower portion disposed within the second end, the lower portion including an actuating tip extending out of the second end of the valve cartridge;
an elongate portion extending between and connecting the upper portion and the lower portion; and
a control seal disposed in the control seal groove, the control seal configured to be engaged with the control seat with the valve stem in a closed position and to be disengaged from the control seat with the valve stem in an open position.

6. The fluid dispensing meter of claim 1, further comprising:
a fluid inlet extending into the body;
a fluid outlet extending into the body; and
a nozzle fluidly connected to the fluid outlet, the nozzle including:

a connector having a receiving end and a connector bore extending through the connector;

a nozzle body attached to the connector, the nozzle body comprising:
- a receiving end;
- a dispensing end disposed opposite the receiving end, the dispensing end defining a fluid outlet, the fluid outlet comprising:
  - an upstream portion having a first diameter;
  - a downstream portion having a second diameter, the second diameter smaller than the first diameter; and
  - a connecting portion extending between and connecting the upstream portion and the downstream portion, the connecting portion comprising a cone-shaped passage; and
- a nozzle bore extending through the nozzle body between the receiving end and the dispensing end, wherein the seating end extends into the nozzle bore and is connected to the receiving end; and a nozzle stem disposed in the nozzle bore between the seating end and the fluid outlet, the nozzle stem including an overmolded tip, the overmolded tip including a tip cone configured to mate with and seal against the cone-shaped passage with the nozzle stem in a closed position.

7. The fluid dispensing meter of claim 1, further comprising:

a fluid inlet extending into a handle of the body;

a fluid outlet extending out of an end of the body opposite the handle;

a trigger configured to be manually displaced to control a flow of fluid between the fluid inlet and the fluid outlet;

a bezel housing mounted on the body, the bezel housing including a display opening;

a display screen mounted within the display opening;

a user input mounted on the bezel housing, the user input including a plurality of buttons;

display circuitry configured to provide a visual output at the display screen in a plurality of orientations;

user input circuitry configured to receive inputs from a user via the plurality of buttons to modify the visual output of the display screen; and wherein the control board is connected to communicate with the display circuitry and the user input circuitry, the control board configured to receive an input regarding a desired orientation of the visual output from the user input circuitry and to provide instructions to the display circuitry to modify the orientation of the visual output based on the input regarding the desired orientation.

8. A fluid management system comprising:

the fluid dispensing meter of claim 1;

a near field communication (NFC) programming unit; and an NFC data source, the NFC data source configured to receive dispense data from the NFC programming unit, the dispense data including the dispense- authorization data that includes the at least one dispense authorization for the dispense event.

9. The fluid management system of claim 8, wherein the dispense data is stored on the NFC data source in a read-only format.

10. The fluid management system of claim 8, wherein the dispense data is stored on the NFC data source in a read-write format.

11. The fluid management system of claim 8, wherein the NFC programming unit is a system controller.

12. A fluid management system comprising:

the fluid dispensing meter of claim 1;

a user interface device; and a fluid management controller configured to communicate wirelessly with the fluid dispensing meter and collect data received from the fluid dispensing meter.

13. A controller intended for use with a fluid dispensing meter including a trigger control mechanism mounted in a body of the fluid dispensing meter, the trigger control mechanism controllable between an activated state, where the fluid dispensing meter can dispense fluid, and a deactivated state, the controller comprising:

a control board comprising:
- a processor; and
- a memory encoded with instructions that, when executed by the processor, cause the processor to;
  - recall configuration data configured to indicate a fluid type associated with the fluid dispensing meter from the memory;
  - compare the configuration data to dispense-authorization data received from the external data source; and
  - control the trigger control mechanism between the activated state and the deactivated state based on data received from an external data source and based on the comparison of the configuration data and the dispense-authorization data; and a near field communication (NFC) data receiver in communication with the control board, the NFC data receiver configured to receive the data from the external data source, wherein the data includes a plurality of dispense authorizations data for a plurality of fluid dispense events;

wherein the control board is further configured to remove a dispense authorization of the plurality of dispense authorizations from the dispense-authorization data to reduce a count of the dispense authorizations remaining in the dispense-authorization data.

14. The controller of claim 13, wherein the dispense-authorization data includes at least one of fluid type information and dispense volume information.

* * * * *